(12) United States Patent
Hasegawa

(10) Patent No.: US 6,760,200 B2
(45) Date of Patent: Jul. 6, 2004

(54) SPIN-VALVE THIN-FILM MAGNETIC ELEMENT SUITABLE FOR TRACK NARROWING AND THIN-FILM MAGNETIC HEAD USING THE SAME

(75) Inventor: Naoya Hasegawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 324 days.

(21) Appl. No.: 09/989,788

(22) Filed: Nov. 19, 2001

(65) Prior Publication Data

US 2002/0064006 A1 May 30, 2002

(30) Foreign Application Priority Data

Nov. 24, 2000 (JP) ........................................ 2000-357826
Nov. 24, 2000 (JP) ........................................ 2000-357827

(51) Int. Cl.[7] .......................... G11B 5/127; G11B 5/39
(52) U.S. Cl. ................................................. 360/324.12
(58) Field of Search ...................... 360/324.12, 324.1, 360/324, 313, 110

(56) References Cited

U.S. PATENT DOCUMENTS

| | | | |
|---|---|---|---|
| 5,684,658 A | * | 11/1997 | Shi et al. ..................... 360/315 |
| 5,891,586 A | | 4/1999 | Hasegawa et al. |
| 5,958,611 A | * | 9/1999 | Ohta et al. .................. 428/692 |
| 6,153,319 A | | 11/2000 | Hasegawa |
| 6,301,089 B1 | * | 10/2001 | Saito et al. ............. 360/324.12 |
| 6,417,999 B1 | * | 7/2002 | Knapp et al. ................ 360/322 |
| 2002/0067577 A1 | * | 6/2002 | Beach et al. ................. 360/314 |

FOREIGN PATENT DOCUMENTS

| | | |
|---|---|---|
| JP | 11-288504 | 10/1999 |
| JP | 2000-123327 | 4/2000 |

* cited by examiner

*Primary Examiner*—Julie Anne Watko
(74) *Attorney, Agent, or Firm*—Brinks Hofer Gilson & Lione

(57) ABSTRACT

A spin-valve thin-film magnetic element includes a substrate, an antiferromagnetic layer, a pinned magnetic layer in contact with the antiferromagnetic layer, a free magnetic layer formed on the pinned magnetic layer with a nonmagnetic conductive layer therebetween, a pair of hard bias layers, and a pair of electrode layers. The magnetic read track width Tw is set at 0.4 µm or less. At least a part of the free magnetic layer is composed of an NiFe alloy, the Ni content $C_{Ni}$ in the NiFe alloy being in the range of 70.2 to 89.9 atomic percent, or the magnetostriction λs of the free magnetic layer is in the range of $-7.0 \times 10^{-6}$ to $2.0 \times 10^{-5}$. A thin-film magnetic head using such a spin-valve thin-film magnetic head is also disclosed.

48 Claims, 31 Drawing Sheets

SPIN-VALVE THIN-FILM MAGNETIC ELEMENT SUITABLE FOR TRACK NARROWING AND THIN-FILM MAGNETIC HEAD USING THE SAME

BACKGROUND OF THE INVENTION

1. Field of the Invention

The present invention relates to a spin-valve thin-film magnetic element in which electrical resistance changes due to the relationship between the pinned magnetization direction of a pinned magnetic layer and the magnetization direction of a free magnetic layer which is influenced by an external magnetic field, and to a thin-film magnetic head provided with the spin-valve thin-film magnetic element. More particularly, the invention relates to a technique which improves the output and stability of the element, which reduces Barkhausen noise, etc., and which allows satisfactory alignment of the domain of the free magnetic layer when the track width is narrowed.

2. Description of the Related Art

A spin-valve thin-film magnetic element is one type of giant magnetoresistive (GMR) element exhibiting a giant magnetoresistance effect, and it detects a recorded magnetic field from a magnetic recording medium, such as a hard disk.

The spin-valve thin-film magnetic element has a relatively simple structure among GMR elements, and has a high rate of resistance change relative to an external magnetic field, and the resistance changes in response to a weak magnetic field.

FIG. 35 is a sectional view of a conventional spin-valve thin-film magnetic element, viewed from a surface facing a recording medium (air bearing surface; ABS).

The spin-valve thin-film magnetic element shown in FIG. 35 is a so-called bottom-type single spin-valve thin-film magnetic element in which an antiferromagnetic layer, a pinned magnetic layer, a nonmagnetic conductive layer, and a free magnetic layer, one each, are formed.

For the spin-valve thin-film magnetic element, a magnetic recording medium, such as a hard disk, travels in the Z direction in the drawing, and a fringing magnetic field from the magnetic recording medium is directed in the Y direction.

As shown in FIG. 35, the conventional spin-valve thin-film magnetic element includes a laminate 109 in which an underlayer 106, an antiferromagnetic layer 101, a pinned magnetic layer 102, a nonmagnetic conductive layer 103, a free magnetic layer 104, and a protective layer 107 are deposited in that order on a substrate; hard bias layers 105 formed at both sides of the laminate 109; and electrode layers 108 formed on the hard bias layers 105. The underlayer 106 is composed of tantalum (Ta) or the like, and the antiferromagnetic layer 101 is composed of an NiO alloy, an FeMn alloy, an NiMn alloy, or the like. The pinned magnetic layer 102 and the free magnetic layer 104, respectively, are composed of Co, an NiFe alloy, or the like. The nonmagnetic conductive layer 103 is composed of a copper (Cu) film, the hard bias layers 105 are composed of a cobalt-platinum (Co—Pt) alloy or the like, and the electrode layers 108 are composed of Ta, Au, Cr, W, or the like.

Since the pinned magnetic layer 102 is brought into contact with the antiferromagnetic layer 101, an exchange coupling magnetic field (exchange anisotropic magnetic field) is generated at the interface between the pinned magnetic layer 102 and the antiferromagnetic layer 101, and the magnetization direction of the pinned magnetic layer 102 is pinned, for example, in the Y direction.

Since the hard bias layers 105 are magnetized in the X1 direction in the drawing, the variable magnetization of the free magnetic layer 104 sandwiched between the hard bias layers 105 is aligned in the X1 direction. Thereby, the variable magnetization of the free magnetic layer 104 and the pinned magnetization of the pinned magnetic layer 102 are substantially orthogonal to each other.

In the spin-valve thin-film magnetic element, a sensing current is applied from one electrode layer 108 formed on one hard bias layer 105 to the pinned magnetic layer 102, the nonmagnetic conductive layer 103, and the free magnetic layer 104. A magnetic recording medium, such as a hard disk, travels in the Z direction in the drawing, and when a fringing magnetic field from the magnetic recording medium is applied in the Y direction, the magnetization direction of the free magnetic layer 104 is rotated from the X1 direction to the Y direction. At this stage, electrical resistance changes due to the relationship between the varied magnetization direction of the free magnetic layer 104 and the pinned magnetization direction of the pinned magnetic layer 102, which is referred to as the magnetoresistance (MR) effect, and the fringing magnetic field from the magnetic recording medium is detected by a voltage change based on the change in the electrical resistance.

The spin-valve thin-film magnetic element is of an abutted junction type in which the variable magnetization of the free magnetic layer 104 is firmly pinned by the hard bias layers 105 located at both sides of the free magnetic layer 104, improving the stability of the magnetization of the free magnetic layer 104.

The magnetization of the free magnetic layer 104 is usually aligned in the track width direction under the influence of the hard bias layers 105 which are formed at both sides of the free magnetic layer 104 and which are magnetized in the track width direction. However, the influence of the hard bias layers 105 is largest at both ends of the free magnetic layer 104, and the influence decreases toward the center of the free magnetic layer 104.

FIGS. 36 and 37 are graphs showing the output profiles in the track width direction of the spin-valve thin-film magnetic element shown in FIG. 35.

The read output of the spin-valve thin-film magnetic element has a profile in the read track width direction (in the X1 direction shown in FIG. 35), and the midsection of the laminate 109 is a sensitive region 109a which substantially contributes to reading of the recorded magnetic field from the magnetic recording medium and which has a read output sufficiently high for exhibiting a magnetoresistance effect. The sensitive region 109a corresponds to the read track width Tw. On the other hand, regions at both sides of the sensitive region 109a in the laminate 109 are insensitive regions 109b having a low read output insufficient for substantially contributing to reading of the recorded magnetic field from the magnetic recording medium.

The sensitive region 109a and the insensitive regions 109b in the laminate 109 are determined by a microtrack profile method which will be described below.

In such a spin-valve thin-film magnetic element, instability in output is preferably low.

With increasing demands for improving recording density of magnetic recording onto medium, there are strong requirements for narrowing of a read track width to 1 $\mu$m or less, and further to 0.5 $\mu$m or less, and particularly to 0.4 $\mu$m or less as well as for prevention of reduction in output.

However, in the abutted junction type spin-valve thin-film magnetic element, when the track width is narrowed, the read output is decreased.

The read output profile described above is caused by the fact that insensitive regions 104b of the free magnetic layer 104 which are nearer to the hard bias layers 105 are more strongly influenced by the magnetic field from the hard bias layers 105 and the variable magnetization of the free magnetic layer 104 is more firmly pinned compared to a sensitive region 104a in the midsection of the free magnetic layer 104 corresponding to the sensitive region 109a. That is, the influence of the hard bias layers 105 is largest at both ends of the free magnetic layer 104 and the influence decreases toward the center of the free magnetic layer 104, i.e., the influence decreases as the distance from the hard bias layers 105 is increased, and thus the insensitive regions 104b occur.

Herein, the insensitive regions 104b refer to the regions in which rotation of the variable magnetization of the free magnetic layer 104 is blunted, and do not correspond to a difference between the physical track width and the optical track width.

Therefore, since the width in the track width direction of the insensitive region 104b does not depend on the width in the track width direction of the spin-valve thin-film magnetic element, even when the width in the track width direction of the entire laminate 109 is decreased for the purpose of track narrowing, the width in the track width direction of the insensitive region 104b is not changed or narrowed.

Consequently, when the track width is narrowed to meet track narrowing, it seems as if the sensitive region 104a was decreased, and the read output profile curves corresponding to the insensitive regions 104b move toward the center in the track width direction.

In particular, when the read track width is set at 0.4 µm or less to meet further track narrowing, it seems as if the sensitive region 104a disappeared and the insensitive region 104b covered the entirety of the free magnetic layer in the track width direction, and as shown in FIG. 37, the read output, i.e., the maximum of the read output, is decreased.

On the other hand, in the spin-valve thin-film magnetic element having a multilayered structure including metallic films, upper and lower surfaces thereof and a back side in the height direction are covered by an insulating film (gap film), and a front side (ABS) opposite to the back side is exposed to outside, and thus, tensile stress is applied in the height direction to the central section of the free magnetic layer in the spin-valve thin-film magnetic element.

Consequently, when the read track width is set at approximately 1 µm or more, as described above, since the influence of the hard bias layers 105 is largest at both ends of the free magnetic layer 104, and the influence decreases toward the center of the free magnetic layer 104, in particular, the central section of the free magnetic layer 104 is greatly influenced by a uniaxial anisotropic magnetic field due to an inverse magnetostrictive effect determined by the stress applied to the free magnetic layer 104 and the magnetostriction.

As described above, since tensile stress is applied to the central section of the free magnetic layer 104, when the magnetostriction of the free magnetic layer 104 is positive and as its value is increased, easy magnetization rotation in the height direction due to the inverse magnetostrictive effect is increased and the height direction becomes the easy magnetization axis direction. In such a state, the central section of the free magnetic layer 104 is easily magnetized in the height direction, resulting in Barkhausen noise.

In other words, when magnetostriction occurs in the free magnetic layer 104, magnetic hysteresis may occur, and as shown in FIG. 38, the single-domain alignment of the free magnetic layer 104 is disturbed as if domain walls 104c are formed in the free magnetic layer 104, and the magnetization becomes nonuniform. Thus, Barkhausen noise, etc., may easily occur, resulting in instability leading to inaccurate processing of signals from the magnetic recording medium.

For example, when a hysteresis occurs, a baseline shift occurs as shown in FIG. 40 and the regenerated waveform loses symmetry, in contrast with the regenerated waveform shown in FIG. 39 when there is no hysteresis. FIGS. 39 and 40 are graphs showing regenerated waveforms of spin-valve thin-film magnetic elements.

Accordingly, with respect to spin-valve thin-film magnetic elements, there have been attempts to reduce the influence of magnetostriction.

Furthermore, along with the fundamental need for track narrowing of spin-valve thin-film magnetic elements, there are also demands for an improvement in output characteristics and an improvement in sensitivity.

SUMMARY OF THE INVENTION

Objects of the present invention are to improve output characteristics of a spin-valve thin-film magnetic element when the track width is narrowed, to improve stability in regenerated waveform in a spin-valve thin-film magnetic element, to control magnetostriction in a spin-valve thin-film magnetic element, and to provide a thin-film magnetic head provided with such a spin-valve thin-film magnetic element.

In one aspect of the present invention, a spin-valve thin-film magnetic element includes a substrate; an antiferromagnetic layer; a pinned magnetic layer in contact with the antiferromagnetic layer, the magnetization direction of the pinned magnetic layer being pinned by an exchange coupling magnetic field with the antiferromagnetic layer; a free magnetic layer formed in contact with the pinned magnetic layer with a nonmagnetic conductive layer therebetween, the magnetization direction of the free magnetic layer being aligned in a direction substantially orthogonal to the magnetization direction of the pinned magnetic layer; a pair of hard bias layers for aligning the magnetization direction of the free magnetic layer in the direction substantially orthogonal to the magnetization direction of the pinned magnetic layer; and a pair of electrode layers for applying a sensing current to the pinned magnetic layer, the nonmagnetic conductive layer, and the free magnetic layer. The magnetic read track width Tw is set at 0.4 µm or less. At least a part of the free magnetic layer is composed of an NiFe alloy, and the Ni content $C_{Ni}$ is in the range of 70.2 to 89.9 atomic percent.

Preferably, the magnetic read track width Tw (µm) and the Ni content $C_{Ni}$ (at. %), which are shown in accompanying FIG. 1 as point (Tw, $C_{Ni}$), are within the range obtained by linking point $A_1$ (0.4, 89.9), point $B_1$ (0.35, 89), point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), point $V_1$ (0.3, 73.6), point $W_1$ (0.35, 75.6), and point $X_1$ (0.4, 77.3).

Preferably, the magnetic read track width Tw (µm) and the Ni content $C_{Ni}$ (at. %), which are shown in accompanying FIG. 2 as point (Tw, $C_{Ni}$), are within the range obtained by linking point $A_2$ (0.4, 83.7), point $B_2$ (0.35, 83.9), point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), point $V_2$ (0.3, 75.6), point $W_2$ (0.35, 76.5), and point $X_2$ (0.4, 77.3).

Preferably, the magnetic read track width Tw ($\mu$m) and the Ni content $C_{Ni}$ (at. %), which are shown in accompanying FIG. 3 as point (Tw, $C_{Ni}$), are within the range obtained by linking point $B_1$ (0.35, 89), point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), point $V_1$ (0.3, 73.6), and point $W_1$ (0.35, 75.6).

Preferably, the magnetic read track width Tw ($\mu$m) and the Ni content $C_{Ni}$ (at. %), which are shown in accompanying FIG. 4 as point (Tw, $C_{Ni}$), are within the range obtained by linking point $B_2$ (0.35, 83.9), point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), point $V_2$ (0.3, 75.6), and point $W_2$ (0.35, 76.5).

Preferably, the magnetic read track width Tw ($\mu$m) and the Ni content $C_{Ni}$ (at. %), which are shown in accompanying FIG. 5 as point (Tw, $C_{Ni}$), are within the range obtained by linking point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), and point $V_1$ (0.3, 73.6).

Preferably, the magnetic read track width Tw ($\mu$m) and the Ni content $C_{Ni}$ (at. %), which are shown in accompanying FIG. 6 as point (Tw, $C_{Ni}$), are within the range obtained by linking point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), and point $V_2$ (0.3, 75.6).

Preferably, the magnetic read track width Tw ($\mu$m) and the Ni content $C_{Ni}$ (at. %), which are shown in accompanying FIG. 7 as point (Tw, $C_{Ni}$), are within the range obtained by linking point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), pint $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), and point $U_1$ (0.25, 71.5).

Preferably, the magnetic read track width Tw ($\mu$m) and the Ni content $C_{Ni}$ (at. %), which are shown in accompanying FIG. 8 as point (Tw, $C_{Ni}$), are within the range obtained by linking point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), and point $U_2$ (0.25, 74).

Preferably, the magnetic read track width Tw ($\mu$m) and the Ni content $C_{Ni}$ (at. %), which are shown in accompanying FIG. 9 as point (Tw, $C_{Ni}$), are within the range obtained by linking point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), and point $S_1$ (0.20, 70.2).

Preferably, the magnetic read track width Tw ($\mu$m) and the Ni content $C_{Ni}$ (at. %), which are shown in accompanying FIG. 10 as point (Tw, $C_{Ni}$), are within the range obtained by linking point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), and point $T_2$ (0.22, 73.6).

Preferably, the magnetic read track width Tw ($\mu$m) and the Ni content $C_{Ni}$ (at. %), which are shown in accompanying FIG. 11 as point (Tw, $C_{Ni}$), are within the range obtained by linking point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$(0.17, 70.2), point $Q_1$ (0.18, 70.2), and point $R_1$ (0.19, 70.2).

Preferably, the magnetic read track width Tw (∥m) and the Ni content $C_{Ni}$ (at. %), which are shown in accompanying FIG. 12 as point (Tw, $C_{Ni}$), are within the range obtained by linking point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), and point $S_2$ (0.20, 72.5).

Preferably, the magnetic read track width Tw ($\mu$m) and the Ni content $C_{Ni}$ (at. %), which are shown in accompanying FIG. 13 as point (Tw, $C_{Ni}$), are within the range obtained by linking point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), and point $Q_1$ (0.18, 70.2).

Preferably, the magnetic read track width Tw ($\mu$m) and the Ni content $C_{Ni}$ (at. %), which are shown in accompanying FIG. 14 as point (Tw, $C_{Ni}$), are within the range obtained by linking point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), and point $R_2$ (0.19, 72).

Preferably, the magnetic read track width Tw ($\mu$m) and the Ni content $C_{Ni}$ (at. %), which are shown in accompanying FIG. 15 as point (Tw, $C_{Ni}$), are within the range obtained by linking point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), and point $P_1$ (0.17, 70.2).

Preferably, the magnetic read track width Tw ($\mu$m) and the Ni content $C_{Ni}$ (at. %), which are shown in accompanying FIG. 16 as point (Tw, $C_{Ni}$), are within the range obtained by linking point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), and point $Q_2$ (0.18, 71.7).

Preferably, the magnetic read track width Tw ($\mu$m) and the Ni content $C_{Ni}$ (at. %), which are shown in accompanying FIG. 17 as point (Tw, $C_{Ni}$), are within the range obtained by linking point $J_1$ (0.15, 77.3), point $K_1$ (0.13, 76.8), point $L_1$ (0.1, 75), point $M_1$ (0.1, 70.2), point $N_1$ (0.13, 70.2), and point $O_1$ (0.15, 70.2).

Preferably, the magnetic read track width Tw ($\mu$m) and the Ni content $C_{Ni}$ (at. %), which are shown in accompanying FIG. 18 as point (Tw, $C_{Ni}$), are within the range obtained by linking point $J_2$ (0.15, 78.4), point $K_2$ (0.13, 76.5), point $L_2$ (0.1, 75), point $M_2$ (0.1, 70.6), point $N_2$ (0.13, 70.6), and point $O_2$ (0.15, 70.6).

Preferably, the magnetic read track width Tw ($\mu$m) and the Ni content $C_{Ni}$ (at. %), which are shown in accompanying FIG. 19 as point (Tw, $C_{Ni}$), are within the range obtained by linking point $K_1$ (0.13, 76.8), point $L_1$ (0.1, 75), point $M_1$ (0.1, 70.2), and point $N_1$ (0.13, 70.2).

Preferably, the magnetic read track width Tw ($\mu$m) and the Ni content $C_{Ni}$ (at. %), which are shown in accompanying FIG. 20 as point (Tw, $C_{Ni}$), are within the range obtained by linking point $K_2$ (0.13, 76.5), point $L_2$ (0.1, 75), point $M_2$ (0.1, 70.6), and point $N_2$ (0.13, 70.6).

In the spin-valve thin-film magnetic element of the present invention, preferably, the antiferromagnetic layer, the pinned magnetic layer, the nonmagnetic conductive layer, and the free magnetic layer are deposited in that order on the substrate.

Preferably, the antiferromagnetic layer is composed of one of an X—Mn alloy and a Pt—Mn—X' alloy, where X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

In the spin-valve thin-film magnetic element of the present invention, at least one of the pinned magnetic layer and the free magnetic layer may be divided into two sublayers by a nonmagnetic intermediate layer to produce a ferrimagnetic state in which the magnetization directions of the sublayers are antiparallel to each other.

In the spin-valve thin-film magnetic element of the present invention, preferably, the ratio of the width in the read track width direction of the free magnetic layer to the height in the element height direction of the free magnetic layer is approximately 1:1 to 3:2.

In another aspect of the present invention, a thin-film magnetic head is provided with the spin-valve thin-film magnetic element described above.

Generally, with respect to a spin-valve thin-film magnetic element having a track width of approximately 1 $\mu$m, in a laminate, for example, formed by depositing an antiferromagnetic layer, a pinned magnetic layer, a nonmagnetic conductive layer, and a free magnetic layer, the entire laminate does not exhibit a magnetoresistance effect. Only the central region thereof has superior read sensitivity, and the central region substantially exhibits the magnetoresistance effect.

The region having superior read sensitivity is referred to as a sensitive region, and regions having poor read sensitivity at both sides of the sensitive region are referred to as insensitive regions. The sensitive region and the insensitive regions in the laminate are determined by a microtrack profile method.

The microtrack profile method will be described below with reference to FIG. 41.

As shown in FIG. 41, a conventional spin-valve thin-film magnetic element including a laminate exhibiting a magnetoresistance effect, hard bias layers disposed at both sides of the laminate, and electrode layers disposed on the hard bias layers, in which magnetostriction is negligible, is formed on a substrate.

Next, a width A of the upper surface of the laminate is determined by an optical microscope or a scanning electron microscope. The width A is defined as a track width Tw determined by an optical method (hereinafter referred to as an optical track width O-Tw), and it is set at approximately 1 $\mu$m.

A predetermined signal, as a microtrack, is recorded on a magnetic recording medium, and by moving the spin-valve thin-film magnetic element over the microtrack in the track width direction, the relationship between the width A of the laminate and the read output is measured. Alternatively, the magnetic recording medium provided with the microtrack may be moved over the spin-valve thin-film magnetic element in the track width direction to measure the relationship between the width A of the laminate and the read output. A measurement result is shown in the bottom of FIG. 41.

According to the measurement result, the read output is high in the central region of the laminate, and is low in the side regions of the laminate. As is obvious from this result, the central region exhibits a satisfactory magnetoresistance effect and contributes to reading, while the magnetoresistance effect is deteriorated in the side regions, resulting in poor read output, and contribution to reading is low.

Generally, as shown in FIG. 41, a region corresponding to a width B of the upper surface of the laminate in which a read output of 50% or more relative to the maximum read output is generated is defined as a sensitive region, and regions, each corresponding to a width C of the upper surface of the laminate in which a read output below 50% relative to the maximum read output is generated, are defined as insensitive regions. Herein, the insensitive regions mean the regions in which rotation of the variable magnetization of a free magnetic layer is blunted due to a magnetic field from the hard bias layers, and do not correspond to a difference between the physical track width and the optical track width.

The spin-valve thin-film magnetic element of the present invention includes a laminate including an antiferromagnetic layer; a pinned magnetic layer in contact with the antiferromagnetic layer, the magnetization direction of the pinned magnetic layer being pinned by an exchange coupling magnetic field with the antiferromagnetic layer; and a free magnetic layer formed in contact with the pinned magnetic layer with a nonmagnetic conductive layer therebetween, the magnetization direction of the free magnetic layer being aligned in a direction substantially orthogonal to the magnetization direction of the pinned magnetic layer. At both sides of the laminate in the track width direction, hard bias layers for aligning the magnetization direction of the free magnetic layer in the direction substantially orthogonal to the magnetization direction of the pinned magnetic layer and a pair of electrode layers for applying a sensing current to the vicinity of the free magnetic layer are disposed. The magnetic read track width Tw defined by the microtrack profile method is set at 0.4 $\mu$m or less. At least a part of the free magnetic layer is composed of an NiFe alloy, and the Ni content $C_{Ni}$ is in the range of 70.2 to 89.9 atomic percent. Consequently, it is possible to improve the read output of the spin-valve thin-film magnetic element decreased due to track narrowing.

In the spin-valve thin-film magnetic element, when the track width is 0.4 μm or less, the read output, as it is, is lower compared to the case in which the track width is set at approximately 1 μm. However, in the present invention, in order to improve the read output by the inverse magnetostrictive effect, the composition of the free magnetic layer is specified.

The relationship between magnetostriction and the output of the spin-valve thin-film magnetic element will now be described.

In general, stress applied to a film planarly formed is substantially isotropic in the in-plane direction. However, in a film in which a part thereof is open by cutting, such as in an ABS, the stress distribution is anisotropic in the in-plane direction. For example, in such a case, tensile stress is applied anisotropically to the free magnetic layer in the element height direction (stripe height direction).

When the magnetostriction of a magnetic member, i.e., the free magnetic layer, is zero, magnetostriction does not occur when the free magnetic layer is magnetized. Therefore, the magnetic anisotropy induced by the magnetostriction of the free magnetic layer is isotropic.

However, when the magnetostriction is set to be positive, i.e., elongation occurs in the magnetized direction, the magnetization is easily oriented in the direction of the tensile stress applied due to the inverse magnetostriction, and magnetic anisotropy is exhibited. That is, in the free magnetic layer to which the tensile stress is applied, the direction of the tensile stress can be set as an easy magnetization axis.

Although the magnetization of the free magnetic layer is pinned in the track width direction by the magnetic field from the hard bias layers, since the free magnetic layer has magnetic anisotropy in the element height direction, the magnetization is relatively easily rotated in the easy magnetization axis direction, i.e., in the element height direction, against (overcoming) the magnetic field from the hard bias layers.

Consequently, in the spin-valve thin-film magnetic element, since a change in resistance is easily caused by the magnetoresistance effect exhibited because of the rotation of the variable magnetization direction of the free magnetic layer relative to the pinned magnetization direction of the pinned magnetic layer, an increase in read output can be expected.

On the other hand, in the spin-valve thin-film magnetic element in which the track width is set at 0.4 μm or less as described above, when the magnetization of the free magnetic layer is aligned in the track width direction under the influence of the hard bias layers, since the free magnetic layer does not have a region which is sufficiently distant from the hard bias layers for producing a sensitive region, significant variations in the influence of the hard bias layers on the free magnetic layer in the track width direction are avoided compared to the case in which the track width is wider than 0.4 μm.

Consequently, by setting the Ni content $C_{Ni}$ in the NiFe alloy constituting the free magnetic layer as described above, it is possible to set the magnetostriction λs of the free magnetic layer in the element height direction in the range of $-7.0 \times 10^{-6}$ to $2.0 \times 10^{-5}$, and it is also possible to prevent the easy magnetization rotation of the variable magnetization of the free magnetic layer from having a distribution in the track width direction so as to produce domain walls, resulting in an unstable domain, in comparison with the case in which the track width is wide.

Therefore, the free magnetic layer does not have regions with varied sensitivity in the track width direction, and single-domain alignment of the free magnetic layer is not obstructed by domain walls, thus nonuniform magnetization is prevented, and it is possible to avoid Barkhausen noise, etc., which results in instability wherein signals from a magnetic recording medium are inaccurately processed in the spin-valve thin-film magnetic element.

In the present invention, if the magnetic read track width Tw is more than 0.4 μm, as described above, domain walls may be produced in the free magnetic layer, and if the Ni content $C_{Ni}$ is less than 70.2 atomic percent, the coercive force from the hard bias layers in the free magnetic layer is approximately 400 A/m or more, thus soft magnetic properties of the free magnetic layer are degraded. If the Ni content $C_{Ni}$ is more than 89.9 atomic percent, read output in a low frequency band of approximately 10 to 20 MHz is decreased to less than the practical lower limit of 1.2 mV.

When the Ni content $C_{Ni}$ (at. %) is set as described above, if the magnetostriction λs of the free magnetic layer is less than $-7.0 \times 10^{-6}$, the variable magnetization of the free magnetic layer is pinned more firmly than necessary and is not rotated with high sensitivity relative to an applied external magnetic field, and read output in a low frequency band of approximately 10 to 20 MHz is decreased to less than the practical lower limit of 1.2 mV. If the magnetostriction λs is more than $2.0 \times 10^{-5}$, the coercive force in the free magnetic layer is approximately 400 A/m, degrading soft magnetic properties of the free magnetic layer.

In the present invention, the magnetic read track width Tw (μm) and the Ni content $C_{Ni}$ (at. %), which are shown in FIG. 1 as point (Tw, $C_{Ni}$), may be set within the range obtained by linking point $A_1$ (0.4, 89.9), point $B_1$ (0.35, 89), point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), point $V_1$ (0.3, 73.6), point $W_1$ (0.35, 75.6), and point $X_1$ (0.4, 77.3). Consequently, it is possible to set the magnetic read track width Tw (μm) and the magnetostriction λs ($\times 10^{-6}$) of the free magnetic layer, which are shown in FIG. 42 as point (Tw, λs), within the range obtained by linking point $SA_1$ (0.4, 6), point $SB_1$ (0.35, 8), point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), point $SS_1$ (0.25, −3), point $ST_1$ (0.3, −5), point $SU_1$ (0.35, −6.3), and point $SV_1$ (0.4, −7).

FIGS. 42 and 43 are graphs showing the ranges of the magnetic read track width Tw (μm) and the magnetostriction λs ($\times 10^{-6}$) of the free magnetic layer in the present invention.

If the magnetic read track width Tw (μm) and the Ni content $C_{Ni}$ (at. %) are outside of the range described above, problems as described below may be caused.

1. If the magnetic read track width Tw is set to the right of point $A_1$ and point $X_1$ in FIG. 1, as described above, domain walls may be produced in the free magnetic layer, resulting in Barkhausen noise, etc., which causes instability.

2. If the magnetic read track width Tw (μm) and the Ni content $C_{Ni}$ are above the polygonal line obtained by linking point $A_1$, point $B_1$, point $C_1$, point $D_1$, point $E_1$, point $F_1$, point $G_1$, point $H_1$, point $I_1$, point $J_1$, point $K_1$, and point $L_1$, the variable magnetization of the free magnetic layer is more firmly pinned than necessary by the hard bias layers and is not rotated with high sensitivity relative to an applied external magnetic field, and read output in a low frequency band of approximately 10 to 20 MHz is decreased to less than the practical lower limit of 1.2 mV.

3. If the Ni content $C_{Ni}$ is below point $M_1$, point $N_1$, point $O_1$, point $P_1$, point $Q_1$, point $R_1$, point $S_1$, and point $T_1$, the coercive force in the free magnetic layer is increased to approximately 400 A/m or more, and the soft magnetic properties of the free magnetic layer are degraded, resulting in an increase in distortion of regenerated waveforms and instability.

4. If the magnetic read track width Tw ($\mu$m) and the Ni content $C_{Ni}$ are below the polygonal line obtained by linking point $T_1$, point $U_1$, point $V_1$, point $W_1$, and point $X_1$, read output in a low frequency band of approximately 10 to 20 MHz is increased to more than the practical upper limit of 2.0 mV, and instability in regenerated waveform may be increased.

When the track width is less than 0.1 $\mu$m, since it is difficult to obtain output even if the magnetostriction is increased as in the case of the present invention, it is unlikely that the hard bias system itself in which the magnetization direction of the free magnetic layer is aligned by the hard bias layers will be used. Therefore, in the present invention, the track width is set at 0.1 $\mu$m or more.

In the present invention, the magnetic read track width Tw ($\mu$m) and the Ni content $C_{Ni}$ (at. %), which are shown in FIG. 2 as point (Tw, $C_{Ni}$), may be within the range obtained by linking point $A_2$ (0.4, 83.7), point $B_2$ (0.35, 83.9), point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), point $V_2$ (0.3, 75.6), point $W_2$ (0.35, 76.5), and point $X_2$ (0.4, 77.3). Consequently, it is possible to set the magnetic read track width Tw ($\mu$m) and the magnetostriction $\lambda$s ($\times 10^{-6}$) of the free magnetic layer, which are shown in FIG. 43 as point (Tw, $\lambda$s), within the range obtained by linking point $SA_2$ (0.4, 6), point $SB_2$ (0.35, 6), point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, -0.5), point $SS_2$ (0.25, -1), point $ST_2$ (0.3, -1.5), point $SU_2$ (0.35, -1.6), and point $SV_2$ (0.4, -1.5).

If the magnetic read track width Tw ($\mu$m) and the Ni content $C_{Ni}$ (at. %) are outside of the range described above, problems as described below may be caused.

1. If the magnetic read track width Tw is set to the right side of the line obtained by linking point $A_2$ and point $X_2$ in FIG. 2, as described above, domain walls may be formed in the free magnetic layer, resulting in Barkhausen noise, etc., which causes instability.

2. If the magnetic read track width Tw ($\mu$m) and the Ni content $C_{Ni}$ are above the polygonal line obtained by linking point $A_2$, point $B_2$, point $C_2$, point $D_2$, point $E_2$, point $F_2$, point $G_2$, point $H_2$, point $J_2$, point $K_2$, and point $L_2$, the variable magnetization of the free magnetic layer is more firmly pinned than necessary by the hard bias layers and is not rotated with high sensitivity relative to an applied external magnetic field, and read output in a low frequency band of approximately 10 to 20 MHz is decreased to less than the practical lower limit of 1.2 mV.

Furthermore, within the range delimited by the polygonal line obtained by linking point $A_2$ to point $L_2$, it is not necessary to decrease the product of the remanence and the thickness of the hard bias layers for stabilizing the variable magnetization of the free magnetic layer to less than the value required for more reliably avoiding the instability in regenerated waveform as the track width is decreased.

3. If the Ni content $C_{Ni}$ is below point $M_2$, point $N_2$, and point $O_2$, the coercive force in the free magnetic layer is increased to approximately 400 A/m or more, and the soft magnetic properties of the free magnetic layer are degraded, resulting in an increase in distortion of regenerated waveforms and instability.

4. If the magnetic read track width Tw ($\mu$m) and the Ni content $C_{Ni}$ are below the polygonal line obtained by linking point $O_2$, point $Q_2$, point $R_2$, point $S_2$, point $T_2$, point $U_2$, point $V_2$, point $W_2$, and point $X_2$, read output in a low frequency band of approximately 10 to 20 MHz is increased to more than the practical upper limit of 2.0 mV, and instability in regenerated waveform may be increased.

Furthermore, by setting the range inside point $E_2$ and point $V_2$, the product of the remanence and the thickness of the hard bias layers for stabilizing the variable magnetization of the free magnetic layer may become small as the track width is decreased, and magnetic read track width can be controlled more precisely.

It is known that the magnetostriction of an NiFe alloy film in a bulk solid state is greatly influenced by the composition of the NiFe alloy film. It is also known that, if nonmagnetic atoms are added to an NiFe alloy in a bulk solid state, magnetostriction changes depending on the amount of the nonmagnetic atoms added and the type of the nonmagnetic atoms.

As is the case with the free magnetic layer in the spin-valve thin-film magnetic element, when an NiFe alloy film or a laminate including an NiFe alloy film and a CoFe alloy film is formed at a small thickness of several tens of atoms, and a nonmagnetic film is formed on the upper and the lower surface thereof, since nonmagnetic atoms (Ta and Cu) and ferromagnetic atoms (Ni and Fe) are directly brought into contact with each other, the magnetostriction of the ferromagnetic atoms of the NiFe alloy film directly in contact with the nonmagnetic atoms changes. The change in magnetostriction between when the nonmagnetic atoms comprise Ta and when the nonmagnetic atoms comprise Cu is different. Therefore, in each of a top-type spin-valve thin-film magnetic element (in which a PtMn layer is arranged on the top), a bottom-type spin-valve thin-film magnetic element (in which a PtMn layer is arranged on the bottom), and a dual spin-valve thin-film magnetic element, it is possible to define the compositional range of an NiFe alloy film, which constitutes at least a part of the free magnetic layer, required for optimizing the magnetostriction of the free magnetic layer.

By annealing the spin-valve thin-film magnetic element, a thermal diffusion layer is formed at the interface between the NiFe alloy film of the free magnetic layer and the nonmagnetic film composed of Ta, Cu, or the like, and more ferromagnetic atoms in the NiFe alloy film are brought into contact with the nonmagnetic atoms disposed above and below. Although the thickness of the thermal diffusion layer between the NiFe alloy film and the nonmagnetic film depends on the annealing temperature, the annealing time, the type of the nonmagnetic film, and whether the nonmagnetic film is disposed above or below the NiFe alloy film, it does not substantially depend on the thickness of the NiFe alloy film, and the proportion of the thermal diffusion layer in the NiFe alloy film is increased as the thickness of the NiFe alloy film is decreased. Consequently, as the thickness of the NiFe alloy film is decreased, the influence of the magnetostriction changed by the formation of the thermal diffusion layer is increased. Therefore, if the thickness of the NiFe alloy film is changed, the magnetostriction changes. For the same reason, if annealing treatment is performed, the magnetostriction changes.

Even if the NiFe alloy films have the same composition and thickness, and are annealed under the same conditions, since the nonmagnetic materials sandwiching the NiFe alloy films of the top-type or bottom-type spin-valve thin-film magnetic element and of the dual-type spin-valve thin-film magnetic element are different, the NiFe alloy films, which constitute at least some of the free magnetic layers required for optimizing the magnetostriction of the free magnetic layers, have different compositional ranges. On the other hand, with respect to the top-type spin-valve film and the bottom-type spin-valve film, although the same nonmagnetic material is used for the films formed above and below the NiFe alloy films, since the deposition orders are the opposite of each other, different lattice mismatch (coherency) occurs at the interface. Thereby, the proportion of the ferromagnetic atoms and nonmagnetic atoms directly in contact with each other and the contact state are different, and the thermal diffusivity at the interface is different. Therefore, the compositional range of the NiFe alloy film, which constitutes at least a part of the free magnetic layer, required for optimizing the magnetostriction of the free magnetic layer is different.

In the present invention, in consideration of the above situation, the magnetic read track width Tw ($\mu$m) and the Ni content $C_{Ni}$ in the NiFe alloy constituting at least a part of the free magnetic layer are defined.

In the present invention, the magnetic read track width Tw ($\mu$m) and the Ni content $C_{Ni}$ (at. %), which are shown in FIG. 3 as point (Tw, $C_{Ni}$), may be within the range obtained by linking point $B_1$ (0.35, 89), point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), point $V_1$ (0.3, 73.6), and point $W_1$ (0.35, 75.6). If the above range is satisfied, it is possible to set the magnetostriction $\lambda$s of the free magnetic layer within the range defined by the corresponding track width range in FIG. 42. Consequently, in particular, in a magnetic head with a read track width of 0.35 $\mu$m or less, necessary read output is ensured while distortion of regenerated waveforms and instability are suppressed.

In the present invention, the magnetic read track width Tw ($\mu$m) and the Ni content $C_{Ni}$ (at. %), which are shown in FIG. 4 as point (Tw, $C_{Ni}$), may be within the range obtained by linking point $B_2$ (0.35, 83.9), point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), point $V_2$ (0.3, 75.6), and point $W_2$ (0.35, 76.5). If the above range is satisfied, it is possible to set the magnetostriction $\lambda$s of the free magnetic layer within the range defined by the corresponding track width range in FIG. 43. Consequently, in particular, in a magnetic head with a read track width of 0.35 $\mu$m or less, distortion of regenerated waveforms and instability are effectively suppressed, and necessary read output is ensured while the hard bias layers are set so that the product of the remanence and the thickness of the hard bias layers is suitable for controlling the magnetic read track width.

In the present invention, the magnetic read track width Tw ($\mu$m) and the Ni content $C_{Ni}$ (at. %), which are shown in FIG. 5 as point (Tw, $C_{Ni}$), may be within the range obtained by linking point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), and point $V_1$ (0.3, 73.6). If the above range is satisfied, it is possible to set the magnetostriction $\lambda$s of the free magnetic layer within the range defined by the corresponding track width range in FIG. 42. Consequently, in particular, in a magnetic head with a read track width of 0.3 $\mu$m or less, necessary read output is ensured while distortion of regenerated waveforms and instability are suppressed.

In the present invention, the magnetic read track width Tw ($\mu$m) and the Ni content $C_{Ni}$ (at. %), which are shown in FIG. 6 as point (Tw, $C_{Ni}$), may be within the range obtained by linking point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), and point $V_2$ (0.3, 75.6). If the above range is satisfied, it is possible to set the magnetostriction $\lambda$s of the free magnetic layer within the range defined by the corresponding track width range in FIG. 43. Consequently, in particular, in a magnetic head with a read track width of 0.3 $\mu$m or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw ($\mu$m) and the Ni content $C_{Ni}$ (at. %), which are shown in FIG. 7 as point (Tw, $C_{Ni}$), may be within the range obtained by linking point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), and point $U_1$ (0.25, 71.5). If the above range is satisfied, it is possible to set the magnetostriction $\lambda$s of the free magnetic layer within the range defined by the corresponding track width range in FIG. 42. Consequently, in particular, in a magnetic head with a read track width of 0.25 $\mu$m or less, necessary read output is ensured while distortion of regenerated waveforms and instability are suppressed.

In the present invention, the magnetic read track width Tw ($\mu$m) and the Ni content $C_{Ni}$ (at. %), which are shown in FIG. 8 as point (Tw, $C_{Ni}$), may be within the range obtained by linking point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), and point $U_2$ (0.25, 74). If the above range is satisfied, it is possible to set the magnetostriction λs of the free magnetic layer within the range defined by the corresponding track width range in FIG. 43. Consequently, in particular, in a magnetic head with a read track width of 0.25 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw (μm) and the Ni content $C_{Ni}$ (at. %), which are shown in FIG. 9 as point (Tw, $C_{Ni}$), may be within the range obtained by linking point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$(0.17, 70.2), point $Q_1$ (0.18, 70.2), point $R_1$ (0.19, 70.2), and point $S_1$ (0.20, 70.2). If the above range is satisfied, it is possible to set the magnetostriction λs of the free magnetic layer within the range defined by the corresponding track width range in FIG. 42. Consequently, in particular, in a magnetic head with a read track width of 0.25 μm or less, necessary read output is ensured while distortion of regenerated waveforms and instability are suppressed.

In the present invention, the magnetic read track width Tw (μm) and the Ni content $C_{Ni}$ (at. %), which are shown in FIG. 10 as point (Tw, $C_{Ni}$), may be within the range obtained by linking point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), and point $T_2$ (0.22, 73.6). If the above range is satisfied, it is possible to set the magnetostriction λs of the free magnetic layer within the range defined by the corresponding track width range in FIG. 43. Consequently, in particular, in a magnetic head with a read track width of 0.22 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw (μm) and the Ni content $C_{Ni}$ (at. %), which are shown in FIG. 11 as point (Tw, $C_{Ni}$), may be within the range obtained by linking point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), and point $R_1$ (0.19, 70.2). If the above range is satisfied, it is possible to set the magnetostriction λs of the free magnetic layer within the range defined by the corresponding track width range in FIG. 42. Consequently, in particular, in a magnetic head with a read track width of 0.19 μm or less, necessary read output is ensured while distortion of regenerated waveforms and instability are suppressed.

In the present invention, the magnetic read track width Tw (μm) and the Ni content $C_{Ni}$ (at. %), which are shown in FIG. 12 as point (Tw, $C_{Ni}$), may be within the range obtained by linking point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), and point $S_2$ (0.20, 72.5). If the above range is satisfied, it is possible to set the magnetostriction λs of the free magnetic layer within the range defined by the corresponding track width range in FIG. 43. Consequently, in particular, in a magnetic head with a read track width of 0.2 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw (μm) and the Ni content $C_{Ni}$ (at. %), which are shown in FIG. 13 as point (Tw, $C_{Ni}$), may be within the range obtained by linking point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), and point $Q_1$ (0.18, 70.2). If the above range is satisfied, it is possible to set the magnetostriction λs of the free magnetic layer within the range defined by the corresponding track width range in FIG. 42. Consequently, in particular, in a magnetic head with a read track width of 0.18 μm or less, necessary read output is ensured while distortion of regenerated waveforms and instability are suppressed.

In the present invention, the magnetic read track width Tw (μm) and the Ni content $C_{Ni}$ (at. %), which are shown in FIG. 14 as point (Tw, $C_{Ni}$), may be within the range obtained by linking point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), and point $R_2$ (0.19, 72). If the above range is satisfied, it is possible to set the magnetostriction λs of the free magnetic layer within the range defined by the corresponding track width range in FIG. 43. Consequently, in particular, in a magnetic head with a read track width of 0.19 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw (μm) and the Ni content $C_{Ni}$ (at. %), which are shown in FIG. 15 as point (Tw, $C_{Ni}$), may be within the range obtained by linking point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), and point $P_1$ (0.17, 70.2). If the above range is satisfied, it is possible to set the magnetostriction λs of the free magnetic layer within the range defined by the corresponding track width range in FIG. 42. Consequently, in particular, in a magnetic head with a read track width of 0.17 μm or less, necessary read output is ensured while distortion of regenerated waveforms and instability are suppressed.

In the present invention, the magnetic read track width Tw (μm) and the Ni content $C_{Ni}$ (at. %), which are shown in FIG. 16 as point (Tw, $C_{Ni}$), may be within the range obtained by linking point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), and point $Q_2$ (0.18, 71.7). If the above range is satisfied, it is possible to set the magnetostriction λs of the free magnetic layer within the range defined by the corresponding track width range in FIG. 43. Consequently, in particular, in a magnetic head with a read track width of 0.18 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw (μm) and the Ni content $C_{Ni}$ (at. %), which are shown in FIG. 17 as point (Tw, $C_{Ni}$), may be within the range obtained by linking point $J_1$ (0.15, 77.3), point $K_1$ (0.13, 76.8), point $L_1$ (0.1, 75), point $M_1$ (0.1, 70.2), point $N_1$ (0.13, 70.2), and point $O_1$ (0.15, 70.2). If the above range is satisfied, it is possible to set the magnetostriction λs of the free magnetic layer within the range defined by the corresponding track width range in FIG. 42. Consequently, in particular, in a magnetic head with a read track width of 0.15 μm or less, necessary read output is ensured while distortion of regenerated waveforms and instability are suppressed.

In the present invention, the magnetic read track width Tw (μm) and the Ni content $C_{Ni}$ (at. %), which are shown in FIG. 18 as point (Tw, $C_{Ni}$) may be within the range obtained by linking point $J_2$ (0.15, 78.4), point $K_2$ (0.13, 76.5), point $L_2$ (0.1, 75), point $M_2$ (0.1, 70.6), point $N_2$ (0.13, 70.6), and point $O_2$ (0.15, 70.6). If the above range is satisfied, it is possible to set the magnetostriction λs of the free magnetic layer within the range defined by the corresponding track width range in FIG. 43. Consequently, in particular, in a magnetic head with a read track width of 0.15 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw (μm) and the Ni content $C_{Ni}$ (at. %), which are shown in FIG. 19 as point (Tw, $C_{Ni}$), may be within the range obtained by linking point $K_1$ (0.13, 76.8), point $L_1$ (0.1, 75), point $M_1$ (0.1, 70.2), and point $N_1$ (0.13, 70.2). If the above range is satisfied, it is possible to set the magnetostriction λs of the free magnetic layer within the range defined by the corresponding track width range in FIG. 42. Consequently, in particular, in a magnetic head with a read track width of 0.13 μm or less, necessary read output is ensured while distortion of regenerated waveforms and instability are suppressed.

In the present invention, the magnetic read track width Tw (μm) and the Ni content $C_{Ni}$ (at. %), which are shown in FIG. 20 as point (Tw, $C_{Ni}$), may be within the range obtained by linking point $K_2$ (0.13, 76.5), point $L_2$ (0.1, 75), point $M_2$ (0.1, 70.6), and point $N_2$ (0.13, 70.6). If the above range is satisfied, it is possible to set the magnetostriction λs of the free magnetic layer within the range defined by the corresponding track width range in FIG. 43. Consequently, in particular, in a magnetic head with a read track width of 0.125 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In another aspect of the present invention, a spin-valve thin-film magnetic element includes a substrate; an antiferromagnetic layer; a pinned magnetic layer in contact with the antiferromagnetic layer, the magnetization direction of the pinned magnetic layer being pinned by an exchange coupling magnetic field with the antiferromagnetic layer; a free magnetic layer formed in contact with the pinned magnetic layer with a nonmagnetic conductive layer therebetween, the magnetization direction of the free magnetic layer being aligned in a direction substantially orthogonal to the magnetization direction of the pinned magnetic layer; a pair of hard bias layers for aligning the magnetization direction of the free magnetic layer in the direction substantially orthogonal to the magnetization direction of the pinned magnetic layer; and a pair of electrode layers for applying a sensing current to the pinned magnetic layer, the nonmagnetic conductive layer, and the free magnetic layer. The magnetic read track width Tw is set at 0.4 μm or less. The magnetostriction λs of the free magnetic layer is in the range of $-7.0 \times 10^{-6}$ to $2.0 \times 10^{-5}$.

Preferably, the magnetic read track width Tw (μm) and the magnetostriction λs ($\times 10^{-6}$), which are shown in accompanying FIG. 42 as point (Tw, λs), are within the range obtained by linking point $SA_1$ (0.4, 6), point $SB_1$ (0.35, 8), point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), point $SS_1$ (0.25, −3), point $ST_1$ (0.3, −5), point $SU_1$ (0.35, −6.3), and point $SV_1$ (0.4, −7).

Preferably, the magnetic read track width Tw (μm) and the magnetostriction λs ($\times 10^{-6}$), which are shown in accompanying FIG. 43 as point (Tw, λs), are within the range obtained by linking point $SA_2$ (0.4, 6), point $SB_2$ (0.35, 6), point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), point $SS_2$ (0.25, −1), point $ST_2$ (0.3, −1.5), point $SU_2$ (0.35, −1.6), and point $SV_2$ (0.4, −1.5).

Preferably, the magnetic read track width Tw (μm) and the magnetostriction λs ($\times 10^{-6}$), which are shown in accompanying FIG. 42 as point (Tw, λs), are within the range obtained by linking point $SB_1$ (0.35, 8), point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), point $SS_1$ (0.25, −3), point $ST_1$ (0.3, −5), and point $SU_1$ (0.35, −6.3).

Preferably, the magnetic read track width Tw (μm) and the magnetostriction λs ($\times 10^{-6}$), which are shown in accompanying FIG. 43 as point (Tw, λs), are within the range obtained by linking point $SB_2$ (0.35, 6), point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), point $SS_2$ (0.25, −1), point $ST_2$ (0.3, −1.5), and point $SU_2$ (0.35, −1.6).

Preferably, the magnetic read track width Tw (μm) and the magnetostriction λs ($\times 10^{-6}$), which are shown in accompanying FIG. 42 as point (Tw, λs), are within the range obtained by linking point $SC_1$ (0.3, 12.5), point $SD_1$ (0.25, 18), point $SE_1$ (0.23, 20), point $SF_1$ (0.2, 20), point $SG_1$ (0.19, 20), point SH$_1$ (0.18, 20), point SI$_1$ (0.17, 20), point SJ$_1$ (0.15, 20), point SK$_1$ (0.1, 20), point SL$_1$ (0.1, 9), point SM$_1$ (0.15, 3.5), point SN$_1$ (0.17, 2), point SO$_1$ (0.18, 1), point SP$_1$ (0.19, 0), point SQ$_1$ (0.2, −0.7), point SR$_1$ (0.22, −2), point SS$_1$ (0.25, −3), and point ST$_1$ (0.3, −5).

Preferably, the magnetic read track width Tw ($\mu$m) and the magnetostriction $\lambda$s (×10$^{-6}$), which are shown in accompanying FIG. 43 as point (Tw, $\lambda$s), are within the range obtained by linking point SC$_2$ (0.3, 7.5), point SD$_2$ (0.25, 10.5), point SE$_2$ (0.23, 11), point SF$_2$ (0.22, 12), point SG$_2$ (0.2, 13.5), point SH$_2$ (0.19, 14.2), point SI$_2$ (0.18, 15.1), point SJ$_2$ (0.15, 17.5), point SW$_2$ (0.13, 20), point SK$_2$ (0.1, 20), point SL$_2$ (0.1, 9), point SX$_2$ (0.13, 5), point SM$_2$ (0.15, 3.5), point SN$_2$ (0.18, 1.5), point SO$_2$ (0.19, 1.2), point SP$_2$ (0.2, 1), point SQ$_2$ (0.22, 0), point SR$_2$ (0.23, −0.5), point SS$_2$ (0.25, −1), and point ST$_2$ (0.3, −1.5).

Preferably, the magnetic read track width Tw ($\mu$m) and the magnetostriction $\lambda$s (×10$^{-6}$), which are shown in accompanying FIG. 42 as point (Tw, $\lambda$s), are within the range obtained by linking point SD$_1$ (0.25, 18), point SE$_1$ (0.23, 20), point SF$_1$ (0.2, 20), point SG$_1$ (0.19, 20), point SH$_1$ (0.18, 20), point SI$_1$ (0.17, 20), point SJ$_1$ (0.15, 20), point SK$_1$ (0.1, 20), point SL$_1$ (0.1, 9), point SM$_1$ (0.15, 3.5), point SN$_1$ (0.17, 2), point SO$_1$ (0.18, 1), point SP$_1$ (0.19, 0), point SQ$_1$ (0.2, −0.7), point SR$_1$ (0.22, −2), and point SS$_1$ (0.25, −3).

Preferably, the magnetic read track width Tw ($\mu$m) and the magnetostriction $\lambda$s (×10$^{-6}$), which are shown in accompanying FIG. 43 as point (Tw, $\lambda$s), are within the range obtained by linking point SD$_2$ (0.25, 10.5), point SE$_2$ (0.23, 11), point SF$_2$ (0.22, 12), point SG$_2$ (0.2, 13.5), point SH$_2$ (0.19, 14.2), point SI$_2$ (0.18, 15.1), point SJ$_2$ (0.15, 17.5), point SW$_2$ (0.13, 20), point SK$_2$ (0.1, 20), point SL$_2$ (0.1, 9), point SX$_2$ (0.13, 5), point SM$_2$ (0.15, 3.5), point SN$_2$ (0.18, 1.5), point SO$_2$ (0.19, 1.2), point SP$_2$ (0.2, 1), point SQ$_2$ (0.22, 0), point SR$_2$ (0.23, −0.5), and point SS$_2$ (0.25, −1).

Preferably, the magnetic read track width Tw ($\mu$m) and the magnetostriction $\lambda$s (×10$^{-6}$), which are shown in accompanying FIG. 42 as point (Tw, $\lambda$s), are within the range obtained by linking point SF$_1$ (0.2, 20), point SG$_1$ (0.19, 20), point SH$_1$ (0.18, 20), point SI$_1$ (0.17, 20), point SJ$_1$ (0.15, 20), point SK$_1$ (0.1, 20), point SL$_1$ (0.1, 9), point SM$_1$ (0.15, 3.5), point SN$_1$ (0.17, 2), point SO$_1$ (0.18, 1), point SP$_1$ (0.19, 0), and point SQ$_1$ (0.2, −0.7).

Preferably, the magnetic read track width Tw ($\mu$m) and the magnetostriction $\lambda$s (×10$^{-6}$), which are shown in accompanying FIG. 43 as point (Tw, $\lambda$s), are within the range obtained by linking point SF$_2$ (0.22, 12), point SG$_2$ (0.2, 13.5), point SH$_2$ (0.19, 14.2), point SI$_2$ (0.18, 15.1), point SJ$_2$ (0.15, 17.5), point SW$_2$ (0.13, 20), point SK$_2$ (0.1, 20), point SL$_2$ (0.1, 9), point SX$_2$ (0.13, 5), point SM$_2$ (0.15, 3.5), point SN$_2$ (0.18, 1.5), point SO$_2$ (0.19, 1.2), point SP$_2$ (0.2, 1), and point SQ$_2$ (0.22, 0).

Preferably, the magnetic read track width Tw ($\mu$m) and the magnetostriction $\lambda$s (×10$^{-6}$), which are shown in accompanying FIG. 42 as point (Tw, $\lambda$s), are within the range obtained by linking point SG$_1$ (0.19, 20), point SH$_1$ (0.18, 20), point SI$_1$ (0.17, 20), point SJ$_1$ (0.15, 20), point SK$_1$ (0.1, 20), point SL$_1$ (0.1, 9), point SM$_1$ (0.15, 3.5), point SN$_1$ (0.17, 2), point SO$_1$ (0.18, 1), and point SP$_1$ (0.19, 0).

Preferably, the magnetic read track width Tw ($\mu$m) and the magnetostriction $\lambda$s (×10$^{-6}$), which are shown in accompanying FIG. 43 as point (Tw, $\lambda$s), are within the range obtained by linking point SG$_2$ (0.2, 13.5), point SH$_2$ (0.19, 14.2), point SI$_2$ (0.18, 15.1), point SJ$_2$ (0.15, 17.5), point SW$_2$ (0.13, 20), point SK$_2$ (0.1, 20), point SL$_2$ (0.1, 9), point SX$_2$ (0.13, 5), point SM$_2$ (0.15, 3.5), point SN$_2$ (0.18, 1.5), point SO$_2$ (0.19, 1.2), and point SP$_2$ (0.2, 1).

Preferably, the magnetic read track width Tw ($\mu$m) and the magnetostriction $\lambda$s (×10$^{-6}$), which are shown in accompanying FIG. 42 as point (Tw, $\lambda$s), are within the range obtained by linking point SH$_1$ (0.18, 20), point SI$_1$ (0.17, 20), point SJ$_1$ (0.15, 20), point SK$_1$ (0.1, 20), point SL$_1$ (0.1, 9), point SM$_1$ (0.15, 3.5), point SN$_1$ (0.17, 2), and point SO$_1$ (0.18, 1).

Preferably, the magnetic read track width Tw ($\mu$m) and the magnetostriction $\lambda$s (×10$^{-6}$), which are shown in accompanying FIG. 43 as point (Tw, $\lambda$s), are within the range obtained by linking point SH$_2$ (0.19, 14.2), point SI$_2$ (0.18, 15.1), point SJ$_2$ (0.15, 17.5), point SW$_2$ (0.13, 20), point SK$_2$ (0.1, 20), point SL$_2$ (0.1, 9), point SX$_2$ (0.13, 5), point SM$_2$ (0.15, 3.5), point SN$_2$ (0.18, 1.5), and point SO$_2$ (0.19, 1.2).

Preferably, the magnetic read track width Tw ($\mu$m) and the magnetostriction $\lambda$s (×10$^{-6}$), which are shown in accompanying FIG. 42 as point (Tw, $\lambda$s), are within the range obtained by linking point SI$_1$ (0.17, 20), point SJ$_1$ (0.15, 20), point SK$_1$ (0.1, 20), point SL$_1$ (0.1, 9), point SM$_1$ (0.15, 3.5), and point SN$_1$ (0.17, 2).

Preferably, the magnetic read track width Tw ($\mu$m) and the magnetostriction $\lambda$s (×10$^{-6}$), which are shown in accompanying FIG. 43 as point (Tw, $\lambda$s), are within the range obtained by linking point SI$_2$ (0.18, 15.1), point SJ$_2$ (0.15, 17.5), point SW$_2$ (0.13, 20), point SK$_2$ (0.1, 20), point SL$_2$ (0.1, 9), point SX$_2$ (0.13, 5), point SM$_2$ (0.15, 3.5), and point SN$_2$ (0.18, 1.5).

Preferably, the magnetic read track width Tw ($\mu$m) and the magnetostriction $\lambda$s (×10$^{-6}$), which are shown in accompanying FIG. 42 as point (Tw, $\lambda$s), are within the range obtained by linking point SJ$_1$ (0.15, 20), point SK$_1$ (0.1, 20), point SL$_1$ (0.1, 9), and point SM$_1$ (0.15, 3.5).

Preferably, the magnetic read track width Tw ($\mu$m) and the magnetostriction $\lambda$s (×10$^{-6}$), which are shown in accompanying FIG. 43 as point (Tw, $\lambda$s), are within the range obtained by linking point SJ$_2$ (0.15, 17.5), point SW$_2$ (0.13, 20), point SK$_2$ (0.1, 20), point SL$_2$ (0.1, 9), point SX$_2$ (0.13, 5), and point SM$_2$ (0.15, 3.5).

Preferably, the magnetic read track width Tw ($\mu$m) and the magnetostriction $\lambda$s (×10$^{-6}$), which are shown in accompanying FIG. 43 as point (Tw, $\lambda$s), are within the range obtained by linking point SW$_2$ (0.13, 20), point SK$_2$ (0.1, 20), point SL$_2$ (0.1, 9), and point SX$_2$ (0.13, 5).

In the spin-valve thin-film magnetic element of the present invention, preferably, the antiferromagnetic layer, the pinned magnetic layer, the nonmagnetic conductive layer, and the free magnetic layer are deposited in that order on the substrate.

Preferably, the antiferromagnetic layer is composed of one of an X-Mn alloy and a Pt—Mn—X' alloy, where X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

In the spin-valve thin-film magnetic element of the present invention, at least one of the pinned magnetic layer and the free magnetic layer may be divided into two sublayers by a nonmagnetic intermediate layer to produce a ferrimagnetic state in which the magnetization directions of the sublayers are antiparallel to each other.

In another aspect of the present invention, a thin-film magnetic head is provided with the spin-valve thin-film magnetic element described above.

Generally, with respect to a spin-valve thin-film magnetic element having a track width of approximately 1 μm, in a laminate, for example, formed by depositing an antiferromagnetic layer, a pinned magnetic layer, a nonmagnetic conductive layer, and a free magnetic layer, the entire laminate does not exhibit a magnetoresistance effect. Only the central region thereof has superior read sensitivity, and the central region substantially exhibits the magnetoresistance effect.

The region having superior read sensitivity is referred to as a sensitive region, and regions having poor read sensitivity at both sides of the sensitive region are referred to as insensitive regions. The sensitive region and the insensitive regions in the laminate are determined by a microtrack profile method.

The microtrack profile method will be described below with reference to FIG. 41.

As shown in FIG. 41, a conventional spin-valve thin-film magnetic element including a laminate exhibiting a magnetoresistance effect, hard bias layers disposed at both sides of the laminate, and electrode layers disposed on the hard bias layers, in which magnetostriction is negligible, is formed on a substrate.

Next, a width A of the upper surface of the laminate is determined by an optical microscope or a scanning electron microscope. The width A is defined as a track width Tw determined by an optical method (hereinafter referred to as an optical track width O-Tw), and it is set at approximately 1 μm.

A predetermined signal, as a microtrack, is recorded on a magnetic recording medium, and by moving the spin-valve thin-film magnetic element over the microtrack in the track width direction, the relationship between the width A of the laminate and the read output is measured. Alternatively, the magnetic recording medium provided with the microtrack may be moved over the spin-valve thin-film magnetic element in the track width direction to measure the relationship between the width A of the laminate and the read output. A measurement result is shown in the bottom of FIG. 41.

According to the measurement result, the read output is high in the central region of the laminate, and is low in the side regions of the laminate. As is obvious from this result, the central region exhibits a satisfactory magnetoresistance effect and contributes to reading, while the magnetoresistance effect is deteriorated in the side regions, resulting in poor read output, and contribution to reading is low.

Generally, as shown in FIG. 41, a region corresponding to a width B of the upper surface of the laminate in which a read output of 50% or more relative to the maximum read output is generated is defined as a sensitive region, and regions, each corresponding to a width C of the upper surface of the laminate in which a read output below 50% relative to the maximum read output is generated, are defined as insensitive regions. Herein, the insensitive regions mean the regions in which rotation of the variable magnetization of a free magnetic layer is blunted due to a magnetic field from the hard bias layers, and do not correspond to a difference between the physical track width and the optical track width.

The spin-valve thin-film magnetic element of the present invention includes a laminate including an antiferromagnetic layer; a pinned magnetic layer in contact with the antiferromagnetic layer, the magnetization direction of the pinned magnetic layer being pinned by an exchange coupling magnetic field with the antiferromagnetic layer; and a free magnetic layer formed in contact with the pinned magnetic layer with a nonmagnetic conductive layer therebetween, the magnetization direction of the free magnetic layer being aligned in a direction substantially orthogonal to the magnetization direction of the pinned magnetic layer. At both sides of the laminate in the track width direction, hard bias layers for aligning the magnetization direction of the free magnetic layer in the direction substantially orthogonal to the magnetization direction of the pinned magnetic layer and a pair of electrode layers for applying a sensing current to the vicinity of the free magnetic layer are disposed. The magnetic read track width Tw defined by the microtrack profile method is set at 0.4 μm or less. The magnetostriction λs of the free magnetic layer is in the range of $-7.0 \times 10^{-6}$ to $2.0 \times 10^{-5}$. Consequently, it is possible to improve the read output of the spin-valve thin-film magnetic element decreased due to track narrowing.

Herein, the track width direction means a direction parallel to the surface facing a medium (ABS) when the spin-valve thin-film magnetic element is formed as a thin-film magnetic head and parallel to the in-plane direction of the individual layers in the laminate. The element height direction means a direction orthogonal to the surface facing the medium.

In the spin-valve thin-film magnetic element, when the track width is 0.4 μm or less, the read output, as it is, is lower compared to the case in which the track width is set at approximately 1 μm. However, in the present invention, the read output is improved by the inverse magnetostrictive effect.

The relationship between magnetostriction and the output of the spin-valve thin-film magnetic element will be described.

In general, stress applied to a film planarly formed is substantially isotropic in the in-plane direction. However, in a film in which a part thereof is open by cutting, such as in the ABS of the free magnetic layer, the stress distribution is anisotropic in the in-plane direction. For example, in such a case, tensile stress is applied anisotropically to the free magnetic layer in the element height direction (stripe height direction).

When the magnetostriction of a magnetic member, i.e., the free magnetic layer, is zero, magnetostriction does not occur when the free magnetic layer is magnetized. Therefore, the magnetic anisotropy induced by the magnetostriction of the free magnetic layer is isotropic.

However, when the magnetostriction is set to be positive, i.e., elongation occurs in the magnetized direction, the magnetization is easily oriented in the direction of the tensile stress applied due to the inverse magnetostriction, and magnetic anisotropy is exhibited. That is, in the free magnetic layer to which the tensile stress is applied, the direction of the tensile stress can be set as an easy magnetization axis.

Although the magnetization of the free magnetic layer is pinned in the track width direction by the magnetic field from the hard bias layers, since the free magnetic layer has magnetic anisotropy in the element height direction, the magnetization is relatively easily rotated in the easy magnetization axis direction, i.e., in the element height direction, against (overcoming) the magnetic field from the hard bias layers.

Consequently, in the spin-valve thin-film magnetic element, since a change in resistance is easily caused by the magnetoresistance effect exhibited due to the rotation of the variable magnetization direction of the free magnetic layer relative to the pinned magnetization direction of the pinned magnetic layer, an increase in read output can be expected.

On the other hand, in the spin-valve thin-film magnetic element in which the track width is set at 0.4 μm or less as described above, when the magnetization of the free magnetic layer is aligned in the track width direction under the influence of the hard bias layers, since the free magnetic layer does not have a region which is sufficiently distant from the hard bias layers for producing a sensitive region, significant variations in the influence of the hard bias layers on the free magnetic layer in the track width direction are avoided compared to the case in which the track width is wider than 0.4 μm.

Consequently, by setting the magnetostriction λs as described above, it is possible to prevent the easy magnetization rotation of the variable magnetization of the free magnetic layer from having a large distribution in the track width direction so as to produce domain walls, resulting in an unstable domain, in comparison with the case in which the track width is wide.

Therefore, the free magnetic layer does not have regions with varied sensitivity in the track width direction, and single-domain alignment of the free magnetic layer is not obstructed by domain walls, thus nonuniform magnetization is prevented, and it is possible to avoid Barkhausen noise, etc., which results in instability wherein signals from a magnetic recording medium are inaccurately processed in the spin-valve thin-film magnetic element.

In the present invention, if the magnetic read track width Tw is more than 0.4 μm, as described above, domain walls may be produced in the free magnetic layer, and if the magnetostriction λs of the free magnetic layer is less than $-7.0 \times 10^{-6}$, the variable magnetization of the free magnetic layer is more firmly pinned than necessary by the hard bias layers and is not rotated with high sensitivity relative to an applied external magnetic field, and read output in a low frequency band of approximately 10 to 20 MHz is decreased to less than the practical lower limit of 1.2 mV. If the magnetostriction λs is more than $2.0 \times 10^{-5}$, the coercive force in the free magnetic layer is approximately 400 A/m or more, thus soft magnetic properties of the free magnetic layer are degraded.

In the present invention, the magnetic read track width Tw (μm) and the magnetostriction λs ($\times 10^{-6}$), which are shown in accompanying FIG. 42 as point (Tw, λs), may be within the range obtained by linking point $SA_1$ (0.4, 6), point $SB_1$ (0.35, 8), point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, -0.7), point $SR_1$ (0.22, -2), point $SS_1$ (0.25, -3), point $ST_1$ (0.3, -5), point $SU_1$ (0.35, -6.3), and point $SV_1$ (0.4, -7). If the magnetic read track width Tw and the magnetostriction λs are outside of the range described above, problems as described below may be caused.

1. If the magnetic read track width Tw is set to the right of point $SA_1$ and point $SV_1$, as described above, domain walls may be produced in the free magnetic layer, resulting in Barkhausen noise, etc., which causes instability.

2. If the magnetic read track width Tw and the magnetostriction λs are above the polygonal line obtained by linking point $SA_1$, point $SB_1$, point $SC_1$, point $SD_1$, and point $SE_1$, read output in a low frequency band of approximately 10 to 20 MHz is increased to more than the practical upper limit of 2.0 mV, and instability in regenerated waveform may be increased.

3. If the magnetostriction λs is above point $SE_1$, point $SF_1$, point $SG_1$, point $SH_1$, point $SI_1$, point $SJ_1$, and point $SK_1$, the coercive force in the free magnetic layer is increased to approximately 400 A/m or more, and the soft magnetic properties of the free magnetic layer are degraded, resulting in an increase in distortion of regenerated waveforms and instability.

4. If the magnetic read track width Tw and the magnetostriction λs are below the polygonal line obtained by linking point $SL_1$, point $SM_1$, point $SN_1$, point $SO_1$, point $SP_1$, point $SQ_1$, point $SR_1$, point $SS_1$, point $ST_1$, point $SU_1$, and point $SV_1$, the variable magnetization of the free magnetic layer is pinned more firmly than necessary and is not rotated with high sensitivity relative to an applied external magnetic field, and read output in a low frequency band of approximately 10 to 20 MHz is decreased to less than the practical lower limit of 1.2 mV.

Additionally, a track width of less than 0.1 μm is excluded from the present invention because it is difficult to obtain an output even if the magnetostriction is positively increased, and it is unlikely that the hard bias system itself in which the magnetization direction of the free magnetic layer is aligned by the hard bias layers will be used.

In the present invention, the magnetic read track width Tw (μm) and the magnetostriction λs ($\times 10^{-6}$), which are shown in FIG. 43 as point (Tw, λs), may be within the range obtained by linking point $SA_2$ (0.4, 6), point $SB_2$ (0.35, 6), point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, -0.5), point $SS_2$ (0.25, -1), point $ST_2$ (0.3, -1.5), point $SU_2$ (0.35, -1.6), and point $SV_2$ (0.4, -1.5). If the magnetic read track width Tw and the magnetostriction λs are outside of the range described above, problems as described below may be caused.

1. If the magnetic read track width Tw is set to the right of point $SA_2$ and point $SV_2$, as described above, domain walls may be produced in the free magnetic layer, resulting in Barkhausen noise, etc., which causes instability.

2. If the magnetic read track width Tw and the magnetostriction λs are above the polygonal line obtained by linking point $SA_2$, point $SB_2$, point $SC_2$, point $SD_2$, and point $SE_2$, point $SF_2$, point $SG_2$, point $SH_2$, point $SI_2$, point $SJ_2$, and point $SW_2$, read output in a low frequency band of approximately 10 to 20 MHz is increased to more than the practical upper limit of 2.0 mV, and instability in regenerated waveform may be increased.

Furthermore, within the range delimited by the polygonal line obtained by linking point $SA_2$ to point $SW_2$, the product of the remanence and the thickness of the hard bias layers for stabilizing the variable magnetization of the free magnetic layer can be decreased as the track width is decreased, which is more advantageous in view of controlling the magnetic read track width.

3. If the magnetostriction λs is above point $SW_2$ and point $SK_2$, the coercive force in the free magnetic layer is increased to approximately 400 A/m or more, and the soft magnetic properties of the free magnetic layer are degraded, resulting in an increase in distortion of regenerated waveforms and instability.

4. If the magnetic read track width Tw and the magnetostriction λs are below the polygonal line obtained by linking point $SL_2$, point $SX_2$, point $SM_2$, point $SN_2$, point $SO_2$, point $SP_2$, point $SQ_2$, point $SR_2$, point $SS_2$, point $ST_2$, point $SU_2$, and point $SV_2$, the variable magnetization of the free magnetic layer is pinned more firmly than necessary and is not rotated with high sensitivity relative to an applied external magnetic field, and read output in a low frequency band of approximately 10 to 20 MHz is decreased to less than the practical lower limit of 1.2 mV.

Furthermore, by setting the range to inside of point $SE_2$ and $SV_2$, it is not necessary to decrease the product of the remanence and the thickness of the hard bias layers for stabilizing the variable magnetization of the free magnetic layer to less than the value required for more reliably avoiding the instability in regenerated waveform as the track width is decreased.

When the read track width Tw is changed, a magnetic field from the hard bias layers which affects the free magnetic layer also changes, and the appropriate magnetostriction range of the free magnetic layer changes with the track width. In the present invention, by defining magnetostriction ranges of the free magnetic layer at various track widths, it is possible to prevent distortion of regenerated waveforms and instability, and necessary and sufficient read output is obtained.

Consequently, the magnetostriction can be controlled, and it is possible to improve the output characteristics of the spin-valve thin-film magnetic element as the track width is narrowed.

In the present invention, the magnetic read track width Tw ($\mu$m) and the magnetostriction $\lambda$s ($\times 10^{-6}$), which are shown in FIG. 42 as point (Tw, $\lambda$s), may be within the range obtained by linking point $SB_1$ (0.35, 8), point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), point $SS_1$ (0.25, −3), point $ST_1$ (0.3, −5), and point $SU_1$ (0.35, −6.3). Consequently, in particular, in a magnetic head with a read track width of 0.35 $\mu$m or less, necessary read output is ensured while distortion of regenerated waveforms and instability are suppressed.

In the present invention, the magnetic read track width Tw ($\mu$m) and the magnetostriction $\lambda$s ($\times 10^{-6}$), which are shown in FIG. 43 as point (Tw, $\lambda$s), may be within the range obtained by linking point $SB_2$ (0.35, 6), point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), point $SS_2$ (0.25, −1), point $ST_2$ (0.3, −1.5), and point $SU_2$ (0.35, −1.6). Consequently, in particular, in a magnetic head with a read track width of 0.35 $\mu$m or less, distortion of regenerated waveforms and instability are effectively suppressed, and necessary read output is ensured while the hard bias layers are set so that the product of the remanence and the thickness of the hard bias layers is suitable for controlling the magnetic read track width.

In the present invention, the magnetic read track width Tw ($\mu$m) and the magnetostriction $\lambda$s ($\times 10^{-6}$), which are shown in FIG. 42 as point (Tw, $\lambda$s), may be within the range obtained by linking point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), point $SS_1$ (0.25, −3), and point $ST_1$ (0.3, −5). Consequently, in particular, in a magnetic head with a track width of 0.3 $\mu$m or less, necessary read output is ensured while distortion of regenerated waveforms and instability are suppressed.

In the present invention, the magnetic read track width Tw ($\mu$m) and the magnetostriction $\lambda$s ($\times 10^{-6}$), which are shown in FIG. 43 as point (Tw, $\lambda$s), may be within the range obtained by linking point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), point $SS_2$ (0.25, −1), and point $ST_2$ (0.3, −1.5). Consequently, in particular, in a magnetic head with a read track width of 0.3 $\mu$m or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw ($\mu$m) and the magnetostriction $\lambda$s ($\times 10^{-6}$), which are shown in FIG. 42 as point (Tw, $\lambda$s), may be within the range obtained by linking point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), and point $SS_1$ (0.25, −3). Consequently, in particular, in a magnetic head with a read track width of 0.25 $\mu$m or less, necessary read output is ensured while distortion of regenerated waveforms and instability are suppressed.

In the present invention, the magnetic read track width Tw ($\mu$m) and the magnetostriction $\lambda$s ($\times 10^{-6}$), which are shown in FIG. 43 as point (Tw, $\lambda$s), may be within the range obtained by linking point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), and point $SS_2$ (0.25, −1). Consequently, in particular, in a magnetic head with a read track width of 0.25 $\mu$m or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw ($\mu$m) and the magnetostriction $\lambda$s ($\times 10^{-6}$), which are shown in FIG. 42 as point (Tw, $\lambda$s), may be within the range obtained by linking point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), and point $SQ_1$ (0.2, −0.7). Consequently, in particular, in a magnetic head with a read track width of 0.19 $\mu$m or less, necessary read output is ensured while distortion of regenerated waveforms and instability are suppressed.

In the present invention, the magnetic read track width Tw ($\mu$m) and the magnetostriction $\lambda$s ($\times 10^{-6}$), which are shown in FIG. 43 as point (Tw, λs), may be within the range obtained by linking point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), and point $SR_2$ (0.23, −0.5). Consequently, in particular, in a magnetic head with a read track width of 0.23 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw (μm) and the magnetostriction λs (×10$^{-6}$), which are shown in FIG. 42 as point (Tw, λs), may be within the range obtained by linking point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), and point $SP_1$ (0.19, 0). Consequently, in particular, in a magnetic head with a read track width of 0.18 μm or less, necessary read output is ensured while distortion of regenerated waveforms and instability are suppressed.

In the present invention, the magnetic read track width Tw (μm) and the magnetostriction λs (×10$^{-6}$), which are shown in FIG. 43 as point (Tw, λs), may be within the range obtained by linking point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), and point $SP_2$ (0.2, 1). Consequently, in particular, in a magnetic head with a read track width of 0.2 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw (μm) and the magnetostriction λs (×10$^{-6}$), which are shown in FIG. 42 as point (Tw, λs), may be within the range obtained by linking point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), and point $SO_1$ (0.18, 1). Consequently, in particular, in a magnetic head with a read track width of 0.17 μm or less, necessary read output is ensured while distortion of regenerated waveforms and instability are suppressed.

In the present invention, the magnetic read track width Tw (μm) and the magnetostriction λs (×10$^{-6}$), which are shown in FIG. 43 as point (Tw, λs), may be within the range obtained by linking point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), and point $SO_2$ (0.19, 1.2). Consequently, in particular, in a magnetic head with a read track width of 0.17 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw (μm) and the magnetostriction λs (×10$^{-6}$), which are shown in FIG. 42 as point (Tw, λs), may be within the range obtained by linking point $SI_1$ (0.17, 20), point $SJ_1$ (0.15, 20), point $SK_1$ (0.1, 20), point $SL_1$ (0.1, 9), point $SM_1$ (0.15, 3.5), and point $SN_1$ (0.17, 2). Consequently, in particular, in a magnetic head with a read track width of 0.15 μm or less, necessary read output is ensured while distortion of regenerated waveforms and instability are suppressed.

In the present invention, the magnetic read track width Tw (μm) and the magnetostriction λs (×10$^{-6}$), which are shown in FIG. 43 as point (Tw, λs), may be within the range obtained by linking point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), and point $SN_2$ (0.18, 1.5). Consequently, in particular, in a magnetic head with a read track width of 0.15 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the magnetic read track width Tw (μm) and the magnetostriction λs (×10$^{-6}$), which are shown in FIG. 42 as point (Tw, λs), may be within the range obtained by linking point $SJ_1$ (0.15, 20), point $SK_1$ (0.1, 20), point $SL_1$ (0.1, 9), and point $SM_1$ (0.15, 3.5). Consequently, in particular, in a magnetic head with a read track width of 0.13 μm or less, necessary read output is ensured while distortion of regenerated waveforms and instability are suppressed.

In the present invention, the magnetic read track width Tw (μm) and the magnetostriction λs (×10$^{-6}$), which are shown in FIG. 43 as point (Tw, λs), may be within the range obtained by linking point $SJ_2$ (0.15, 17.5), point $SW_2$ (0.13, 20), point $SK_2$ (0.1, 20), point $SL_2$ (0.1, 9), point $SX_2$ (0.13, 5), and point $SM_2$ (0.15, 3.5). Consequently, in particular, in a magnetic head with a read track width of 0.13 μm or less, distortion of regenerated waveforms and instability are more effectively suppressed, and necessary read output is ensured while the hard bias layers are set so that the product of the remanence and the thickness of the hard bias layers is suitable for controlling the magnetic read track width.

In the present invention, the ratio of the width in the track width direction of the free magnetic layer to the height in the element height direction of the free magnetic layer may be set at 1:1 to 3:2, and the height of the free magnetic layer may be in the range of 0.06 to 0.4 μm. Consequently, the single-domain state in the height direction can be improved by shape magnetic anisotropy due to its oblong shape, thus Barkhausen noise, etc., which causes instability, is suppressed.

In the present invention, the spin-valve thin-film magnetic element may be a bottom-type single spin-valve element in which at least the antiferromagnetic layer, the pinned magnetic layer, the nonmagnetic conductive layer, and the free magnetic layer are deposited in that order on the substrate; a top-type single spin-valve element in which at least the free magnetic layer, the nonmagnetic conductive layer, the pinned magnetic layer, and the antiferromagnetic layer are deposited in that order on the substrate; or a dual spin-valve element in which the nonmagnetic conductive layer, the pinned magnetic layer, and the antiferromagnetic layer, one each, are deposited on either surface in the thickness direction of the free magnetic layer. The antiferromagnetic layer may be composed of one of an X—Mn alloy and a Pt—Mn—X' alloy, where X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr. At least one of the pinned magnetic layer and the free magnetic layer may be divided into two sublayers by a nonmagnetic intermediate layer to produce a ferrimagnetic state in which the magnetization directions of the sublayers are antiparallel to each other.

With respect to a spin-valve thin-film magnetic element in which a free magnetic layer is divided into two sublayers by a nonmagnetic intermediate layer, an exchange coupling magnetic field, which directs the magnetizations of the free magnetic sublayers antiparallel to each other, is generated to produce a ferrimagnetic state, and thus the magnetic thickness is decreased. Therefore, the magnetization of the free magnetic layer can be rotated with high sensitivity relative to an external magnetic field.

With respect to a spin-valve thin-film magnetic element in which a pinned magnetic layer is divided into two sublayers by a nonmagnetic intermediate layer, an exchange coupling magnetic field, which directs the magnetizations of the pinned magnetic sublayers antiparallel to each other, is generated to produce a ferrimagnetic state, and thus the magnetic stability is improved.

Furthermore, the objects of the present invention are achieved by a thin-film magnetic head provided with the spin-valve thin-film magnetic element described above.

Additionally, in the spin-valve thin-film magnetic element having a multilayered structure including metallic films, the upper and lower surfaces thereof and a back side in the height direction are covered by an insulating film (gap film) composed of $Al_2O_3$ or the like, and a front side (ABS) opposite to the back side is exposed to outside, and it is possible to control the tensile stress in the height direction (element height direction) applied to the free magnetic layer can be controlled by adjusting the compositions of the gap film and the free magnetic layer, and the deposition conditions.

DESCRIPTION OF THE PREFERRED EMBODIMENTS

First Embodiment

Figure 21:
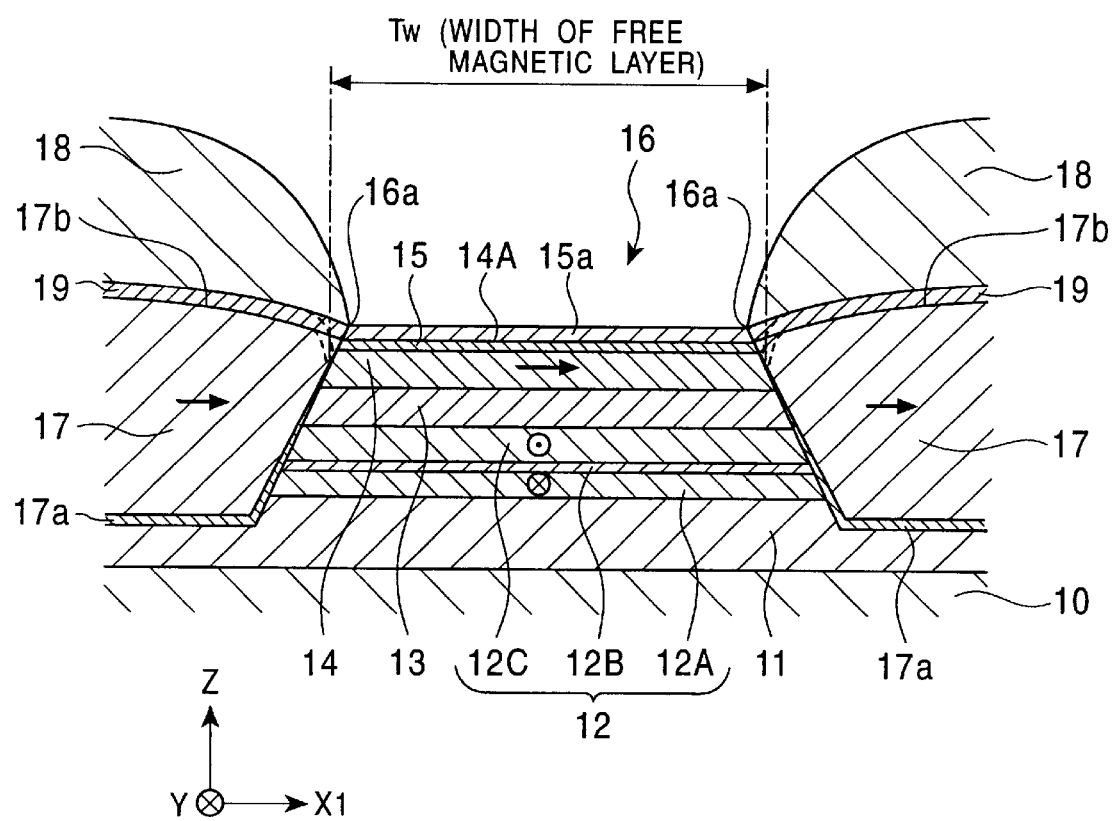
FIG. 21 is a sectional view of a spin-valve thin-film magnetic element in a first embodiment of the present invention, viewed from a surface facing a recording medium.

FIG. 21 is a sectional view of a spin-valve thin-film magnetic element in a first embodiment of the present invention, viewed from a surface facing a recording medium.

The spin-valve thin-film magnetic element of the present invention is a giant magnetoresistive (GMR) element using a giant magnetoresistance effect. The spin-valve thin-film magnetic element is provided on a trailing edge of a floating-type slider in a hard disk drive and detects a recorded magnetic field from a hard disk, etc., as will be described below. A magnetic recording medium, such as a hard disk, travels in the Z direction in the drawing, and a fringing magnetic field from the magnetic recording medium is directed in the Y direction.

The spin-valve thin-film magnetic element in the first embodiment is a bottom-type single spin-valve thin-film element, in which an antiferromagnetic layer, a pinned magnetic layer comprising a first pinned magnetic sublayer and a second pinned magnetic sublayer, a nonmagnetic conductive layer, and a free magnetic layer are formed in that order, and the pinned magnetic layer is of a so-called "synthetic ferri-pinned" type in which the first pinned magnetic sublayer and the second pinned magnetic sublayer are separated by a nonmagnetic intermediate layer, and the magnetization directions of the first pinned magnetic sublayer and the second pinned magnetic sublayer are antiparallel to each other, thus forming a synthetic ferrimagnetic state.

As shown in FIG. 21, an antiferromagnetic layer 11 is formed on a substrate 10. A first pinned magnetic sublayer 12A, a nonmagnetic intermediate layer 12B, and a second pinned magnetic sublayer 12C are formed in that order on the antiferromagnetic layer 11, the magnetization directions of the first pinned magnetic sublayer 12A and the second pinned magnetic sublayer 12C being antiparallel to each other.

A nonmagnetic conductive layer 13 composed of copper (Cu) or the like is formed on the second pinned magnetic sublayer 12C, and a free magnetic layer 14 is formed on the nonmagnetic conductive layer 13. A protective layer 15 composed of Ta or the like is formed on the free magnetic layer 14, and an oxidized layer 15a composed of tantalum oxide is formed on the protective layer 15.

As shown in FIG. 21, the individual layers from a part of the antiferromagnetic layer 11 to the oxidized layer 15a constitute a laminate 16 having a substantially trapezoidal cross section.

Hard bias layers 17 are formed at both sides of the laminate 16 on extensions of the antiferromagnetic layer 11 with bias underlayers 17a therebetween. Electrode layers 18 are formed on the hard bias layers 17 with interlayers 19 composed of Ta or Cr therebetween.

In the spin-valve thin-film magnetic element in the first embodiment, the optical width in the X1 direction, i.e., in the track width direction, (magnetic read track width) Tw is set at 0.4 μm or less. Herein, the optical track width is defined as the width in the X1 direction of the free magnetic layer 14. Specifically, the optical track width is defined as the width in the X1 direction at the midpoint in the Z direction of the free magnetic layer 14, i.e., the width in the X1 direction at the midpoint in the thickness direction of the free magnetic layer 14.

The antiferromagnetic layer 11 has a thickness of approximately 80 to 300 Å in the center of the laminate 16, and is preferably composed of a PtMn alloy. The PtMn alloy has a higher corrosion resistance compared to an NiMn alloy or an FeMn alloy which has been conventionally used for antiferromagnetic layers, and also has a high blocking temperature and generates a large exchange coupling magnetic field (exchange anisotropic magnetic field).

Instead of the PtMn alloy, the antiferromagnetic layer 11 may be composed of an X—Mn alloy, where X is one element selected from the group consisting of Pd. Ru, Ir, Rh, and Os, or an X'—Pt—Mn alloy, where X' is at least one element selected from the group consisting of Pd, Cr, Ru, Ni, Ir, Rh, Os, Au, Ag, Ne, Ar, Xe, and Kr.

In the PtMn alloy or the X-Mn alloy, the Pt content or the X content is preferably in the range of 37 to 63 atomic percent, and more preferably in the range of 47 to 57 atomic percent.

In the X'—Pt—Mn alloy, the X'+Pt content is preferably in the range of 37 to 63 atomic percent, and more preferably in the range of 47 to 57 atomic percent. Furthermore, in the X'—Pt—Mn alloy, the X' content is preferably in the range of 0.2 to 10 atomic percent.

However, when X' is at least one element selected from the group consisting of Pd, Ru, Ir, Rh, and Os, the X' content is preferably in the range of 0.2 to 40 atomic percent.

By using the alloy having the appropriate composition described above, followed by annealing, an antiferromagnetic layer 11 generating a large exchange coupling magnetic field can be obtained. In particular, an antiferromagnetic layer made of the PtMn alloy generates an exchange coupling magnetic field exceeding 64 kA/m, and has a blocking temperature, i.e., a temperature at which the exchange coupling magnetic field is lost, of 380° C. which is significantly high.

The first and second pinned magnetic sublayers 12A and 12C are ferromagnetic thin films composed of Co, an NiFe alloy, a CoNiFe alloy, a CoFe alloy, a CoNi alloy, or the like, and preferably have a thickness of 40 Å in total. For example, the first pinned magnetic sublayer 12A is composed of Co and has a thickness of 13 to 20 Å, and the second pinned magnetic sublayer 12C is composed of Co and has a thickness of 15 to 25 Å.

The nonmagnetic intermediate layer 12B is preferably composed of Ru, Rh, Ir, Cr, Re, or Cu or an alloy of at least two of these elements, and usually has a thickness of approximately 8 Å.

The first pinned magnetic sublayer 12A is in contact with the antiferromagnetic layer 11. When annealing (heat treatment) is performed in a magnetic field, an exchange coupling magnetic field (exchange anisotropic magnetic field) is generated at the interface between the first pinned magnetic sublayer 12A and the antiferromagnetic layer 11, and the magnetization of the first pinned magnetic sublayer 12A is pinned in the Y direction as shown in FIG. 21. If the magnetization of the first pinned magnetic sublayer 12A is pinned in the Y direction, the magnetization of the second pinned magnetic sublayer 12C which is opposed to the first pinned magnetic sublayer 12A with the nonmagnetic intermediate layer 12B therebetween is pinned antiparallel to the magnetization of the first pinned magnetic sublayer 12A, i.e., in the direction opposite to the Y direction.

In this embodiment, in order to increase the exchange coupling magnetic field (Hex), the thickness ratio of the first pinned magnetic sublayer 12A to the second pinned magnetic sublayer 12C is set within an appropriate range, and the magnetizations of the first pinned magnetic sublayer 12A and the second pinned magnetic sublayer 12C are in an antiparallel state (ferrimagnetic state), and also the rate of change in resistance ($\Delta R/R$) which is substantially the same as that in the conventional case can be obtained. Furthermore, by appropriately controlling the magnitude and the direction of the magnetic field during annealing, the magnetization directions of the first pinned magnetic sublayer 12A and the second pinned magnetic sublayer 12C are adjusted in predetermined directions.

The nonmagnetic conductive layer 13 is composed of copper (Cu) or the like, and the thickness thereof is set at 20 to 30 Å.

Figure 22:
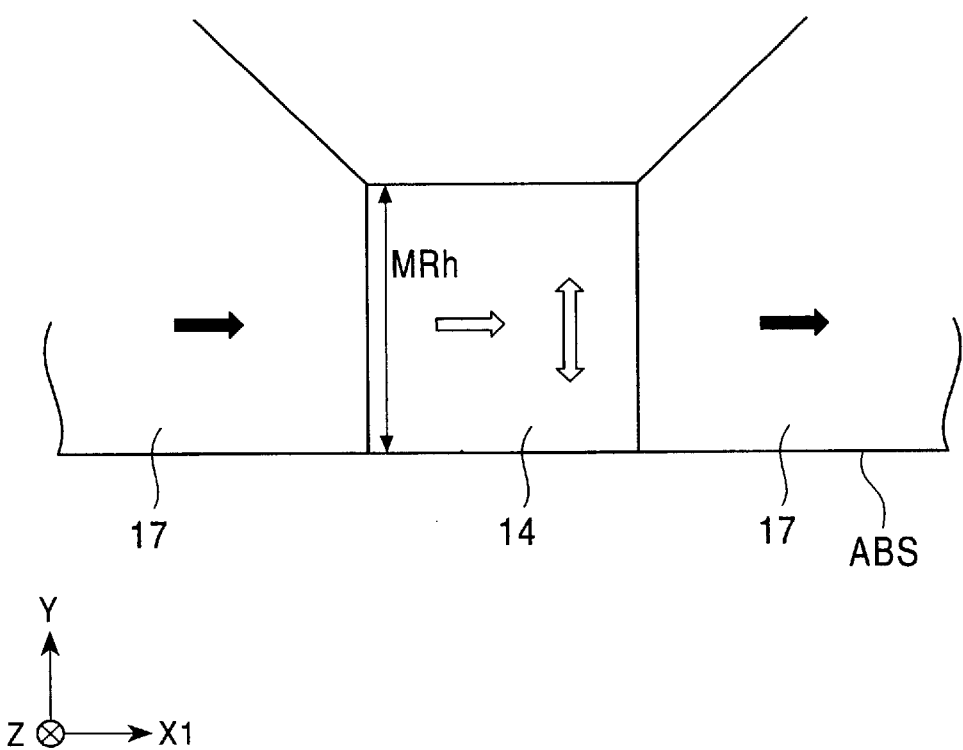
FIG. 22 is a sectional view of a free magnetic layer 14 of the spin-valve thin-film magnetic element shown in FIG. 21, taken along the X1-Y plane.

FIG. 22 is a sectional view of the free magnetic layer 14 of the spin-valve thin-film magnetic element shown in FIG. 21, taken along the X1-Y plane.

Figure 1:
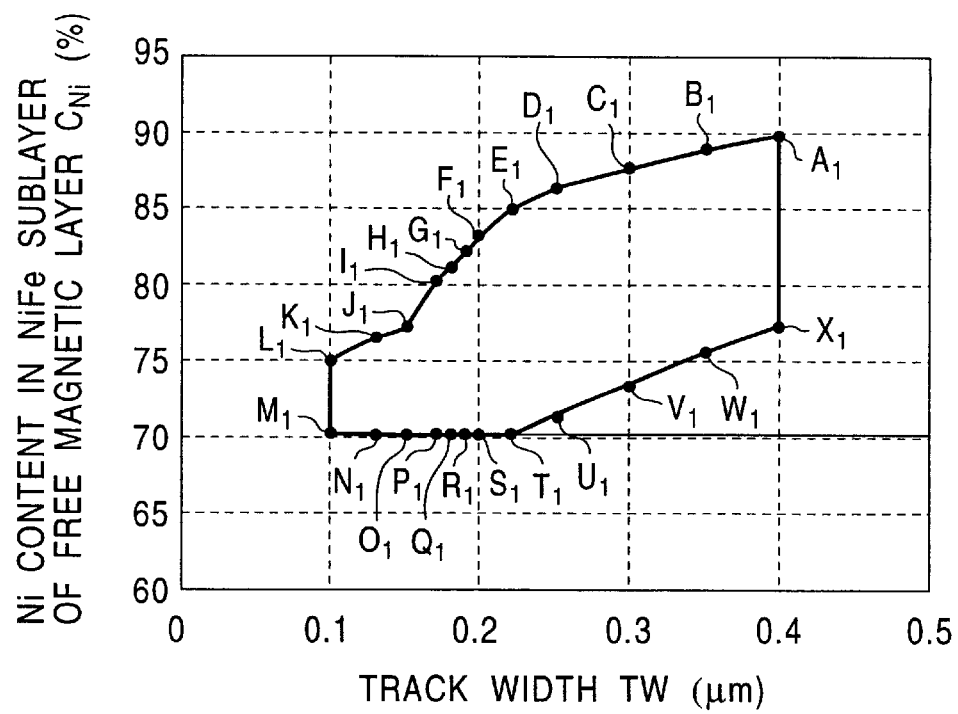
FIG. 1 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.
Figure 2:
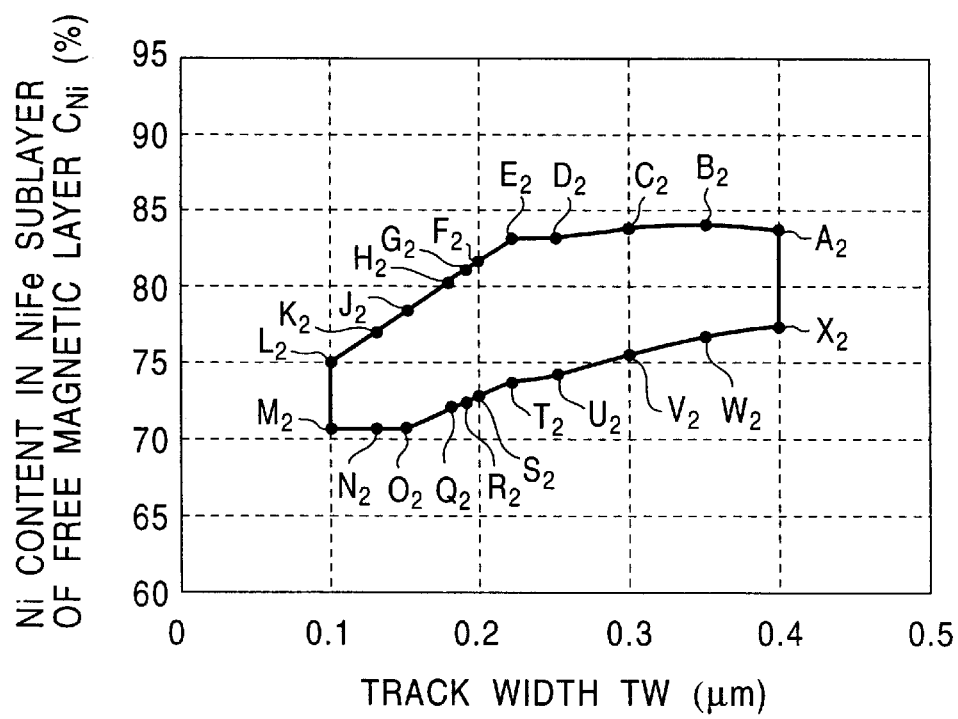
FIG. 2 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

FIGS. 1 and 2 are graphs showing the ranges for the magnetic read track width Tw (μm) and the Ni content (at. %) in the NiFe alloy constituting at least a part of the free magnetic layer.

The free magnetic layer 14 usually has a thickness of 20 to 50 Å, and is composed of an NiFe alloy or is a multi-layered film composed of an NiFe alloy and a CoFe alloy. Furthermore, the width in the X1 direction in FIG. 21, i.e., the track width (magnetic read track width) Tw is set at 0.4 μm or less. A layer composed of Co, a CoFe alloy, or a CoFeNi alloy may be provided at the nonmagnetic conductive layer 13 side of the free magnetic layer 14.

With respect to the free magnetic layer 14, the Ni content $C_{Ni}$ (at. %) in the NiFe alloy constituting at least a part of the free magnetic layer 14 is in the range of 70.2 to 89.9 atomic percent. The magnetic read track width Tw (μm) and the Ni content $C_{Ni}$ (at. %), which are shown in FIG. 1 as point (Tw, $C_{Ni}$), are within a range obtained by linking point $A_1$ (0.4, 89.9), point $B_1$ (0.35, 89), point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point P$_1$ (0.17, 70.2), point Q$_1$ (0.18, 70.2), point R$_1$ (0.19, 70.2), point S$_1$ (0.20, 70.2), point T$_1$ (0.22, 70.2), point U$_1$ (0.25, 71.5), point V$_1$ (0.3, 73.6), point W$_1$ (0.35, 75.6), and point X$_1$ (0.4, 77.3).

Figure 42:
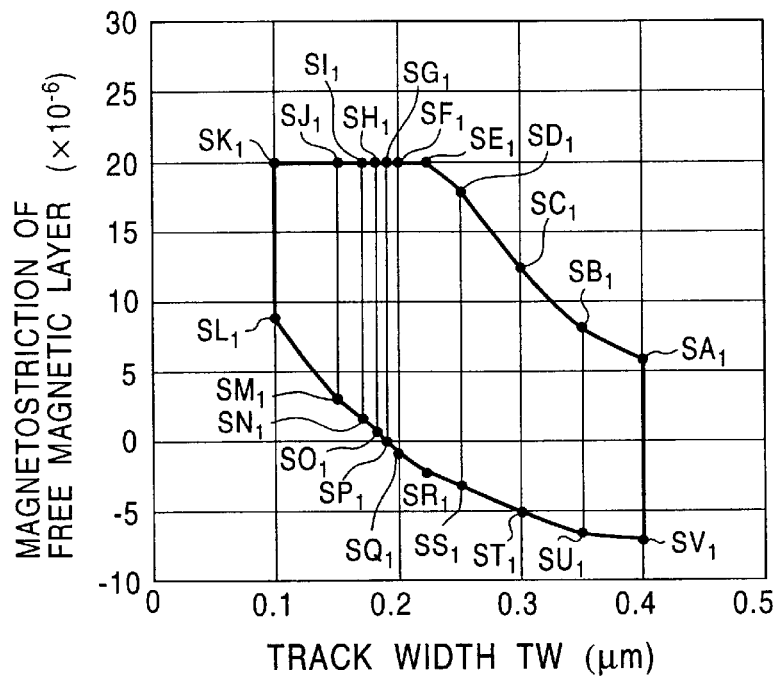
FIG. 42 is a graph showing ranges for the magnetic read track width Tw (μm) and the magnetostriction λs ($\times 10^{-6}$) of a free magnetic layer in a spin-valve thin-film magnetic element of the present invention.

Consequently, the magnetostriction λs of the free magnetic layer 14 can be set in the range of $-7.0 \times 10^{-6}$ to $2.0 \times 10^{-5}$ and preferably, the magnetic read track width Tw (μm) and the magnetostriction λs ($\times 10^{-6}$) of the free magnetic layer 14, which are shown in FIG. 42 as point (Tw, λs), is set within the range obtained by linking point SA$_1$ (0.4, 6), point SB$_1$ (0.35, 8), point SC$_1$ (0.3, 12.5), point SD$_1$ (0.25, 18), point SE$_1$ (0.23, 20), point SP$_1$ (0.2, 20), point SG$_1$ (0.19, 20), point SH$_1$ (0.18, 20), point SI$_1$ (0.17, 20), point SJ$_1$ (0.15, 20), point SK$_1$ (0.1, 20), point SL$_1$ (0.1, 9), point SM$_1$ (0.15, 3.5), point SN$_1$ (0.17, 2), point SO$_1$ (0.18, 1), point SP$_1$ (0.19, 0), point SQ$_1$ (0.2, -0.7), point SR$_1$ (0.22, -2), point SS$_1$ (0.25, -3), point ST$_1$ (0.3, -5), point SU$_1$ (0.35, -6.3), and point SV$_1$ (0.4, -7).

In the spin-valve thin-film magnetic element in this embodiment, since the track width Tw is set at 0.4 μm or less, when the magnetization of the free magnetic layer 14 is aligned in the track width direction under the influence of the hard bias layers 17, the free magnetic layer 14 does not have a region which is sufficiently distant from the hard bias layers 17 for causing a difference between a sensitive region and an insensitive region measured by the microtrack profile method described above. Therefore, significant variations in the influence of the hard bias layers 17 on the free magnetic layer 14 are avoided.

At the same time, by setting the Ni content C$_{Ni}$ (at. %) as described above, the magnetostriction λs in the element height direction of the free magnetic layer can be set in the range of $-7.0 \times 10^{-6}$ to $2.0 \times 10^{-5}$. By setting the magnetostriction to be positive, i.e., by setting the magnetostriction so that elongation occurs in the magnetized direction, the magnetization is easily oriented in the direction of the tensile stress applied due to the inverse magnetostriction, and magnetic anisotropy is exhibited. That is, in the free magnetic layer 14 to which the tensile stress is applied, the direction of the tensile stress, i.e., the element height direction (height direction) indicated by the arrow Y in FIGS. 21 and 22, can be set to be an easy magnetization axis. When the magnetostriction λs is set as described above, by setting the track width Tw at 0.4 μm or less, it is possible to prevent the easy magnetization rotation of the variable magnetization of the free magnetic layer 14 from having a distribution in the track width direction so as to produce domain walls, resulting in an unstable domain.

Therefore, the free magnetic layer 14 does not have regions with varied sensitivity in the track width direction (X1 direction), and single-domain alignment of the free magnetic layer 14 is not obstructed by domain walls, thus nonuniform magnetization is prevented, and it is possible to avoid Barkhausen noise, etc., which results in instability wherein signals from a magnetic recording medium are inaccurately processed in the spin-valve thin-film magnetic element.

In this embodiment, if the magnetic read track width Tw is more than 0.4 μm, as described above, domain walls may be produced in the free magnetic layer 14. If the Ni content C$_{Ni}$ is more than 89.9 atomic percent, the magnetostriction λs in the element height direction of the free magnetic layer 14 may become less than $-7.0 \times 10^{-6}$, and in such a case, the variable magnetization of the free magnetic layer 14 is pinned more firmly than necessary by the hard bias layers 17 and is not rotated with high sensitivity relative to an applied external magnetic field, and read output in a low frequency band of approximately 10 to 20 MHz is decreased to less than the practical lower limit. If the Ni content C$_{Ni}$ is less than 70.2 atomic percent, thereby setting the magnetostriction λs at more than $2.0 \times 10^{-5}$, the coercive force in the free magnetic layer 14 exceeds approximately 400 A/m or more, degrading soft magnetic properties of the free magnetic layer 14.

Furthermore, the magnetic read track width Tw (μm) and the Ni content C$_{Ni}$ (at. %) in the NiFe alloy constituting at least the part of the free magnetic layer 14, which are shown in FIG. 1 as point (Tw, C$_{Ni}$), may be set within the range obtained by linking point A1 to point X$_1$. If the magnetic read track width Tw and the Ni content C$_{Ni}$ are outside of the range described above, problems as described below may be caused.

1. If the magnetic read track width Tw is set to the right of point A$_1$ and point X$_1$, as described above, domain walls may be produced in the free magnetic layer, resulting in Barkhausen noise, etc., which causes instability.

2. If the magnetic read track width Tw (μm) and the Ni content C$_{Ni}$ are above the polygonal line obtained by linking point A$_1$, point B$_1$, point C$_1$, point D$_1$, point E$_1$, point F$_1$, point G$_1$, point H$_1$, point I$_1$ point J$_1$, point K$_1$, and point L$_1$, the variable magnetization of the free magnetic layer is more firmly pinned than necessary by the hard bias layers and is not rotated with high sensitivity relative to an applied external magnetic field, and read output in a low frequency band of approximately 10 to 20 MHz is decreased to less than the practical lower limit of 1.2 mV.

3. If the Ni content C$_{Ni}$ is below point M$_1$, point N$_1$, point O$_1$, point P$_1$, point Q$_1$, point R$_1$, point S$_1$, and point T$_1$, the coercive force in the free magnetic layer is increased to approximately 400 A/m or more, and the soft magnetic properties of the free magnetic layer are degraded, resulting in an increase in distortion of regenerated waveforms and instability.

4. If the magnetic read track width Tw (μm) and the Ni content C$_{Ni}$ are below the polygonal line obtained by linking point T$_1$, point U$_1$, point V$_1$, point W$_1$, and point X$_1$, read output in a low frequency band of approximately 10 to 20 MHz is increased to more than the practical upper limit of 2.0 mV, and instability in regenerated waveform may be increased.

In relation to the magnetic read track width and the Ni content C$_{Ni}$ (at. %) described above, the magnetic read track width Tw (μm) and the magnetostriction λs ($\times 10^{-6}$) of the free magnetic layer 14, which are shown in FIG. 42 as point (Tw, λs), may be set within the range delimited by the polygonal line obtained by linking point SA$_1$ to point SV$_1$. If the magnetic read track width Tw and the magnetostriction λs are outside of the range described above, problems as described below may be caused.

1. If the magnetic read track width Tw is set to the right of point SA$_1$ and point SV$_1$, as described above, domain walls may be produced in the free magnetic layer 14, resulting in Barkhausen noise, etc., which causes instability.

2. If the magnetic read track width Tw and the magnetostriction λs are above the polygonal line obtained by linking point SA$_1$, point SB$_1$, point SC$_1$, point SD$_1$, and point SE$_1$ in FIG. 42, read output in a low frequency band of approximately 10 to 20 MHz is increased to more than the practical upper limit of 2.0 mV, and instability in regenerated waveform may be increased.

3. If the magnetostriction λs is above point SE$_1$, point SF$_1$, point SG$_1$, point SH$_1$, point SI$_1$, point SJ$_1$, and point $SK_1$, in FIG. 42, the coercive force in the free magnetic layer 14 is increased to approximately 400 A/m or more, and the soft magnetic properties of the free magnetic layer 14 are degraded, resulting in an increase in distortion of regenerated waveforms and instability.

4. If the magnetic read track width Tw and the magnetostriction λs in the element height direction of the free magnetic layer 14 are below the polygonal line obtained by linking point $SL_1$, point $SM_1$, point $SN_1$, point $SO_1$, point $SP_1$, point $SQ_1$, point $SR_1$, point $SS_1$, point $ST_1$, point $SU_1$, and point $SV_1$, the variable magnetization of the free magnetic layer 14 is pinned more firmly than necessary by the hard bias layers 17 and is not rotated with high sensitivity relative to an applied external magnetic field, and read output in a low frequency band of approximately 10 to 20 MHz is decreased to less than the practical lower limit of 1.2 mV.

In this embodiment, the magnetic read track width Tw (μm) and the Ni content $C_{Ni}$ (at. %) in the NiFe alloy constituting at least the part of the free magnetic layer 14, which are shown in FIG. 2 as point (Tw, $C_{Ni}$), may be set within the range obtained by linking point $A_2$ to point $X_2$. If the magnetic read track width Tw and the Ni content $C_{Ni}$ are outside of the range described above, problems as described below may be caused.

1. If the magnetic read track width Tw is set to the right of point $A_2$ and point $X_2$ in FIG. 2, as described above, domain walls may be produced in the free magnetic layer 14, resulting in Barkhausen noise, etc., which causes instability.

2. If the magnetic read track width Tw (μm) and the Ni content $C_{Ni}$ are above the polygonal line obtained by linking point $A_2$, point $B_2$, point $C_2$, point $D_2$, point $E_2$, point $F_2$, point $G_2$, point $E_2$, point $F_2$, point $G_2$, point $H_2$, point $J_2$, point $K_2$, and point $L_2$, the variable magnetization of the free magnetic layer 14 is more firmly pinned than necessary by the hard bias layers 17 and is not rotated with high sensitivity relative to an applied external magnetic field, and read output in a low frequency band of approximately 10 to 20 MHz is decreased to less than the practical lower limit of 1.2 mV.

Furthermore, within the range delimited by the polygonal line obtained by linking point $A_2$ to point $L_2$, the product of the remanence and the thickness of the hard bias layers 17 for stabilizing the variable magnetization of the free magnetic layer 14 may be decreased to less than the value required for more reliably avoiding the instability in regenerated waveform as the track width is decreased.

3. If the Ni content $C_{Ni}$ is below point $M_2$, point $N_2$, and point $O_2$ in FIG. 2, the coercive force in the free magnetic layer 14 is increased to approximately 400 A/m or more, and the soft magnetic properties of the free magnetic layer 14 are degraded, resulting in an increase in distortion of regenerated waveforms and instability.

4. If the magnetic read track width Tw and the Ni content $C_{Ni}$ are below the polygonal line obtained by linking point $O_2$, point $Q_2$, point $R_2$, point $S_2$, point $T_2$, point $U_2$, point $V_2$, point $W_2$, and point $X_2$ in FIG. 2, read output in a low frequency band of approximately 10 to 20 MHz is increased to more than the practical upper limit of 2.0 mV, and instability in regenerated waveform may be increased.

Moreover, by setting the range inside point $O_2$ and point $X_2$ in FIG. 2 as described above, the product of the remanence and the thickness of the hard bias layers for stabilizing the variable magnetization of the free magnetic layer 14 may become small as the track width Tw is decreased, and thereby magnetic, effective read track width can be controlled more precisely.

Figure 43:
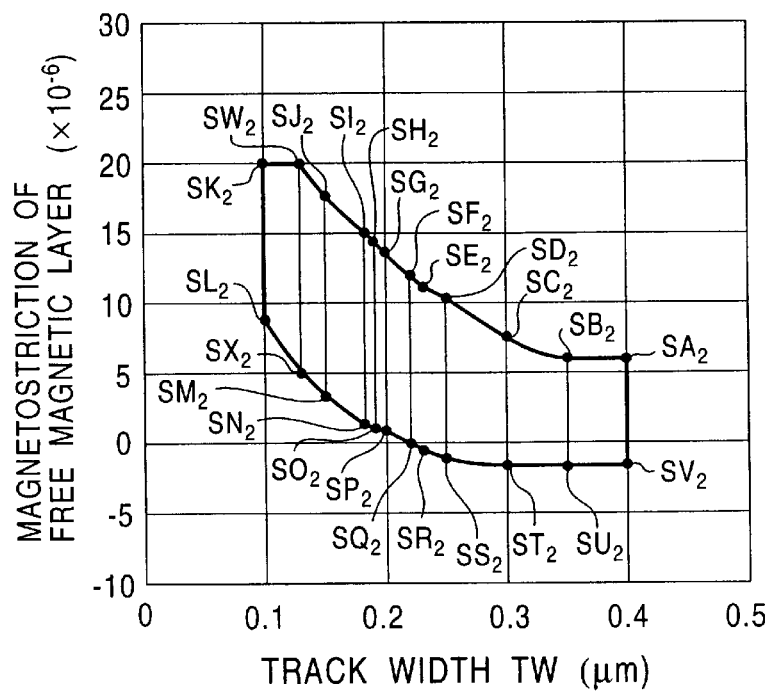
FIG. 43 is a graph showing ranges for the magnetic read track width Tw (μm) and the magnetostriction λs ($\times 10^{-6}$) of a free magnetic layer in a spin-valve thin-film magnetic element of the present invention.

Furthermore, in relation to the magnetic read track width and the Ni content $C_{Ni}$ (at. %) within the range shown in FIG. 2, the magnetic read track width Tw (μm) and the magnetostriction λs (×10⁻⁶) of the free magnetic layer 14, which are shown in FIG. 43 as point (Tw, λs), may be set within the range obtained by linking point $SA_2$ (0.4, 6), point $SB_2$ (0.35, 6), point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, -0.5), point $SS_2$ (0.25, -1), point $ST_2$ (0.3, -1.5), point $SU_2$ (0.35, -1.6), and point $SV_2$ (0.4, -1.5). If the magnetic read track width Tw and the magnetostriction λs are outside of the range described above, problems as described below may be caused.

1. If the magnetic read track width Tw is set to the right of point $SA_2$ and point $SV_2$ in FIG. 43, as described above, domain walls may be produced in the free magnetic layer 14, resulting in Barkhausen noise, etc., leading to instability.

2. If the magnetic read track width Tw and the magnetostriction λs are above the polygonal line obtained by linking point $SA_2$, point $SB_2$, point $SC_2$, point $SD_2$, and point $SE_2$, point $SF_2$, point $SG_2$, point $SH_2$, point $SI_2$, point $SJ_2$, and point $SW_2$ in FIG. 43, read output in a low frequency band of approximately 10 to 20 MHz is increased to more than the practical upper limit of 2.0 mV, and instability in regenerated waveform may be increased.

Furthermore, within the range delimited by the polygonal line obtained by linking point $SA_2$ to point $SW_2$, the product of the remanence and the thickness of the hard bias layers 17 for stabilizing the variable magnetization of the free magnetic layer 14 can be small as the track width is decreased, which is more advantageous in view of controlling the magnetic, effective read track width.

3. If the magnetostriction λs is above point $SW_2$ and point $SK_2$ in FIG. 43, the coercive force in the free magnetic layer 14 is increased to approximately 400 A/m or more, and the soft magnetic properties of the free magnetic layer 14 are degraded, resulting in an increase in distortion of regenerated waveforms and instability.

4. If the magnetic read track width Tw and the magnetostriction λs are below the polygonal line obtained by linking point $SL_2$, point $SX_2$, point $SM_2$, point $SN_2$, point $SO_2$, point $SP_2$, point $SQ_2$, point $SR_2$, point $SS_2$, point $ST_2$, point $SU_2$, and point $SV_2$ in FIG. 43, the variable magnetization of the free magnetic layer 14 is pinned more firmly than necessary by the hard bias layers 17 and is not rotated with high sensitivity relative to an applied external magnetic field, and read output in a low frequency band of approximately 10 to 20 MHz is decreased to less than the practical lower limit of 1.2 mV.

Furthermore, by setting the magnetic read track width Tw and the magnetostriction λs inside of point $SF_2$ and point $SV_2$, it is not necessary to decrease the product of the remanence and the thickness of the hard bias layers 17 for stabilizing the variable magnetization of the free magnetic layer 14 to less than the value required for more reliably avoiding the instability in regenerated waveform as the track width is decreased.

Furthermore, the ratio of the width in the read track width direction of the free magnetic layer 14 to the height in the element height direction of the free magnetic layer 14 is approximately 1:1 to 3:2, and as shown in FIG. 22, the length in the Y direction, i.e., the height MRh of the free magnetic layer 14 is set in the range of 0.06 to 0.4 µm. Consequently, the single-domain state in the height direction can be improved by shape magnetic anisotropy due to its oblong shape, thus Barkhausen noise, etc., which causes instability, is suppressed.

The protective layer 15 is composed of Ta, and the surface thereof constitutes the oxidized layer 15a.

The bias underlayers 17a act as buffer layers as well as alignment layers. The bias underlayers 17a are preferably composed of Cr or the like, and have a thickness of approximately 20 to 100 Å, and preferably approximately 50 Å. The interlayers 19 are, for example, composed of Ta, and have a thickness of approximately 50 Å.

The bias underlayers 17a and the interlayers 19 function as diffusion barriers when exposed to high temperatures in the insulating resist curing step (UV cure or hard bake), etc. which is performed in the subsequent manufacturing step for an inductive head (write head). Thereby, it becomes possible to prevent the magnetic properties of the hard bias layers 17 from being degraded by the thermal diffusion between the hard bias layers 17 and the peripheral layers.

The hard bias layers 17 usually have a thickness of approximately 200 to 700 Å, and are preferably composed of a Co—Pt alloy, a Co—Cr—Pt alloy, a Co—Cr—Ta alloy, or the like.

Since the hard bias layers 17 are magnetized in the X1 direction, the magnetization of the free magnetic layer 14 is aligned in the X1 direction. Thereby, the variable magnetization of the free magnetic layer 14 and the pinned magnetization of the second pinned magnetic sublayer 12C are substantially orthogonal to each other.

Preferably, the hard bias layers 17 are disposed at the same level as that of the free magnetic layer 14, and have a larger thickness than the free magnetic layer 14. Upper surfaces 17b of the hard bias layers 17 are more distant from the substrate 10 than an upper surface 14A of the free magnetic layer 14, i.e., located higher in FIG. 21, and lower surfaces of the hard bias layers 17 are nearer to the substrate 10 than a lower surface of the free magnetic layer 14.

The electrode layers 18, which are single films composed of Cr, Au, Ta, or W, or multilayered films composed of at least two of these materials, are formed above the hard bias layers 17 so that a sensing current is applied to the laminate 16. If Cr is selected for the electrode layers 18 and is epitaxially grown on the interlayers 19 composed of Ta, the electrical resistance can be decreased.

In the spin-valve thin-film magnetic element having the structure shown in FIGS. 21 and 22, a sensing current is applied to the laminate 16 through the electrode layers 18. When a magnetic field is applied from a magnetic recording medium, such as a hard disk, in the Y direction, the magnetization of the free magnetic layer 14 is rotated from the X1 direction to the Y direction. At this stage, since spin-dependent scattering of conduction electrons occurs due to the giant magnetoresistance (GMR) effect at the interface between the nonmagnetic conductive layer 13 and the free magnetic layer 14, electrical resistance changes, and thus a fringing magnetic field from the recording medium is detected.

In this embodiment, since the magnetic read track width Tw (µm) and the Ni content $C_{Ni}$ (at. %) in the NiFe alloy constituting at least a part of the free magnetic layer are defined, the magnetostriction λs (×10$^{-6}$) of the free magnetic layer 14 can be defined. In the spin-valve thin-film magnetic element, a change in resistance is easily caused by the magnetoresistance effect exhibited because the variable magnetization direction of the free magnetic layer 14 is easily rotated relative to the pinned magnetization direction of the pinned magnetic layer 12 due to the inverse magnetostriction effect. Therefore, an increase in read output can be expected.

At the same time, in the spin-valve thin-film magnetic element, it is possible to avoid Barkhausen noise, etc., which results in instability wherein signals from a magnetic recording medium are inaccurately processed.

In the spin-valve thin-film magnetic element in this embodiment, as will be described later with reference to FIGS. 32 and 33, a lower shield layer 253, a lower gap layer 254, an upper gap layer 256, and an upper shield layer 257 are formed in the X1-Y in-plane direction of the free magnetic layer 14 on either side in the Z direction of the element.

Stress applied to the lower shield layer 253, the lower gap layer 254, the upper gap layer 256, and the upper shield layer 257 is anisotropically distributed in the in-plane direction because a portion of the element is open due to the ABS. For example, the stress applied to the lower shield layer 253, the lower gap layer 254, the upper gap layer 256, and the upper shield layer 257 is adjusted in a predetermined state by controlling the deposition conditions, etc., for the lower shield layer 253, the lower gap layer 254, the upper gap layer 256, and the upper shield layer 257 so that tensile stress is anisotropically applied to the free magnetic layer 14 in the height direction (stripe height direction).

As a result, the magnetostriction in the free magnetic layer 14 can be set within the range described above.

Alternatively, by controlling the sputtering conditions, etc., during the deposition of the free magnetic layer 14, the magnetostriction can be set within the range described above.

Second Embodiment

Figure 23:
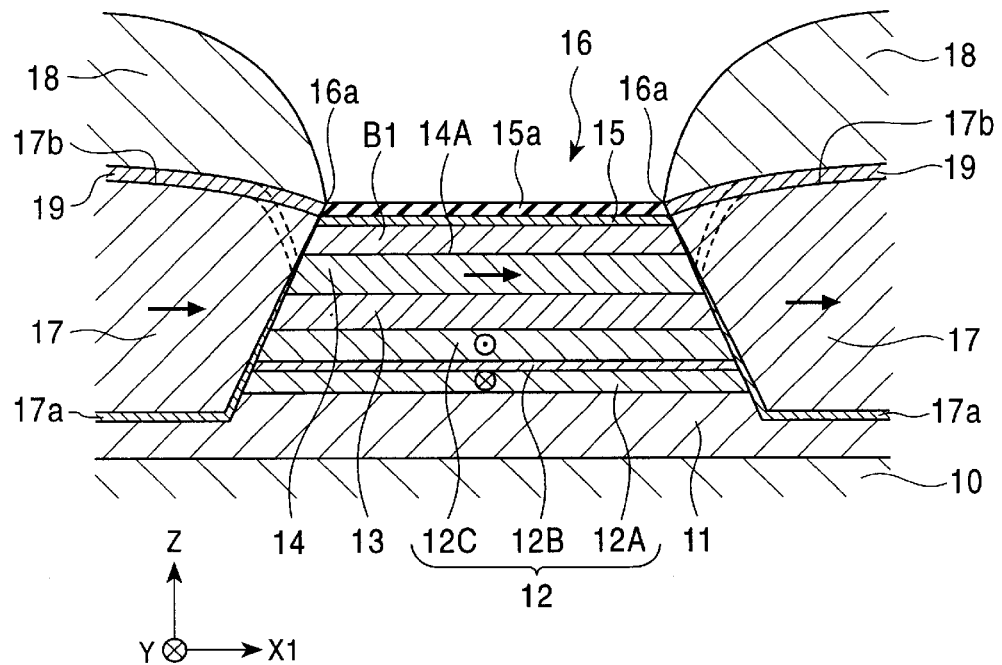
FIG. 23 is a sectional view of a spin-valve thin-film magnetic element in a second embodiment of the present invention, viewed from a surface facing a recording medium.

FIG. 23 is a sectional view of a spin-valve thin-film magnetic element in a second embodiment of the present invention, viewed from a surface facing a recording medium.

The spin-valve thin-film magnetic element in this embodiment is also a bottom-type synthetic ferri-pinned spin-valve thin-film element. The second embodiment differs from the first embodiment shown in FIGS. 21 and 22 in that a back layer B1 is provided and with respect to a free magnetic layer 14. Apart from this, the same constituents are represented by the same numerals as those in the first embodiment, and a description thereof is omitted.

As shown in FIG. 23, the back layer B1 is formed on the free magnetic layer 14, and a protective layer 15 composed of Ta or the like is formed on the back layer B1, thus constituting a laminate 16.

The back layer B1 is composed of a metallic material, such as Cu, or a nonmagnetic conductive material and may be composed of a material selected from the group consisting of Au, Ag, Cu, and Ru. The thickness of the back layer B1 is, for example, 5 to 20 Å.

Figure 3:
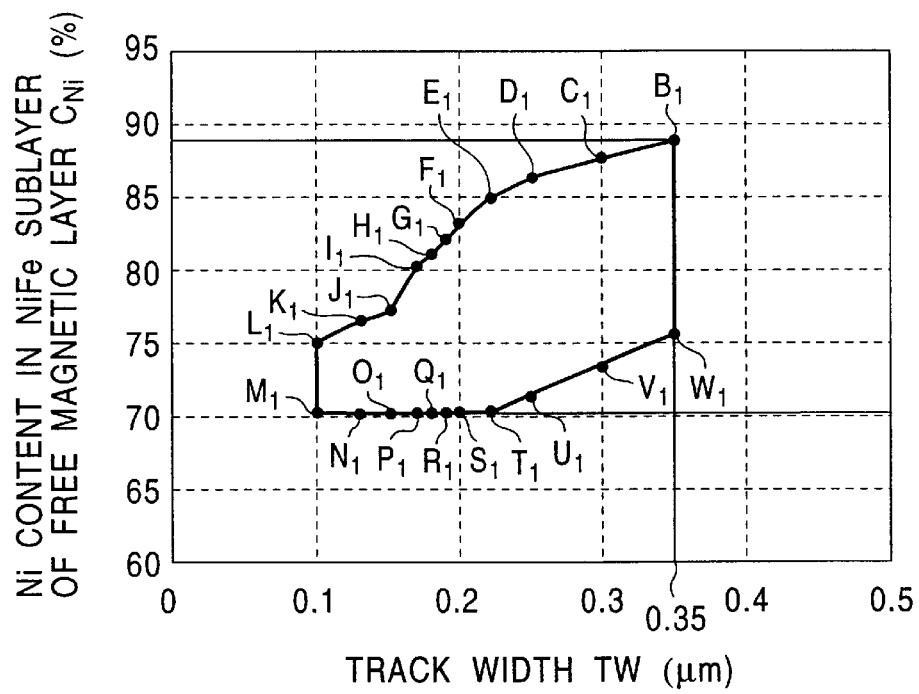
FIG. 3 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.
Figure 4:
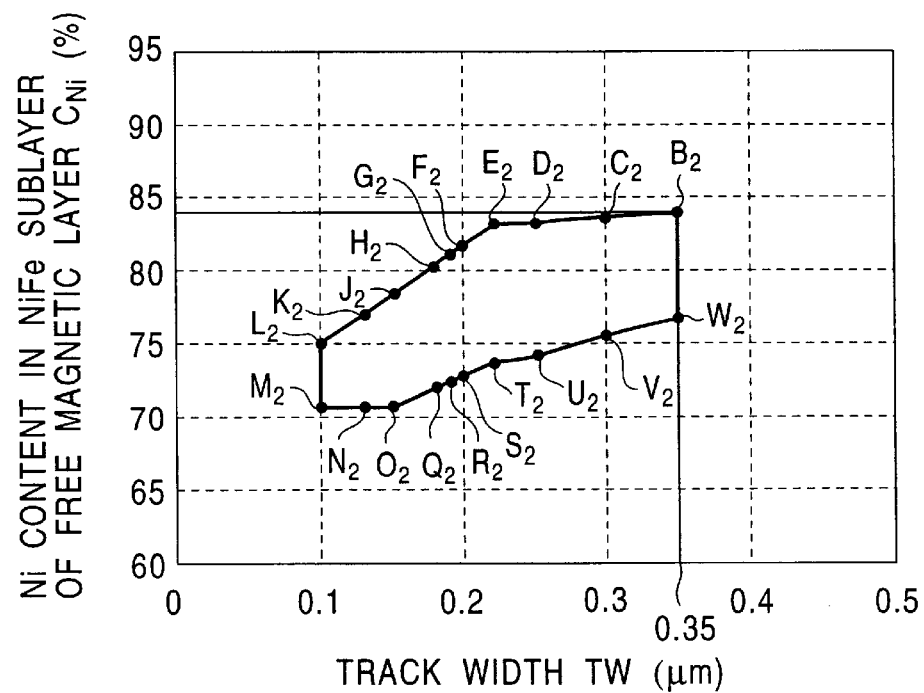
FIG. 4 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

FIGS. 3 and 4 are graphs showing ranges for the magnetic track width Tw (µm) and the Ni content $C_{Ni}$ (at. %) in an NiFe alloy constituting at least a part of the free magnetic layer.

In this embodiment, the magnetic read track width Tw (µm) and the Ni content $C_{Ni}$ (at. %), which are shown in FIG. 3 as point (Tw, $C_{Ni}$), may be set within the range obtained by linking point $B_1$ (0.35, 89), point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), point $V_1$ (0.3, 73.6), and point $W_1$ (0.35, 75.6). If the above range is satisfied, it is possible to set the magnetostriction λs of the free magnetic layer within the range defined by the corresponding track width range in FIG. 42. That is, the magnetic read track width Tw (μm) and the magnetostriction λs (×10$^{-6}$), which are shown in FIG. 42 as point (Tw, λs), can be set within the range obtained by linking point $SB_1$ (0.35, 8), point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), point $SS_1$ (0.25, −3), point $ST_1$ (0.3, −5), and point $SU_1$ (0.35, −6.3). The above range is more advantageous, in particular, to a magnetic head with a read track width of 0.35 μm or less in order to ensure necessary read output while distortion of regenerated waveforms and instability are suppressed.

Furthermore, in this embodiment, the magnetic read track width Tw (μm) and the Ni content $C_{Ni}$ (at. %), which are shown in FIG. 4 as point (Tw, $C_{Ni}$), may be set within the range obtained by linking point $B_2$ (0.35, 83.9), point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), point $V_2$ (0.3, 75.6), and point $W_2$ (0.35, 76.5). If the above range is satisfied, it is possible to set the magnetostriction λs of the free magnetic layer within the range defined by the corresponding track width range in FIG. 43. That is, the magnetic read track width Tw (μm) and the magnetostriction λs (×10$^{-6}$), which are shown in FIG. 43 as point (Tw, λs), can be set within the range obtained by linking point $SB_2$ (0.35, 6), point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), point $SS_2$ (0.25, −1), point $ST_2$ (0.3, −1.5), and point $SU_2$ (0.35, −1.6). The above range is more advantageous, in particular, to a magnetic head with a read track width of 0.35 μm or less in order to more effectively suppress distortion of regenerated waveforms and instability, and to ensure necessary read output while the hard bias layers are set so that the product of the remanence and the thickness of the hard bias layers is suitable for controlling the magnetic read track width.

The ratio of the width in the track width direction of the free magnetic layer 14 to the height in the element height direction of the free magnetic layer 14 is approximately 1:1 to 3:2, and the height of the free magnetic layer 14 is set in the range of 0.06 to 0.4 μm.

In the spin-valve thin-film magnetic element in this embodiment, a sensing current is applied from one of electrode layers 18 to the laminate 16. When a magnetic field is applied from a magnetic recording medium in the Y direction, the magnetization of the free magnetic layer 14 is rotated from the X1 direction to the Y direction. At this stage, since spin-dependent scattering of conduction electrons occurs due to the giant magnetoresistance (GMR) effect at the interface between the nonmagnetic conductive layer 13 and the free magnetic layer 14, electrical resistance changes, and thus a fringing magnetic field from the recording medium is detected.

The mean free path of spin-up electrons which contribute to the magnetoresistance effect can be extended by the back layer B1, and a large rate of change in resistance (ΔR/R) can be obtained because of the spin filter effect in the spin-valve magnetic sensing element, and thus the element is suitable for higher-density recording.

The reason for the increase in the rate of change in magnetoresistance by the back layer will be briefly described below.

When a sensing current is applied to the spin-valve thin-film magnetic element, conduction electrons are primarily transported in the vicinity of the nonmagnetic conductive layer having a small electrical resistance. The probabilities of two types of conduction electrons, i.e., spin-up conduction electrons and spin-down conduction electrons, are the same.

In the spin-valve thin-film magnetic element, the rate of change in magnetoresistance has a positive correlation with a difference in mean free path of these two types of conduction electrons.

The spin-down electrons are always scattered at the interface between the nonmagnetic conductive layer 13 and the free magnetic layer 14 without regard to the direction of an applied external magnetic field. The probability of being transported to the free magnetic layer 14 is kept low, and the mean free path of the spin-down electrons is lower than the mean free path of the spin-up electrons.

On the other hand, with respect to the spin-up electrons, when the magnetization direction of the free magnetic layer 14 is parallel to the magnetization direction of the pinned magnetic layer 12 under the influence of an external magnetic field, the probability of being transported from the nonmagnetic conductive layer 13 to the free magnetic layer 14 is increased and the mean free path is increased. As the magnetization direction of the free magnetic layer 14 is changed from the parallel state relative to the magnetization direction of the pinned magnetic layer 12 under the influence of an external magnetic field, the probability of being scattered at the interface between the nonmagnetic conductive layer 13 and the free magnetic layer 14 is increased, and thus the mean free path of the spin-up electrons is decreased.

As described above, since a change in the mean free path of the spin-up electrons is larger under the influence of the external magnetic field compared to the spin-down electrons and the difference in the mean free path is changed greatly, the resistance is changed, and thus the rate of change in magnetoresistance (ΔR/R) of the spin-valve thin-film magnetic element is increased.

When the back layer B1 is joined with the free magnetic layer 14, spin-up electrons being transported through the free magnetic layer 14 can be transported into the back layer B1, and the mean free path of the spin-up electrons can be further extended proportionately to the thickness of the back layer B1. Therefore, the so-called spin-filter effect can be exhibited, and the difference in the mean free path of conduction electrons is increased, and thus the rate of change in magnetoresistance (ΔR/R) of the spin-valve thin-film magnetic element can be further improved.

In accordance with the spin-valve thin-film magnetic element in this embodiment, the same advantages as those in the spin-valve thin-film magnetic element in the first embodiment shown in FIGS. 21 and 22 are provided, and also since the back layer B1 is formed, it is possible to improve the rate of change in magnetoresistance ($\Delta R/R$) because of the spin-filter effect, particularly when the free magnetic layer is thin.

Since the magnetic read track width Tw ($\mu$m) and the Ni content $C_{Ni}$ (at. %) in the free magnetic layer 14 or the magnetic read track width Tw ($\mu$m) and the magnetostriction $\lambda$s ($\times 10^{-6}$) in the element height direction are set in the ranges described above, necessary read output is ensured in a magnetic head with a narrowed track width without increasing distortion of regenerated waveforms and instability.

Figure 24:
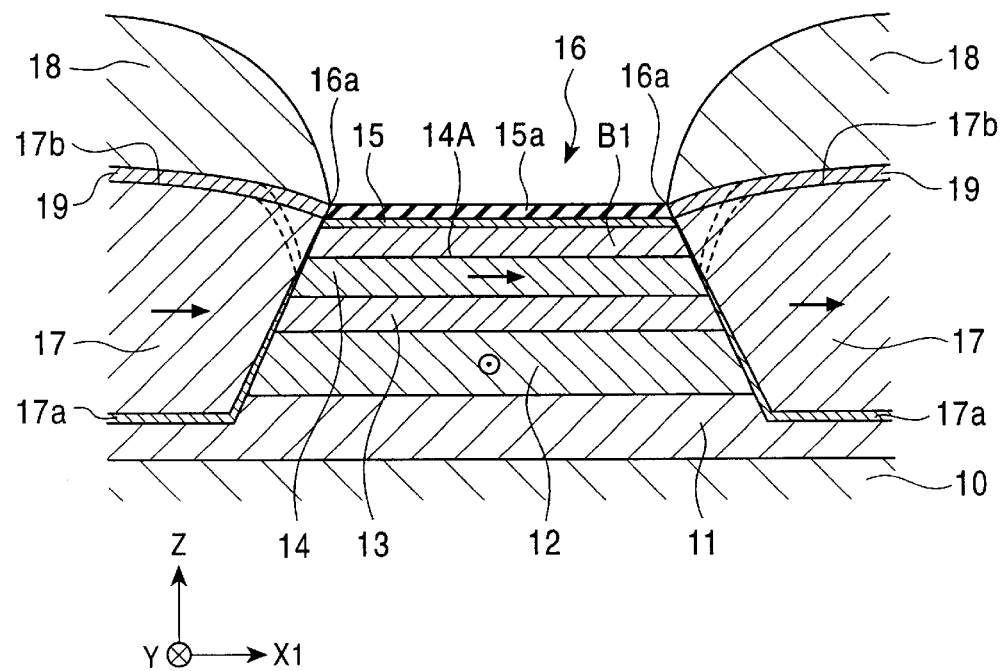
FIG. 24 is a sectional view of a spin-valve thin-film magnetic element in a modification of the second embodiment of the present invention, viewed from a surface facing a recording medium.

Additionally, in this embodiment as well as in the present invention, as shown in FIG. 24, a pinned magnetic layer 12 may be formed as a single layer. In such a case, the pinned magnetization of the pinned magnetic layer 12 can be pinned antiparallel to the Y direction by exchange coupling with an antiferromagnetic layer 11.

Third Embodiment

Figure 25:
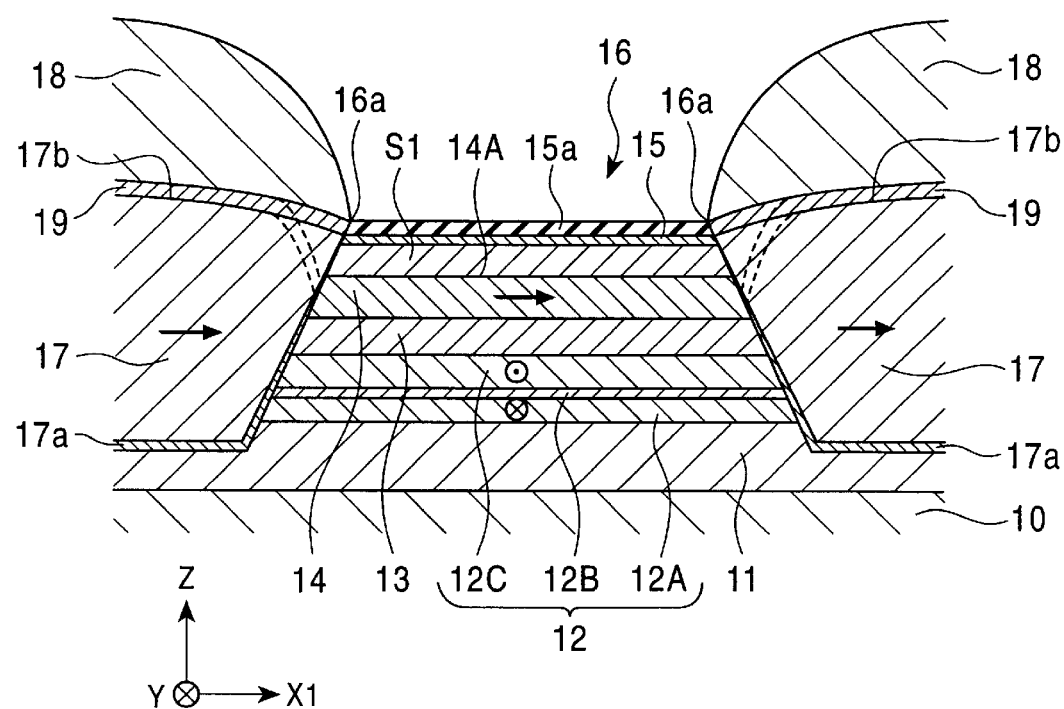
FIG. 25 is a sectional view of a spin-valve thin-film magnetic element in a third embodiment of the present invention, viewed from a surface facing a recording medium.

FIG. 25 is a sectional view of a spin-valve thin-film magnetic element in a third embodiment of the present invention, viewed from a surface facing a recording medium.

The spin-valve thin-film magnetic element in this embodiment is also a bottom-type synthetic ferri-pinned spin-valve thin-film element. The third embodiment differs from the second embodiment shown in FIG. 23 in that a specular reflection layer S1 is provided instead of the back layer B1 and with respect to a free magnetic layer. Apart from this, the same constituents are represented by the same numerals as those in the second embodiment, and a description thereof is omitted.

As shown in FIG. 25, the specular reflection layer S1 is disposed on a free magnetic layer 14, and a protective layer 15 composed of Ta or the like is formed on the specular reflection layer S1, thus constituting a laminate 16.

Figure 5:
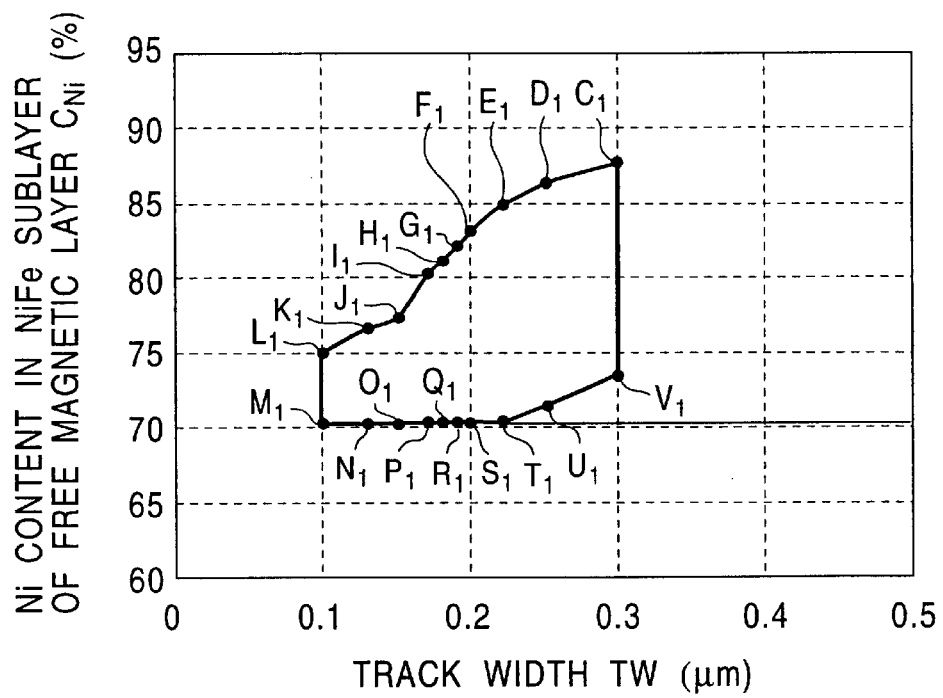
FIG. 5 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.
Figure 6:
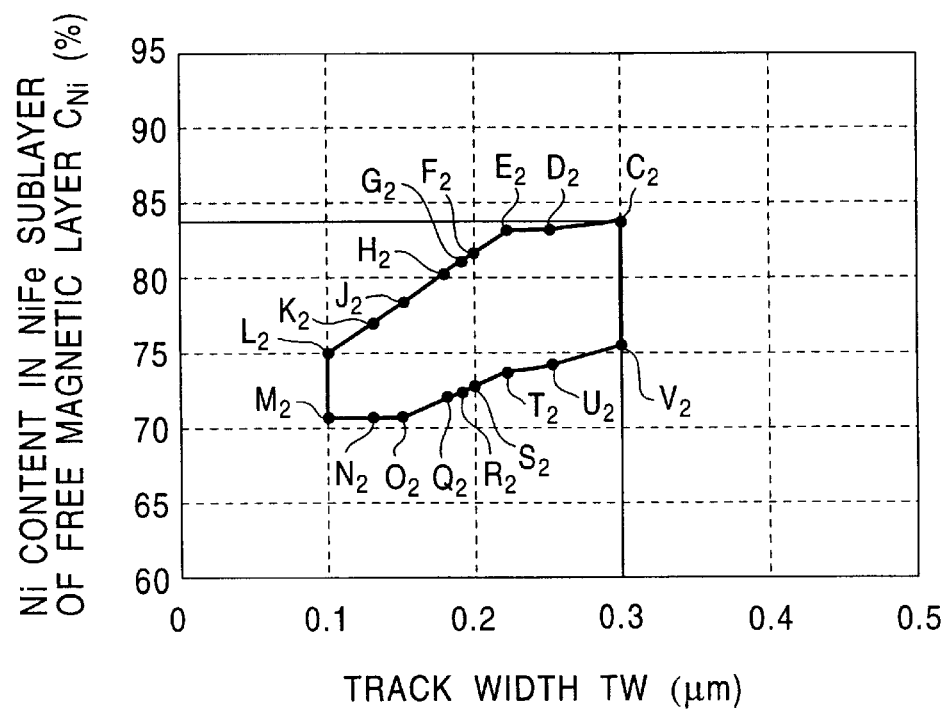
FIG. 6 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

FIGS. 5 and 6 are graphs showing ranges for the magnetic read track width Tw ($\mu$m) and the Ni content $C_{Ni}$ (at. %) in an NiFe alloy constituting at least a part of the free magnetic layer.

In this embodiment, the magnetic read track width Tw ($\mu$m) and the Ni content $C_{Ni}$ (at. %), which are shown in FIG. 5 as point (Tw, $C_{Ni}$), may be set within the range obtained by linking point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), and point $V_1$ (0.3, 73.6). If the above range is satisfied, it is possible to set the magnetostriction $\lambda$s of the free magnetic layer within the range defined by the corresponding track width range in FIG. 42. That is, the magnetic read track width Tw ($\mu$m) and the magnetostriction $\lambda$s ($\times 10^{-6}$), which are shown in FIG. 42 as point (Tw, $\lambda$s), can be set within the range obtained by linking point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), point $SS_1$ (0.25, −3), and point $ST_1$ (0.3, −5). The above range is more advantageous, in particular, to a magnetic head with a read track width of 0.3 $\mu$m or less in order to ensure necessary read output while distortion of regenerated waveforms and instability are suppressed.

In this embodiment, the magnetic read track width Tw ($\mu$m) and the Ni content $C_{Ni}$ (at. %), which are shown in FIG. 6 as point (Tw, $C_{Ni}$), may be set within the range obtained by linking point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), and point $V_2$ (0.3, 75.6). If the above range is satisfied, it is possible to set the magnetostriction $\lambda$s of the free magnetic layer within the range defined by the corresponding track width range in FIG. 43. That is, the magnetic read track width Tw ($\mu$m) and the magnetostriction $\lambda$s ($\times 10^{-6}$), which are shown in FIG. 43 as point (Tw, $\lambda$s), can be set within the range obtained by linking point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), point $SS_2$ (0.25, −1), and point $ST_2$ (0.3, −1.5). The above range is more advantageous, in particular, to a magnetic head with a read track width of 0.3 $\mu$m or less in order to more effectively suppress distortion of regenerated waveforms and instability, and to ensure necessary read output while the hard bias layers are set so that the product of the remanence and the thickness of the hard bias layers is suitable for controlling the effective magnetic read track width.

In this embodiment, the specular reflection layer S1 serves as a mean free path-extension layer for extending the mean free path of conduction electrons by the specular effect. As will be described below, the mean free path of spin-up conduction electrons which contribute to the magnetoresistance effect is extended, and a large rate of change in resistance ($\Delta R/R$) can be obtained in the spin-valve thin-film magnetic element because of the specular effect, and thus the element is suitable for higher-density recording.

The thickness of the specular reflection layer S1 is preferably in the range of 10 to 400 Å, and more preferably in the range of 10 to 200 Å. If the thickness of the specular reflection layer S1 is less than 10 Å, it is not possible to produce a continuous, uniform oxide film having a crystal structure which can form a potential barrier, resulting in an insufficient specular effect.

On the other hand, as the thickness of the specular reflection layer S1 is increased, the specular reflection layer S1 is likely to function as an antiferromagnetic film like the antiferromagnetic layer 11, resulting in an unexpected exchange coupling magnetic field (Hex). Therefore, the thickness is preferably below the upper limit described above. If the thickness of the specular reflection layer S1 is larger than the upper limit, when the spin-valve thin-film magnetic element is used for a thin-film magnetic head, a distance between shields, i.e., a read gap, becomes too wide, resulting in a decrease in the resolution of the head.

By setting the thickness of the specular reflection layer S1 as described above, the specular reflection layer S1 forms a potential barrier in the vicinity of the interface between the free magnetic layer 14 and the specular reflection layer S1, and it is possible to reflect spin-up conduction electrons which have been transported through the free magnetic layer 14 in the vicinity of the interface between the free magnetic layer 14 and the specular reflection layer S1 while the spinning state is maintained, and thus the mean free path of the spin-up electrons is further extended and the specular effect is exhibited.

In order to reflect the conduction electrons while maintaining the spinning state, it is effective to form a potential barrier at the interface between the free magnetic layer 14 and the specular reflection layer S1. That is, preferably, the free magnetic layer 14 is a good conductor, while the specular reflection layer S1 is an electrical insulator.

As the insulating material for meeting such a condition, an oxide is preferably used. Examples of oxides used include α—$Fe_2O_3$, NiO, CoO, Co—Fe—O, Co—Fe—Ni—O, $Al_2O_3$, Al—Q—O, where Q is at least one element selected from the group consisting of B, Si, N, Ti, V, Cr, Mn, Fe, Co, and Ni, and R—O, where R is at least one element selected from the group consisting of Ti, V, Cr, Zr, Nb, Mo, Hf, Ta, and W. The specular reflection layer S1 may be composed of such an insulating oxide. Alternatively, as the insulating material, a nitride may be used, such as Al—N, Al—Q—N, where Q is at least one element selected from the group consisting of B, Si, O, Ti, V, Cr, Mn, Fe, Co, and Ni, and R—N, where R is at least one element selected from the group consisting of Ti, V, Cr, Zr, Nb, Mo, Hf, Ta, and W.

When an antiferromagnetic material, such as α—$Fe_2O_3$ or NiO, is used for the specular reflection layer S1, the specular reflection layer S1 can also serve as a bias layer for aligning the magnetization of the free magnetic layer 14 in the X1 direction instead of the hard bias layer 17.

If the specular reflection layer S1 is deposited on the surface of the free magnetic layer 14 not in contact with the nonmagnetic conductive layer 13, the specular reflection layer S1 forms a potential barrier at the interface with the free magnetic layer 14, and spin-up conduction electrons moving in the free magnetic layer 14 can be reflected while maintaining the spinning status, i.e., the spin-up conduction electrons can be specularly reflected, and thus the mean free path of the spin-up electrons is further extended. That is, the so-called specular effect can be exhibited, and the mean free path of the spin-dependent conduction electrons is further extended, resulting in further improvement in the rate of change in magnetoresistance in the spin-valve thin-film magnetic element.

In accordance with the spin-valve thin-film magnetic element in this embodiment, the same advantages as those in the spin-valve thin-film magnetic element in the second embodiment shown in FIG. 23 are provided, and also since the specular reflection layer S1 is formed, it is possible to further improve the rate of change in magnetoresistance (ΔR/R) because of the specular effect.

Since the magnetic read track width Tw (μm) and the Ni content $C_{Ni}$ (at. %) in the free magnetic layer 14 or the magnetic read track width Tw (μm) and the magnetostriction λs (×$10^{-6}$) are set in the ranges described above, necessary read output is ensured in a magnetic head with a narrowed track width without increasing distortion of regenerated waveforms and instability.

Fourth Embodiment

Figure 26:
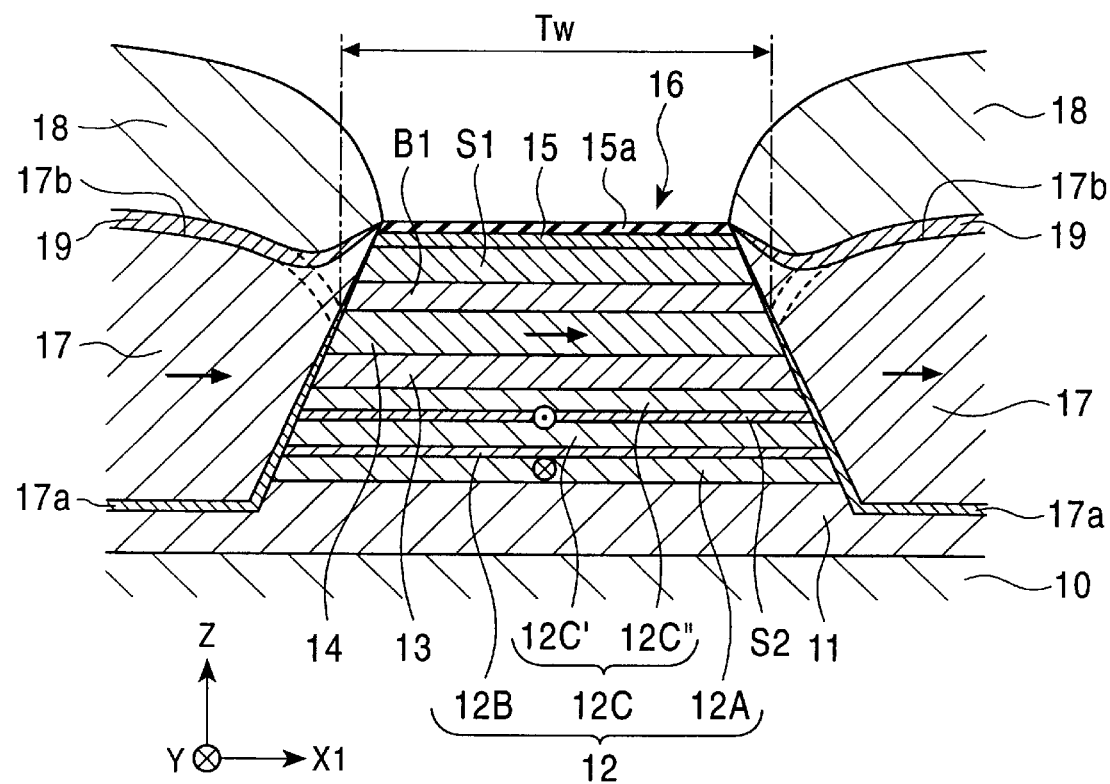
FIG. 26 is a sectional view of a spin-valve thin-film magnetic element in a fourth embodiment of the present invention, viewed from a surface facing a recording medium.

FIG. 26 is a sectional view of a spin-valve thin-film magnetic element in a fourth embodiment of the present invention, viewed from a surface facing a recording medium.

The spin-valve thin-film magnetic element in this embodiment is also a bottom-type synthetic ferri-pinned spin-valve thin-film element. The fourth embodiment differs from the second embodiment shown in FIG. 23 in that specular reflection layers S1 and S2 are provided and with respect to a free magnetic layer. Apart from this, the same constituents are represented by the same numerals as those in the second embodiment, and a description thereof is omitted.

As shown in FIG. 26, the specular reflection layer S1 is disposed on the upper surface of the back layer B1 opposite to the free magnetic layer 14 side, and like the third embodiment shown in FIG. 25, a protective layer 15 composed of Ta or the like is formed on the specular reflection layer S1, thus constituting a laminate 16.

In this embodiment, a pinned magnetic layer 12 has a multilayered structure, and as shown in FIG. 26, a second pinned magnetic sublayer 12C is divided by the specular reflection layer S2 in the thickness direction, so as to have a three-layered structure. Pinned magnetic sublayers 12C' and 12C'' are composed of substantially the same material as that for the second pinned magnetic sublayer 12C in the first embodiment shown in FIG. 21, and the total thickness of the pinned magnetic sublayers 12C' and 12C'' is set to be the same as the magnetic thickness of the second pinned magnetic sublayer 12C shown in FIG. 21.

The specular reflection layer S2, like the specular reflection layer S1, forms a potential barrier in the vicinity of the interface with the pinned magnetic sublayer 12C'', and it is possible to reflect spin-up conduction electrons which have been transported through the nonmagnetic conductive layer 13 and the pinned magnetic sublayer 12C'' in the vicinity of the interface between the pinned magnetic sublayer 12C'' and the specular reflection layer S2 while maintaining the spinning state, and thus the mean free path of the spin-up electrons is further extended and the specular effect is exhibited.

Since the magnetic interaction between the specular reflection layer S2 and the free magnetic layer 14 is minute, the same specular effect as that by the specular reflection layer S1 can be obtained while the magnetic influence on the free magnetic layer 14 is low.

Figure 7:
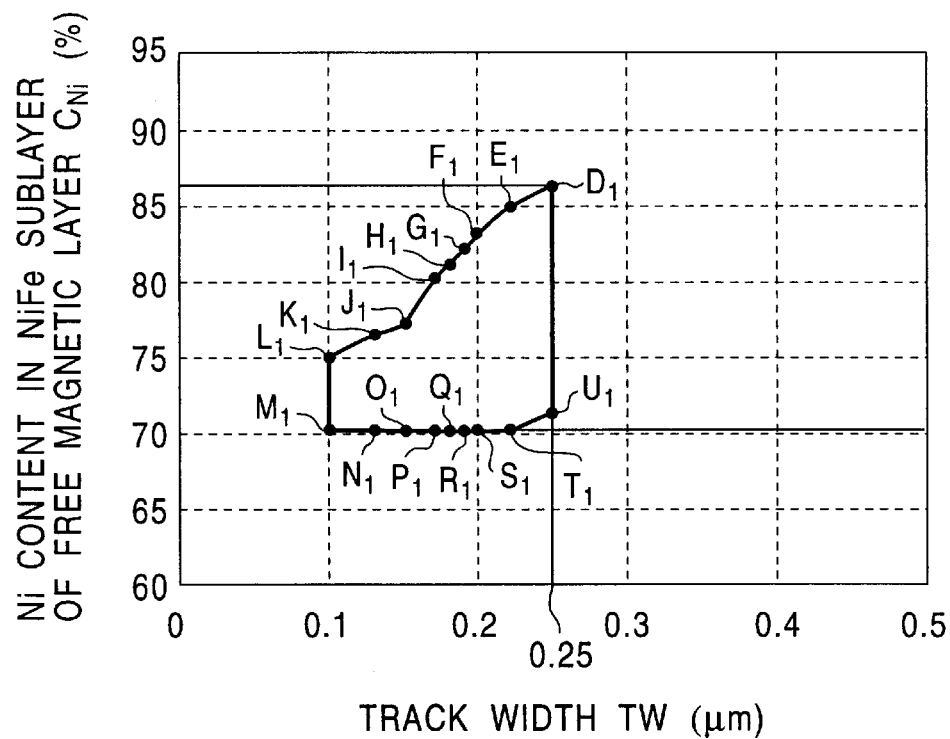
FIG. 7 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.
Figure 8:
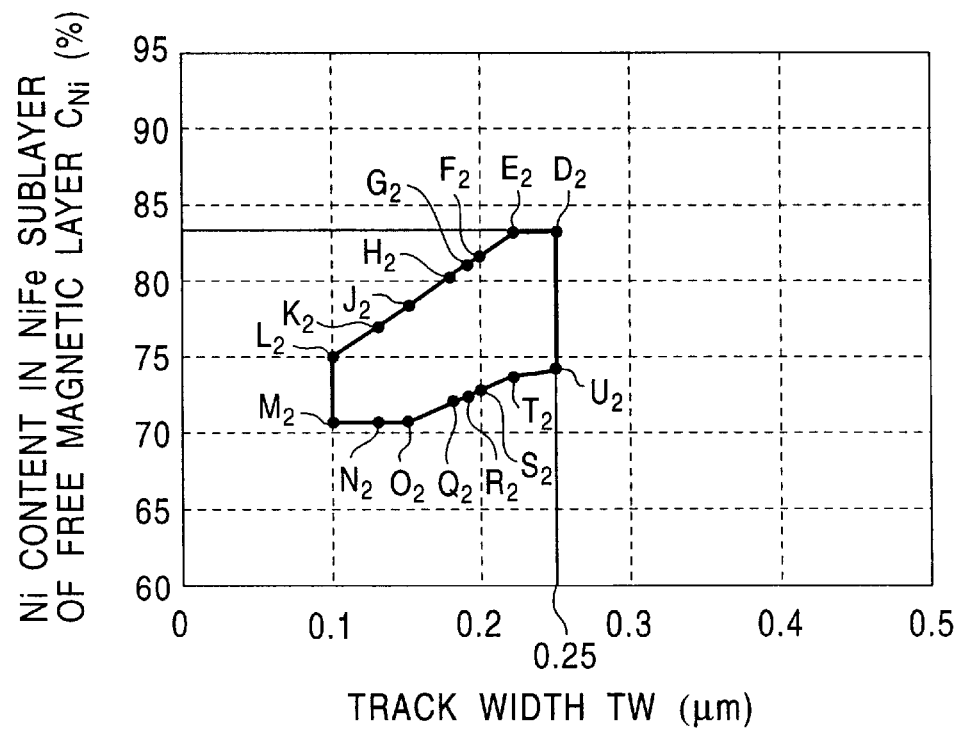
FIG. 8 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

FIGS. 7 and 8 are graphs showing ranges for the magnetic read track width Tw (μm) and the Ni content $C_{Ni}$ (at. %) in an NiFe alloy constituting at least a part of the free magnetic layer in this embodiment.

In this embodiment, the magnetic read track width Tw (μm) and the Ni content $C_{Ni}$ (at. %), which are shown in FIG. 7 as point (Tw, $C_{Ni}$), may be set within the range obtained by linking point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), and point $U_1$ (0.25, 71.5). If the above range is satisfied, it is possible to set the magnetostriction λs of the free magnetic layer within the range defined by the corresponding track width range in FIG. 42. That is, the magnetic read track width Tw (μm) and the magnetostriction λs (×$10^{-6}$), which are shown in FIG. 42 as point (Tw, λs), can be set within the range obtained by linking point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), and point $SS_1$ (0.25, −3). The above range is more advantageous, in particular, to a magnetic head with a read track width of 0.25 μm or less in order to ensure necessary read output while distortion of regenerated waveforms and instability are suppressed.

In this embodiment, the magnetic read track width Tw (μm) and the Ni content $C_{Ni}$ (at. %), which are shown in FIG. 8 as point (Tw, $C_{Ni}$), may be set within the range obtained by linking point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), and point $U_2$ (0.25, 74). If the above range is satisfied, it is possible to set the magnetostriction λs of the free magnetic layer within the range defined by the corresponding track width range in FIG. 43. That is, the magnetic read track width Tw (μm) and the magnetostriction λs ($\times 10^{-6}$), which are shown in FIG. 43 as point (Tw, λs), can be set within the range obtained by linking point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), and point $SS_2$ (0.25, −1). The above range is more advantageous, in particular, to a magnetic head with a read track width of 0.25 μm or less in order to more effectively suppress distortion of regenerated waveforms and instability, and to ensure necessary read output while the hard bias layers are set so that the product of the remanence and the thickness of the hard bias layers is suitable for controlling the effective magnetic read track width.

In accordance with the spin-valve thin-film magnetic element in this embodiment, the same advantages as those in the spin-valve thin-film magnetic elements shown in FIGS. 21 to 24 are provided, and also since the specular reflection layer S2 is formed, it is possible to further improve the rate of change in resistance (ΔR/R), and thus the element is suitable for track narrowing and an increase in recording density.

Since the magnetic read track width Tw (μm) and the Ni content $C_{Ni}$ (at. %) in the free magnetic layer 14 or the magnetic read track width Tw (μm) and the magnetostriction λs ($\times 10^{-6}$) are set in the ranges described above, necessary read output is ensured in a magnetic head with a narrowed track width without increasing distortion of regenerated waveforms and instability.

Fifth Embodiment

Figure 27:
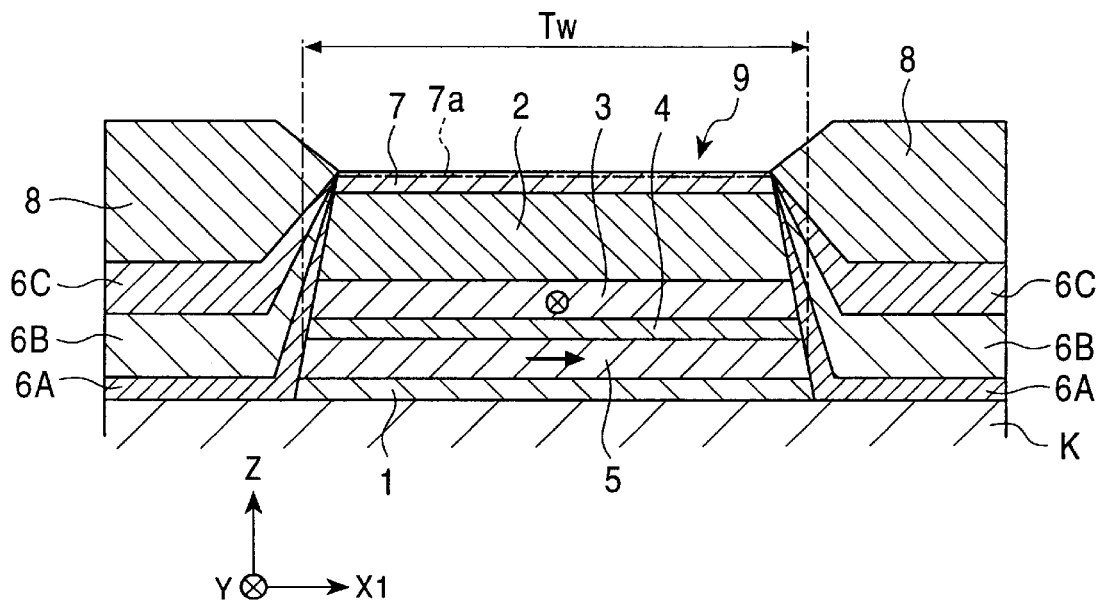
FIG. 27 is a sectional view of a spin-valve thin-film magnetic element in a fifth embodiment of the present invention, viewed from a surface facing a recording medium.

FIG. 27 is a sectional view of a spin-valve thin-film magnetic element in a fifth embodiment of the present invention, viewed from a surface facing a recording medium.

The spin-valve thin-film magnetic element in this embodiment is a top-type single spin-valve thin-film element, in which a free magnetic layer, a nonmagnetic conductive layer, a pinned magnetic layer, and an antiferromagnetic layer are deposited in that order on a substrate.

As shown in FIG. 27, an underlayer 1 is formed on a substrate K. A free magnetic layer 5, a nonmagnetic conductive layer 4, a pinned magnetic layer 3, an antiferromagnetic layer 2, and a protective layer 7 are formed on the underlayer 1. The underlayer 1, the free magnetic layer 5, the nonmagnetic conductive layer 4, the pinned magnetic layer 3, the antiferromagnetic layer 2, and the protective layer 7 constitute a laminate 9 having a substantially trapezoidal cross section.

Hard bias underlayers 6A, hard bias layers 6B, and interlayers 6C are deposited at both sides of the laminate 9, and electrode layers 8 are deposited on the interlayers 6C. The hard bias layers 6B are magnetized in the X1 direction, and thereby the magnetization of the free magnetic layer 5 is magnetized in the X1 direction.

The antiferromagnetic layer 2 has a thickness of approximately 50 to 300 Å in the center of the laminate 9, and is preferably composed of a PtMn alloy. The PtMn alloy has a higher corrosion resistance compared to an NiMn alloy or an FeMn alloy which has been conventionally used for antiferromagnetic layers, and also has a high blocking temperature and generates a large exchange coupling magnetic field (exchange anisotropic magnetic field).

Instead of the PtMn alloy, the antiferromagnetic layer 2 may be composed of an X—Mn alloy, where X is one element selected from the group consisting of Pd, Ru, Ir, Rh, and Os, or an X'—Pt—Mn alloy, where X1 is at least one element selected from the group consisting of Pd, Cr, Ru, Ni, Ir, Rh, Os, Au, Ag, Ne, Ar, Xe, and Kr.

In the PtMn alloy or the X—Mn alloy, the Pt content or the X content is preferably in the range of 37 to 63 atomic percent, and more preferably in the range of 47 to 57 atomic percent.

In the X'—Pt—Mn alloy, the X'+Pt content is preferably in the range of 37 to 63 atomic percent, and more preferably in the range of 47 to 57 atomic percent. Furthermore, in the X'—Pt—Mn alloy, the X' content is preferably in the range of 0.2 to 10 atomic percent.

However, when X' is at least one element selected from the group consisting of Pd, Ru, Ir, Rh, and Os, the X' content is preferably in the range of 0.2 to 40 atomic percent.

By using the alloy having the appropriate composition described above, followed by annealing, an antiferromagnetic layer 2 generating a large exchange coupling magnetic field can be obtained. In particular, an antiferromagnetic layer made of the PtMn alloy generates an exchange coupling magnetic field of 48 kA/m or more, for example, exceeding 64 kA/m, and has a blocking temperature, i.e., a temperature at which the exchange coupling magnetic field is lost, of 380° C. which is significantly high.

Although these alloys have a disordered face-centered cubic (fcc; a-axis and c-axis have the same lattice constant) as deposited, the structure is transformed into an ordered face-centered tetragonal (fct; a-axis/c-axis≠0.9) structure of CuAuI type by annealing treatment.

The pinned magnetic layer 3 is a ferromagnetic thin film composed of Co, an NiFe alloy, a CoNiFe alloy, a CoFe alloy, a CoNi alloy, or the like, and preferably has a thickness of approximately 10 to 50 Å. For example, the pinned magnetic layer 3 is composed of Co and has a thickness of 30 Å.

The pinned magnetic layer 3 is in contact with the antiferromagnetic layer 2. When annealing (heat treatment) is performed in a magnetic field, an exchange coupling magnetic field (exchange anisotropic magnetic field) is generated at the interface between the pinned magnetic layer 3 and the antiferromagnetic layer 2, and the magnetization of the pinned magnetic layer 3 is pinned in the Y direction.

The free magnetic layer 5 is a single layer composed of an NiFe alloy, a CoFe alloy, or a CoFeNi alloy, or is a multilayered film composed of a Co-alloy, such as CoFe, and an NiFe alloy. The thickness of the free magnetic layer 5 is preferably in the range of 10 to 50 Å, and more preferably in the range of 20 to 35 Å. A layer composed of Co may be provided at the nonmagnetic conductive layer 4 side of the free magnetic layer 5.

Figure 9:
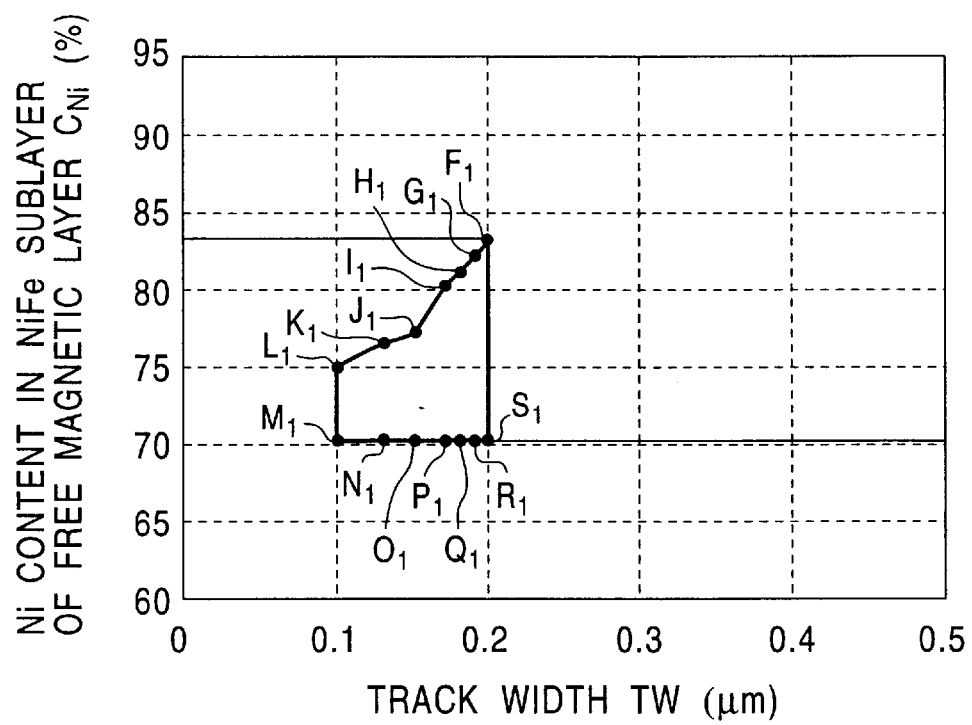
FIG. 9 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.
Figure 10:
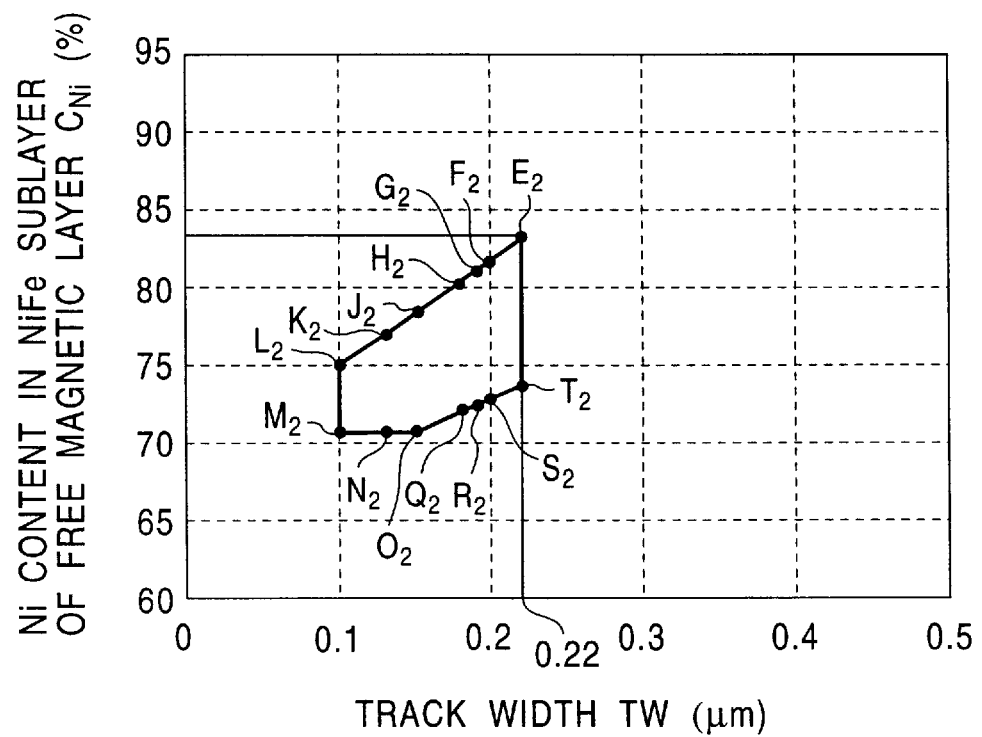
FIG. 10 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

FIGS. 9 and 10 are graphs showing ranges for the magnetic read track width Tw ($\mu$m) and the Ni content $C_{Ni}$ (at. %) in an NiFe alloy constituting at least a part of the free magnetic layer in this embodiment.

In this embodiment, the magnetic read track width Tw ($\mu$m) and the Ni content $C_{Ni}$ (at. %), which are shown in FIG. 9 as point (Tw, $C_{Ni}$), may be set within the range obtained by linking point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), and point $S_1$ (0.20, 70.2). If the above range is satisfied, it is possible to set the magnetostriction $\lambda$s of the free magnetic layer within the range defined by the corresponding track width range in FIG. 42. That is, the magnetic read track width Tw ($\mu$m) and the magnetostriction $\lambda$s ($\times 10^{-6}$), which are shown in FIG. 42 as point (Tw, $\lambda$s), can be set within the range obtained by linking point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), and point $SQ_1$ (0.2, -0.7). The above range is more advantageous, in particular, to a magnetic head with a read track width of 0.2 $\mu$m or less in order to ensure necessary read output while distortion of regenerated waveforms and instability are suppressed.

In this embodiment, the magnetic read track width Tw ($\mu$m) and the Ni content $C_{Ni}$ (at. %), which are shown in FIG. 10 as point (Tw, $C_{Ni}$), may be set within the range obtained by linking point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), and point $T_2$ (0.22, 73.6). If the above range is satisfied, it is possible to set the magnetostriction $\lambda$s of the free magnetic layer within the range defined by the corresponding track width range in FIG. 43. That is, the magnetic read track width Tw ($\mu$m) and the magnetostriction $\lambda$s ($\times 10^{-6}$), which are shown in FIG. 43 as point (Tw, $\lambda$s), can be set within the range obtained by linking point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), and point $SQ_2$ (0.22, 0). The above range is more advantageous, in particular, to a magnetic head with a read track width of 0.22 $\mu$m or less in order to more effectively suppress distortion of regenerated waveforms and instability, and to ensure necessary read output while the hard bias layers are set so that the product of the remanence and the thickness of the hard bias layers is suitable for controlling the effective magnetic read track width.

The nonmagnetic conductive layer 4 is composed of copper (Cu) or the like and has a thickness of 20 to 30 Å.

The protective layer 7 is composed of Ta and the surface thereof is oxidized to form an oxidized layer 7a.

The bias underlayers 6A act as buffer layers as well as alignment layers. The bias underlayers 6A are preferably composed of Cr or the like, and have a thickness of approximately 20 to 100 Å, and preferably approximately 50 Å. The interlayers 6C are, for example, composed of Ta, and have a thickness of approximately 50 Å.

The bias underlayers 6A and the interlayers 6C function as diffusion barriers when exposed to high temperatures in the insulating resist curing step (UV cure or hard bake), etc. which is performed in the subsequent manufacturing step for an inductive head (write head). Thereby, it is possible to prevent the magnetic properties of the hard bias layers 6B from being degraded due to thermal diffusion between the hard bias layers 6B and the peripheral layers.

The hard bias layers 6B usually have a thickness of approximately 200 to 700 Å, and are preferably composed of a Co—Pt alloy, a Co—Cr—Pt alloy, a Co—Cr—Ta alloy, or the like.

Since the hard bias layers 6B are magnetized in the X1 direction, the magnetization of the free magnetic layer 5 is aligned in the X1 direction. Thereby, the variable magnetization of the free magnetic layer 5 and the pinned magnetization of the pinned magnetic layer 3 are substantially orthogonal to each other.

Preferably, the hard bias layers 6B are disposed at the same level as that of the free magnetic layer 5, and have a larger thickness than that of the free magnetic layer 5 in the thickness direction of the free magnetic layer 5. Upper surfaces of the hard bias layers 6B are more distant from the substrate K than an upper surface of the free magnetic layer 5, i.e., located higher in FIG. 27, and lower surfaces of the hard bias layers 6B are substantially at the same level with a lower surface of the free magnetic layer 5 or nearer to the substrate K than the lower surface of the free magnetic layer 5, i.e., located lower in FIG. 27. The hard bias layers 6B are disposed at the same level as that of the free magnetic layer 5 and are joined with the laminate 9. Herein, "are disposed at the same level as that of the free magnetic layer 5 and are joined with the laminate 9" means a state in which at least the hard bias layers 6B and the free magnetic layer 5 are primarily magnetically coupled to each other, which also includes a case in which the thickness of the joints between the hard bias layers 6B and the free magnetic layer 5 is equal to or smaller than the thickness of the free magnetic layer 5. The upper surfaces of the hard bias layers 6B means the surfaces opposite to the substrate K side. Herein, "being joined" means primarily being magnetically coupled, which includes being in direct contact with each other as well as being connected to the laminate 9, for example, with the bias underlayers 6A, interlayers 6C, etc., therebetween.

The electrode layers 8 are single films composed of Cr, Au, Ta, or W, or multilayered films composed of at least two of these materials, and thereby the resistance can be decreased. If Cr is selected for the electrode layers 8 and is epitaxially grown on the interlayers 6C composed of Ta, the electrical resistance can be decreased.

In the spin-valve thin-film magnetic element having the structure shown in FIG. 27, a sensing current is applied from one of the electrode layers 8 to the laminate 9. When a magnetic field is applied from a magnetic recording medium in the Y direction, the magnetization of the free magnetic layer 5 is rotated from the X1 direction to the Y direction. At this stage, since spin-dependent scattering of conduction electrons occurs due to the GMR effect at the interface between the nonmagnetic conductive layer 4 and the free magnetic layer 5, electrical resistance changes, and thus a fringing magnetic field from the recording medium is detected.

In accordance with the spin-valve thin-film magnetic element in this embodiment, the same advantages as those in the spin-valve thin-film magnetic elements in the first to fourth embodiments shown in FIGS. 21 to 26 are provided, and it is possible to further improve the rate of change in resistance (ΔR/R), and thus the element is suitable for track narrowing and an increase in recording density.

Since the magnetic read track width Tw (μm) and the Ni content $C_{Ni}$ (at. %) in the free magnetic layer 5 or the magnetic read track width Tw (μm) and the magnetostriction λs (×10$^{-6}$) are set in the ranges described above, necessary read output is ensured in a magnetic head with a narrowed track width without increasing distortion of regenerated waveforms and instability.

Sixth Embodiment

Figure 28:
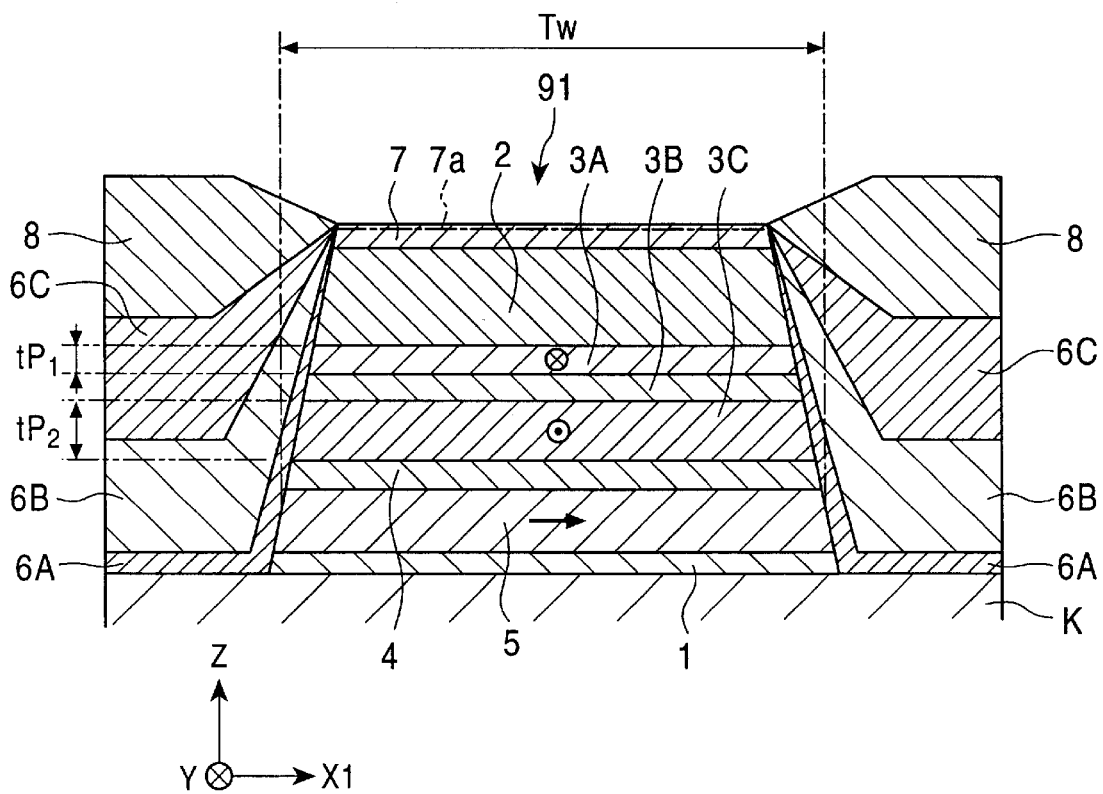
FIG. 28 is a sectional view of a spin-valve thin-film magnetic element in a sixth embodiment of the present invention, viewed from a surface facing a recording medium.

FIG. 28 is a sectional view of a spin-valve thin-film magnetic element in a sixth embodiment of the present invention, viewed from a surface facing a recording medium.

The spin-valve thin-film magnetic element in this embodiment is also a top-type single spin-valve thin-film element, substantially the same as the element in the fifth embodiment shown in FIG. 27. The same constituents are represented by the same numerals as those in the fifth embodiment, and a description thereof is omitted.

The sixth embodiment differs from the fifth embodiment in that a pinned magnetic layer is of a so-called "synthetic ferri-pinned" type in which a first pinned magnetic sublayer and a second pinned magnetic sublayer are separated by a nonmagnetic intermediate layer, and the magnetization directions of the first pinned magnetic sublayer and the second pinned magnetic sublayer are antiparallel to each other, thus forming a synthetic ferrimagnetic state, and with respect to a free magnetic layer.

In this embodiment, a second pinned magnetic sublayer 3C, a nonmagnetic intermediate layer 3B, and a first pinned magnetic sublayer 3A are formed on a nonmagnetic conductive layer 4 composed of Cu or the like. The magnetization direction of the second pinned magnetic sublayer 3C is antiparallel to the magnetization direction of the first pinned magnetic sublayer 3A.

An antiferromagnetic layer 2 composed of a PtMn alloy is formed on the first pinned magnetic sublayer 3A.

The first and second pinned magnetic sublayers 3A and 3C are ferromagnetic thin films composed of Co, an NiFe alloy, a CoNiFe alloy, a CoFe alloy, a CoNi alloy, or the like, and preferably have a thickness of approximately 40 Å in total. For example, the first pinned magnetic sublayer 3A is composed of Co and has a thickness of 13 to 20 Å, and the second pinned magnetic sublayer 3C is composed of Co and has a thickness of 15 to 25 Å.

The nonmagnetic intermediate layer 3B is preferably composed of Ru, Rh, Ir, Cr, Re, or Cu or an alloy of at least two of these elements, and usually has a thickness of approximately 8 Å.

The first pinned magnetic sublayer 3A is in contact with the antiferromagnetic layer 2. When annealing (heat treatment) is performed in a magnetic field, an exchange coupling magnetic field (exchange anisotropic magnetic field) is generated at the interface between the first pinned magnetic sublayer 3A and the antiferromagnetic layer 2, and the magnetization of the first pinned magnetic sublayer 3A is pinned in the Y direction as shown in FIG. 28. If the magnetization of the first pinned magnetic sublayer 3A is pinned in the Y direction, the magnetization of the second pinned magnetic sublayer 3C which is opposed to the first pinned magnetic sublayer 3A with the nonmagnetic intermediate layer 3B therebetween is pinned antiparallel to the magnetization of the first pinned magnetic sublayer 3A, i.e., in the direction opposite to the Y direction.

As shown in FIG. 28, the individual layers from an underlayer 1 to an oxidized layer 7a constitute a laminate 91 having a substantially trapezoidal cross section.

Figure 11:
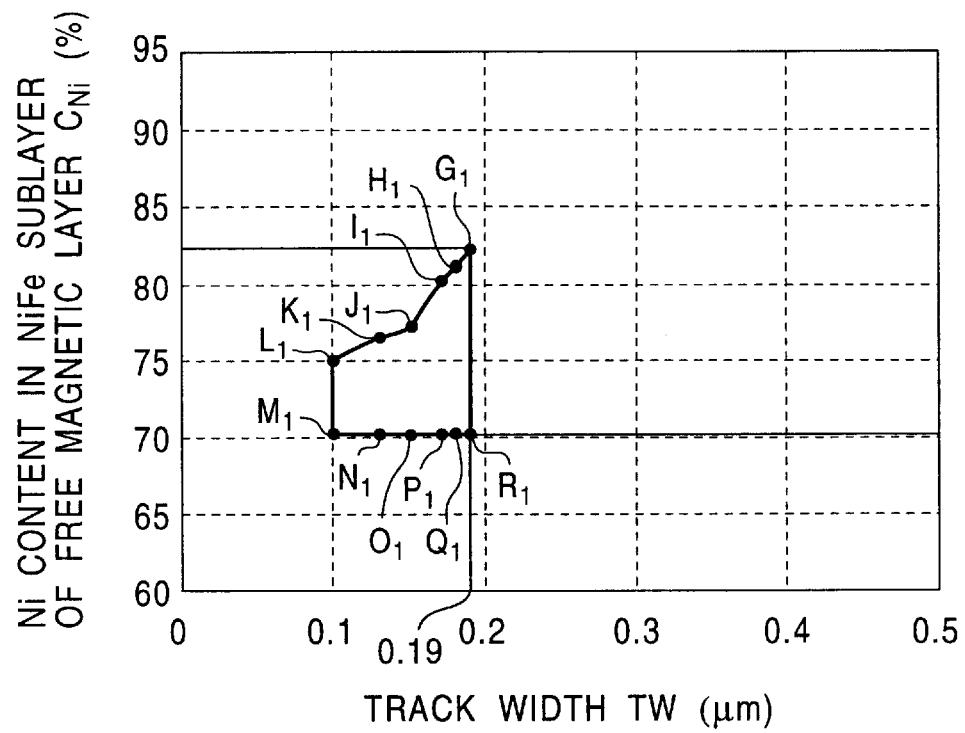
FIG. 11 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.
Figure 12:
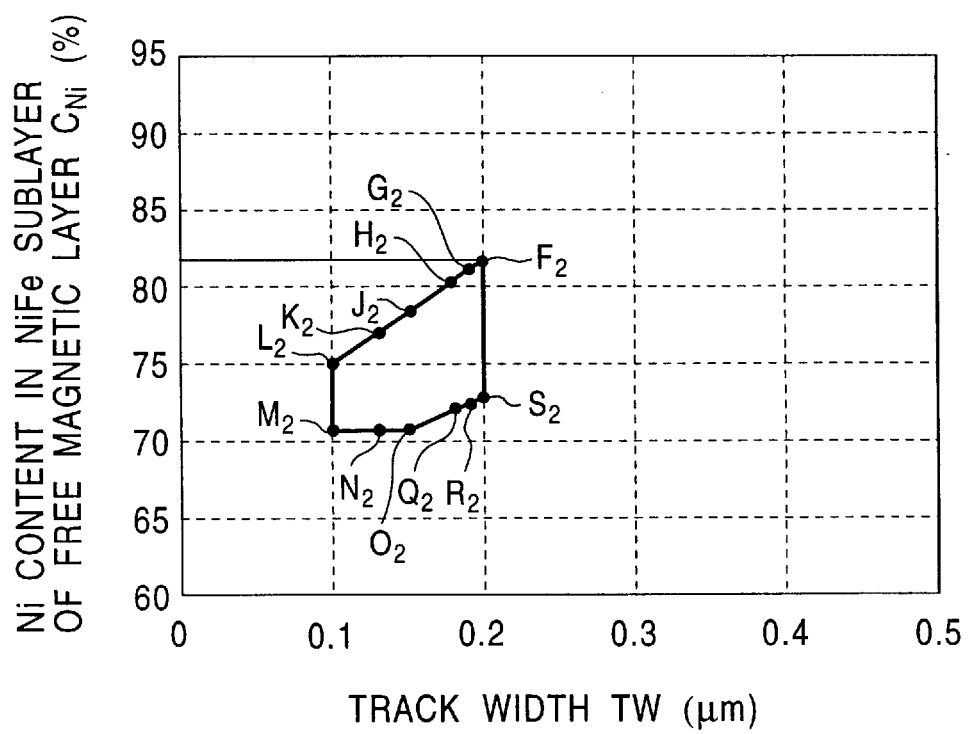
FIG. 12 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

FIGS. 11 and 12 are graphs showing ranges for the magnetic read track width Tw (μm) and the Ni content $C_{Ni}$ (at. %) in an NiFe alloy constituting at least a part of the free magnetic layer in this embodiment.

In this embodiment, the magnetic read track width Tw (μm) and the Ni content $C_{Ni}$ (at. %), which are shown in FIG. 11 as point (Tw, $C_{Ni}$), may be set within the range obtained by linking point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), and point $R_1$ (0.19, 70.2). If the above range is satisfied, it is possible to set the magnetostriction λs of the free magnetic layer within the range defined by the corresponding track width range in FIG. 42. That is, the magnetic read track width Tw (μm) and the magnetostriction λs (×10$^{-6}$), which are shown in FIG. 42 as point (Tw, λs), can be set within the range obtained by linking point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), and point $SP_1$ (0.19, 0). The above range is more advantageous, in particular, to a magnetic head with a read track width of 0.19 μm or less in order to ensure necessary read output while distortion of regenerated waveforms and instability are suppressed.

In this embodiment, the magnetic read track width Tw (μm) and the Ni content $C_{Ni}$ (at. %), which are shown in FIG. 12 as point (Tw, $C_{Ni}$), may be set within the range obtained by linking point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), and point $S_2$ (0.20, 72.5). If the above range is satisfied, it is possible to set the magnetostriction λs of the free magnetic layer within the range defined by the corresponding track width range in FIG. 43. That is, the magnetic read track width Tw (μm) and the magnetostriction λs (×10$^{-6}$), which are shown in FIG. 43 as point (Tw, λs), can be set within the range obtained by linking point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), and point $SP_2$ (0.2, 1). The above range is more advantageous, in particular, to a magnetic head with a read track width of 0.2 μm or less in order to more effectively suppress distortion of regenerated waveforms and instability, and to ensure necessary read output while the hard bias layers are set so that the product of the remanence and the thickness of the hard bias layers is suitable for controlling the effective magnetic read track width.

In accordance with the spin-valve thin-film magnetic element in this embodiment, the same advantages as those in the spin-valve thin-film magnetic elements in the first to fifth embodiments shown in FIGS. 21 to 27 are provided, and it is possible to further improve the rate of change in resistance (ΔR/R), and thus the element is suitable for track narrowing and an increase in recording density. Since the spin-valve thin-film magnetic element is of the so-called synthetic ferri-pinned type, it is possible to avoid asymmetry of regenerated waveform which easily occurs when sensitivity is increased by decreasing the thickness of the free magnetic layer, and also it is possible to prevent Barkhausen noise, etc., resulting in instability leading to inaccurate processing of signals from the magnetic recording medium.

Since the magnetic read track width Tw ($\mu$m) and the Ni content $C_{Ni}$ (at.%) in the free magnetic layer 5 or the magnetic read track width Tw ($\mu$m) and the magnetostriction $\lambda$s ($\times 10^{-6}$) are set in the ranges described above, necessary read output is ensured in a magnetic head with a narrowed track width without increasing distortion of regenerated waveforms and instability.

Seventh Embodiment

Figure 29:
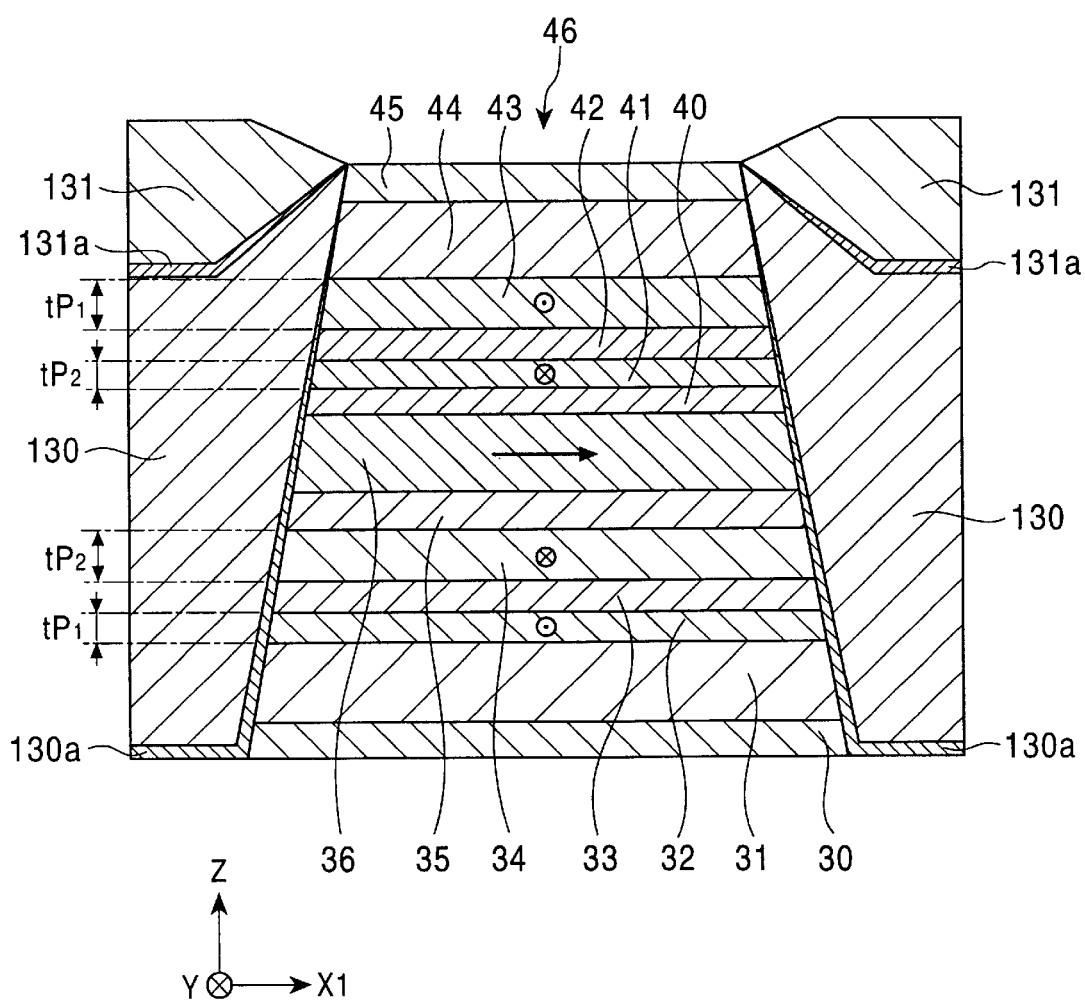
FIG. 29 is a sectional view of a spin-valve thin-film magnetic element in a seventh embodiment of the present invention, viewed from a surface facing a recording medium.

FIG. 29 is a sectional view of a spin-valve thin-film magnetic element in a seventh embodiment of the present invention, viewed from a surface facing a recording medium.

The spin-valve thin-film magnetic element is a so-called dual spin-valve thin-film element, in which a nonmagnetic conductive layer, a pinned magnetic layer, and an antiferromagnetic layer are formed on either side in the thickness direction of a free magnetic layer. In the dual spin-valve thin-film magnetic element, since two units of free magnetic layer/nonmagnetic conductive layer/pinned magnetic layer are present, each unit exhibiting a magnetoresistance effect, a larger $\Delta R/R$ can be expected compared to a single spin-valve thin-film element, and thus the element is suitable for higher-density recording.

The spin-valve thin-film magnetic element shown in FIG. 29 includes an underlayer 30, a lower antiferromagnetic layer 31, a lower first pinned magnetic sublayer 32, a lower nonmagnetic intermediate layer 33, a lower second pinned magnetic sublayer 34, a lower nonmagnetic layer 35, a free magnetic layer 36, an upper nonmagnetic conductive layer 40, an upper second pinned magnetic sublayer 44, an upper nonmagnetic intermediate layer 42, an upper first pinned magnetic sublayer 43, an upper antiferromagnetic layer 44, and a protective layer 45 deposited in that order on a substrate. As shown in FIG. 29, at both sides of a laminate 46 including the individual layers from the underlayer 30 to the protective layer 45, bias underlayers 130a, hard bias layers 130, interlayers 131a, and electrode layers 131 are formed.

The antiferromagnetic layers 31 and 44 are preferably composed of a PtMn alloy. Alternatively, the antiferromagnetic layers 31 and 44 may be composed of an X—Mn alloy, where X is one element selected from the group consisting of Pd, Ir, Rh, and Ru, or a Pt—Mn—X' alloy, where X' is at least one element selected from the group consisting of Pd, Ir, Rh, Ru, Au, and Ag.

The free magnetic layer 36 is a single layer composed of an NiFe alloy, a CoFe alloy, or a CoFeNi alloy, or a multilayered film composed of a Co alloy, such as a CoFe alloy, and an Ni alloy, and the thickness thereof is in the range of 10 to 50 Å, and more preferably in the range of 20 to 35 Å. A layer composed of Co may be provided on each of the nonmagnetic conductive layer 35 and 40 sides of the free magnetic layer 36, i.e., on each of lower and upper surfaces of the free magnetic layer 36.

Figure 13:
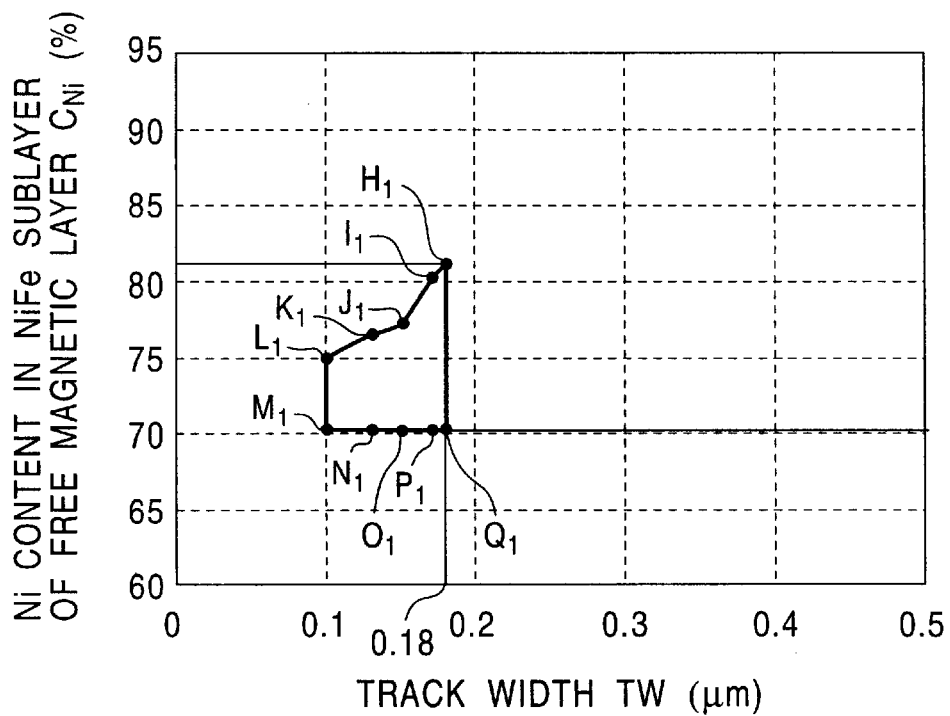
FIG. 13 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.
Figure 14:
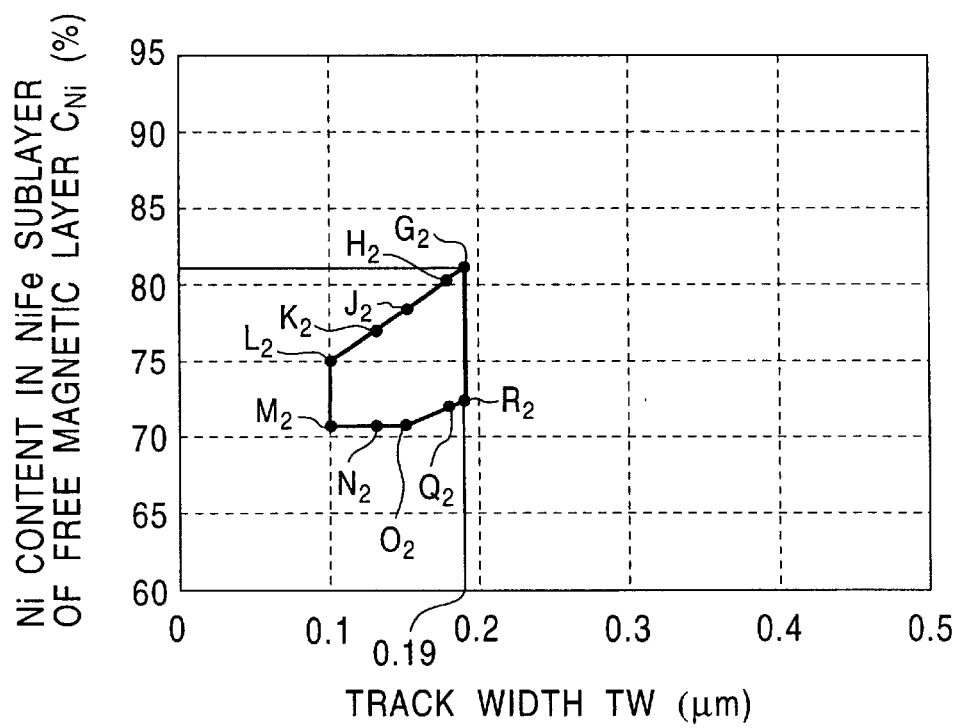
FIG. 14 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

FIGS. 13 and 14 are graphs showing ranges for the magnetic read track width Tw ($\mu$m) and the Ni content $C_{Ni}$ (at. %) in an NiFe alloy constituting at least a part of the free magnetic layer in this embodiment.

In this embodiment, the magnetic read track width Tw ($\mu$m) and the Ni content $C_{Ni}$ (at. %), which are shown in FIG. 13 as point (Tw, $C_{Ni}$), may be set within the range obtained by linking point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), and point $Q_1$ (0.18, 70.2). If the above range is satisfied, it is possible to set the magnetostriction $\lambda$s of the free magnetic layer within the range defined by the corresponding track width range in FIG. 42. That is, the magnetic read track width Tw ($\mu$m) and the magnetostriction $\lambda$s ($\times 10^{-6}$), which are shown in FIG. 42 as point (Tw, $\lambda$s), can be set within the range obtained by linking point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), and point $SO_1$ (0.18, 1). The above range is more advantageous, in particular, to a magnetic head with a read track width of 0.18 $\mu$m or less in order to ensure necessary read output while distortion of regenerated waveforms and instability are suppressed.

In this embodiment, the magnetic read track width Tw ($\mu$m) and the Ni content $C_{Ni}$ (at. %), which are shown in FIG. 14 as point (Tw, $C_{Ni}$), may be set within the range obtained by linking point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), and point $R_2$ (0.19, 72). If the above range is satisfied, it is possible to set the magnetostriction $\lambda$s of the free magnetic layer within the range defined by the corresponding track width range in FIG. 43. That is, the magnetic read track width Tw ($\mu$m) and the magnetostriction $\lambda$s ($\times 10^{-6}$), which are shown in FIG. 43 as point (Tw, $\lambda$s), can be set within the range obtained by linking point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), and point $SO_2$ (0.19, 1.2). The above range is more advantageous, in particular, to a magnetic head with a read track width of 0.19 $\mu$m or less in order to more effectively suppress distortion of regenerated waveforms and instability, and to ensure necessary read output while the hard bias layers are set so that the product of the remanence and the thickness of the hard bias layers is suitable for controlling the effective magnetic read track width.

In the spin-valve thin-film magnetic element in this embodiment, preferably, the ratio of the thickness $tP_1$ of the lower first pinned magnetic sublayer 32 to the thickness $tP_2$ of the lower second pinned magnetic sublayer 34, and the ratio of the thickness $tP_1$ of the upper first pinned magnetic sublayer 43 to the thickness $tP_2$ of the upper second pinned magnetic sublayer 41 are in the range of 0.33 to 0.95 or in the range of 1.05 to 4. Furthermore, when the thickness ratios satisfy the above range, if the thickness $tP_1$ of the lower and upper first pinned magnetic sublayers 32 and 43 and the thickness $tP_2$ of the lower and upper second pinned magnetic sublayers 34 and 41 are in the range of 10 to 70 Å, and also if the absolute value obtained by subtracting the thickness $tP_2$ of the second pinned magnetic sublayers 34 and 41 from the thickness $tP_1$ of the first pinned magnetic sublayers 32 and 43 is 2 Å or more, an exchange coupling magnetic field of 40 kA/m or more can be generated.

Additionally, by appropriately adjusting the thickness ratios and the thicknesses of the lower and upper first pinned magnetic sublayers 32 and 43 and the lower and upper second pinned magnetic sublayers 33 and 42; the thickness of the nonmagnetic intermediate layers; the thickness of the antiferromagnetic layers 31 and 41 within the ranges described above, a sufficient rate of change in resistance ($\Delta R/R$) can be maintained.

The bias underlayers 130a act as buffer layers as well as alignment layers. The bias underlayers 130a are preferably composed of Cr or the like, and have a thickness of approximately 20 to 100 Å, and preferably approximately 50

Å. The interlayers 131a are, for example, composed of Ta, and have a thickness of approximately 50 Å.

The bias underlayers 130a and the interlayers 131a function as diffusion barriers when exposed to high temperatures in the insulating resist curing step (UV cure or hard bake), etc. which is performed in the subsequent manufacturing step for an inductive head (write head). Thereby, it is possible to prevent the magnetic properties of the hard bias layers 130 from being degraded due to thermal diffusion between the hard bias layers 130 and the peripheral layers and to prevent the properties of the electrode layers 131 from being degraded due to thermal diffusion between the electrode layers 131 and the peripheral layers.

The hard bias layers 130 usually have a thickness of approximately 200 to 800 Å, and are preferably composed of a Co—Pt alloy, a Co—Cr—Pt alloy, a Co—Cr—Ta alloy, or the like.

Since the hard bias layers 130 are magnetized in the X1 direction, the magnetization of the free magnetic layer 36 is aligned in the X1 direction. Thereby, the variable magnetization of the free magnetic layer 36 and the pinned magnetizations of the lower and upper second pinned magnetic sublayers 34 and 41 are substantially orthogonal to each other. The hard bias layers 130 must be magnetically coupled to the free magnetic layer 36. In order to reduce the influence of the hard bias layers 130 on the pinned magnetic sublayers 32, 34, 41, and 43, for example, the hard bias layers 130 may be disposed at substantially the same position, in the thickness direction, as that of the free magnetic layer 36.

Since the electrode layers 131 are single layers composed of Cr, Au, Ta, or W, or multilayered films composed of at least two of these materials, it is possible to decrease the resistance. If Cr is selected for the electrode layers 131 and is epitaxially grown on the interlayers 131a composed of Ta, the electrical resistance can be decreased.

In accordance with the spin-valve thin-film magnetic element in this embodiment, the same advantages as those in the spin-valve thin-film magnetic elements in the first to sixth embodiments shown in FIGS. 21 to 28 are provided, and it is possible to further improve the rate of change in resistance ($\Delta R/R$) because the spin-valve thin-film magnetic element has the dual-type structure, and thus the element is suitable for track narrowing and an increase in recording density. Since the spin-valve thin-film magnetic element is of the so-called synthetic ferri-pinned type, it is possible to reduce asymmetry of regenerated waveform, and also it is possible to prevent Barkhausen noise, etc., resulting in instability leading to inaccurate processing of signals from the magnetic recording medium.

Since the magnetic read track width Tw ($\mu$m) and the Ni content $C_{Ni}$ (at. %) in the free magnetic layer 36 or the magnetic read track width Tw ($\mu$m) and the magnetostriction $\lambda$s ($\times 10^{-6}$) are set in the ranges described above, necessary read output is ensured in a magnetic head with a narrowed track width without increasing distortion of regenerated waveforms and instability.

Eighth Embodiment

Figure 30:
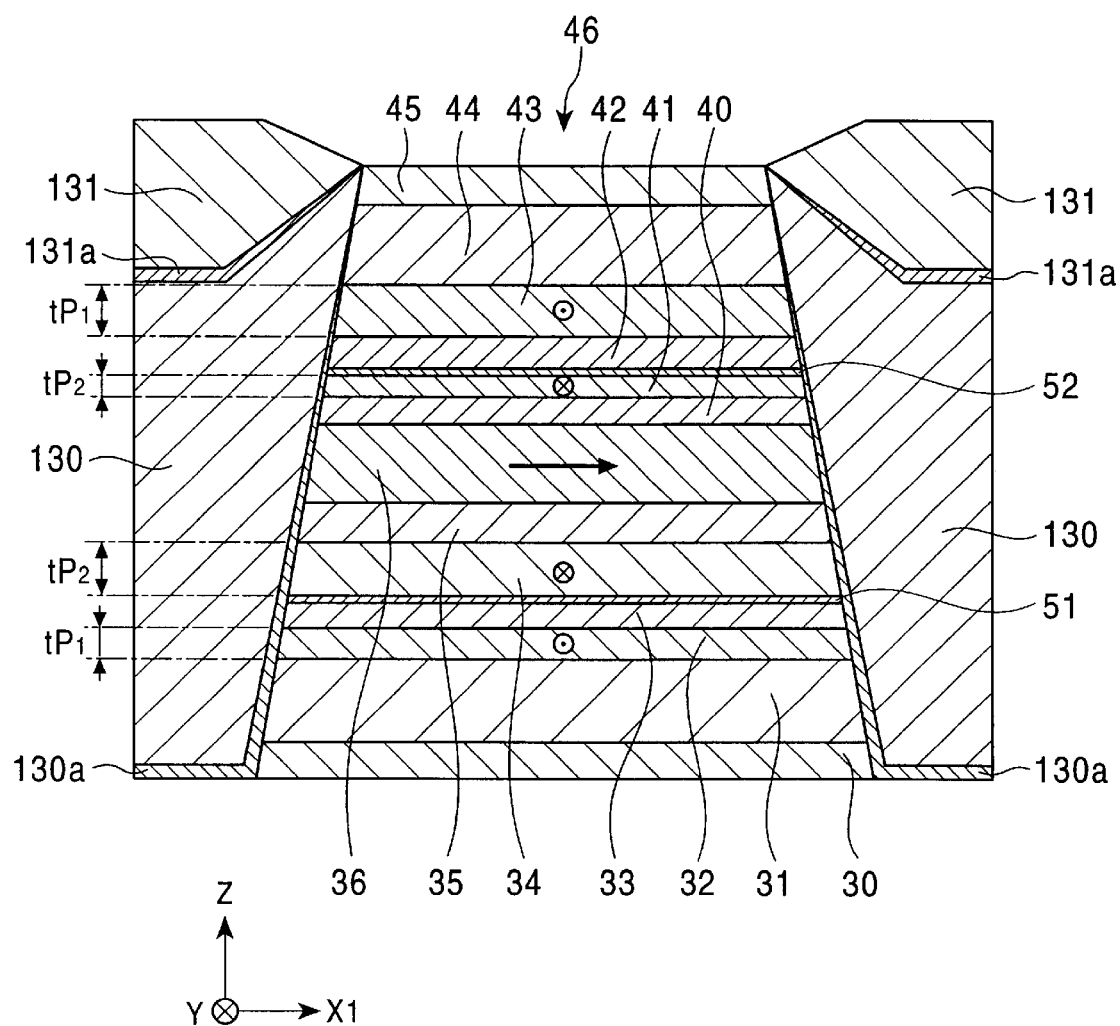
FIG. 30 is a sectional view of a spin-valve thin-film magnetic element in an eighth embodiment of the present invention, viewed from a surface facing a recording medium.

FIG. 30 is a sectional view of a spin-valve thin-film magnetic element in an eighth embodiment of the present invention, viewed from a surface facing a recording medium.

The spin-valve thin-film magnetic element in this embodiment is also a dual single spin-valve thin-film magnetic element of the synthetic ferri-pinned type, substantially the same as the element in the seventh embodiment shown in FIG. 29. The same constituents are represented by the same numerals as those in the seventh embodiment, and a description thereof is omitted.

The eighth embodiment differs from the seventh embodiment in that specular reflection layers 51 and 52 composed of a ferromagnetic insulating material are provided on parts of a lower second pinned magnetic sublayer 34 and an upper second pinned magnetic sublayer 41, and with respect to a free magnetic layer.

The specular reflection layers 51 and 52 correspond to the specular reflection layer S1 in the fourth embodiment shown in FIG. 26. A large rate of change in resistance ($\Delta R/R$) can be obtained by the specular effect, and thus the element is suitable for an increase in recording density, and a detailed description thereof will be omitted.

Figure 15:
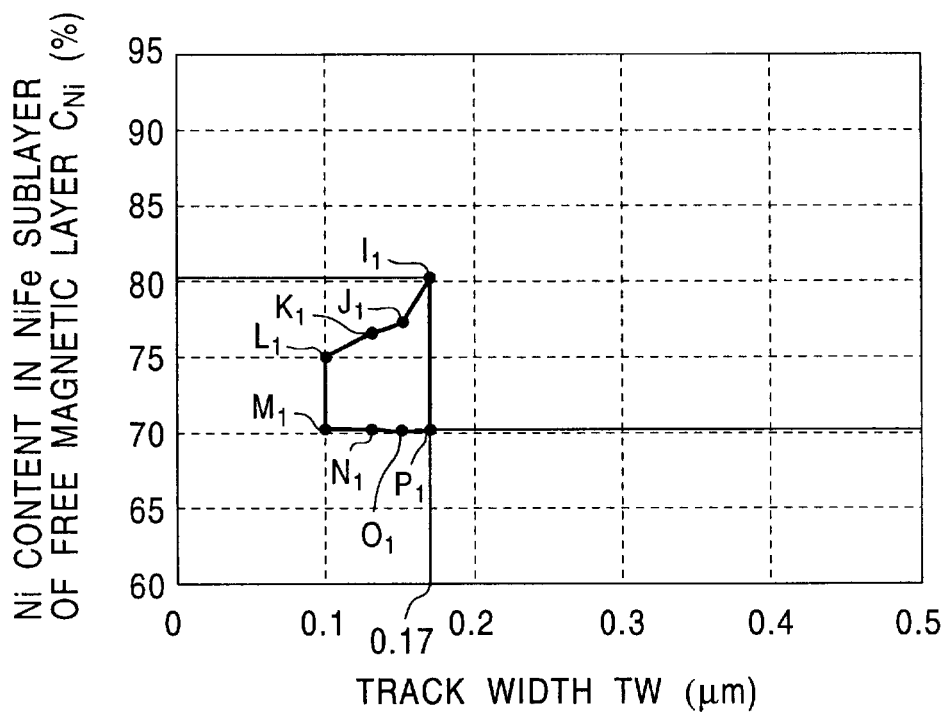
FIG. 15 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.
Figure 16:
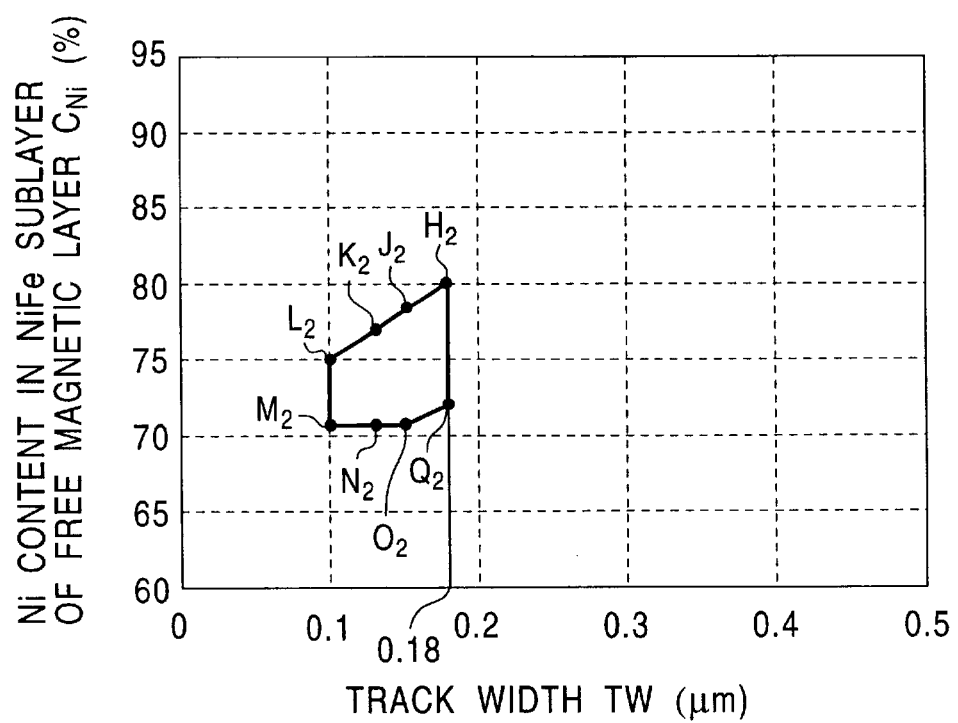
FIG. 16 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

FIGS. 15 and 16 are graphs showing ranges for the magnetic read track width Tw ($\mu$m) and the Ni content $C_{Ni}$ (at. %) in an NiFe alloy constituting at least a part of the free magnetic layer in this embodiment.

In this embodiment, the magnetic read track width Tw ($\mu$m) and the Ni content $C_{Ni}$ (at. %), which are shown in FIG. 15 as point (Tw, $C_{Ni}$), may be set within the range obtained by linking point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), and point $P_1$ (0.17, 70.2). If the above range is satisfied, it is possible to set the magnetostriction $\lambda$s of the free magnetic layer 36 within the range defined by the corresponding track width range in FIG. 42. That is, the magnetic read track width Tw ($\mu$m) and the magnetostriction $\lambda$s ($\times 10^{-6}$), which are shown in FIG. 42 as point (Tw, $\lambda$s), can be set within the range obtained by linking point $SI_1$ (0.17, 20), point $SJ_1$ (0.15, 20), point $SK_1$ (0.1, 20), point $SL_1$ (0.1, 9), point $SM_1$ (0.15, 3.5), and point $SN_1$ (0.17, 2). The above range is more advantageous, in particular, to a magnetic head with a read track width of 0.17 $\mu$m or less in order to ensure necessary read output while distortion of regenerated waveforms and instability are suppressed.

In this embodiment, the magnetic read track width Tw ($\mu$m) and the Ni content $C_{Ni}$ (at. %), which are shown in FIG. 16 as point (Tw, $C_{Ni}$), may be set within the range obtained by linking point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), and point $Q_2$ (0.18, 71.7). If the above range is satisfied, it is possible to set the magnetostriction $\lambda$s of the free magnetic layer within the range defined by the corresponding track width range in FIG. 43. That is, the magnetic read track width Tw ($\mu$m) and the magnetostriction $\lambda$s ($\times 10^{-6}$), which are shown in FIG. 43 as point (Tw, $\lambda$s), can be set within the range obtained by linking point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), and point $SN_2$ (0.18, 1.5). The above range is more advantageous, in particular, to a magnetic head with a read track width of 0.18 $\mu$m or less in order to more effectively suppress distortion of regenerated waveforms and instability, and to ensure necessary read output while the hard bias layers are set so that the product of the remanence and the thickness of the hard bias layers is suitable for controlling the effective magnetic read track width.

In accordance with the spin-valve thin-film magnetic element in this embodiment, the same advantages as those in the spin-valve thin-film magnetic elements in the first to seventh embodiments shown in FIGS. 21 to 29 are provided, and it is possible to further improve the rate of change in resistance (ΔR/R), and thus the element is suitable for track narrowing and an increase in recording density.

Since the magnetic read track width Tw (μm) and the Ni content $C_{Ni}$ (at. %) in the free magnetic layer 36 or the magnetic read track width Tw (μm) and the magnetostriction λs (×10$^{-6}$) are set in the ranges described above, necessary read output is ensured in a magnetic head with a narrowed track width without increasing distortion of regenerated waveforms and instability.

Moreover, in the prevent invention, with respect to the free magnetic layers 5, 14, and 36 in the individual embodiments described above, it is possible to apply the magnetic read track width Tw (μm) and the Ni content $C_{Ni}$ (at. %) in the free magnetic layer in any one of the other embodiments.

That is, with respect to the free magnetic layers 5, 14, and 36 in the individual embodiments described above, it is possible to apply the magnetic read track width Tw (μm) and the magnetostriction λs (×10$^{-6}$) in the free magnetic layer in any one of the other embodiments.

Figure 17:
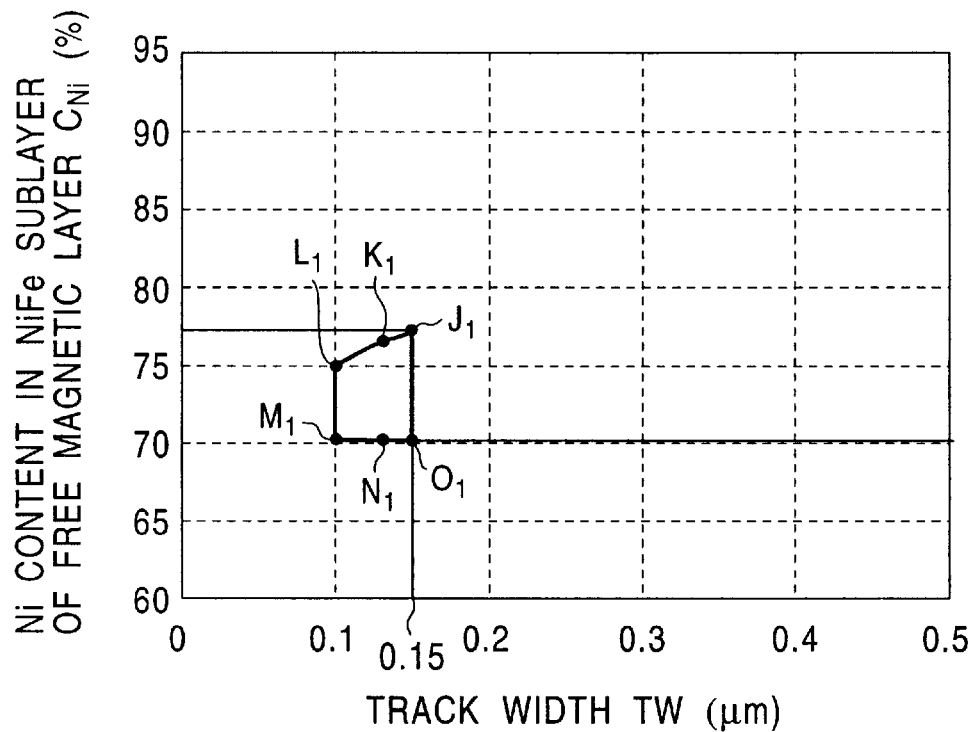
FIG. 17 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

Furthermore, in each of the embodiments described above, the magnetic read track width Tw (μm) and the Ni content $C_{Ni}$ (at. %), which are shown in FIG. 17 as point (Tw, $C_{Ni}$), may be set within the range obtained by linking point $J_1$ (0.15, 77.3), point $K_1$ (0.13, 76.8), point $L_1$ (0.1, 75), point $M_1$ (0.1, 70.2), point $N_1$ (0.13, 70.2), and point $O_1$ (0.15, 70.2). If the above range is satisfied, it is possible to set the magnetostriction λs of the free magnetic layer within the range defined by the corresponding track width range in FIG. 42. That is, in the free magnetic layer 5, 14, or 36, the magnetic read track width Tw (μm) and the magnetostriction λs (×10$^{-6}$), which are shown in FIG. 42 as point (Tw, λs), can be set within the range obtained by linking point $SJ_1$ (0.15, 20), point $SK_1$ (0.1, 20), point $SL_1$ (0.1, 9), and point $SM_1$ (0.15, 3.5). The above range is more advantageous, in particular, to a magnetic head with a read track width of 0.15 μm or less in order to ensure necessary read output while distortion of regenerated waveforms and instability are suppressed.

Figure 18:
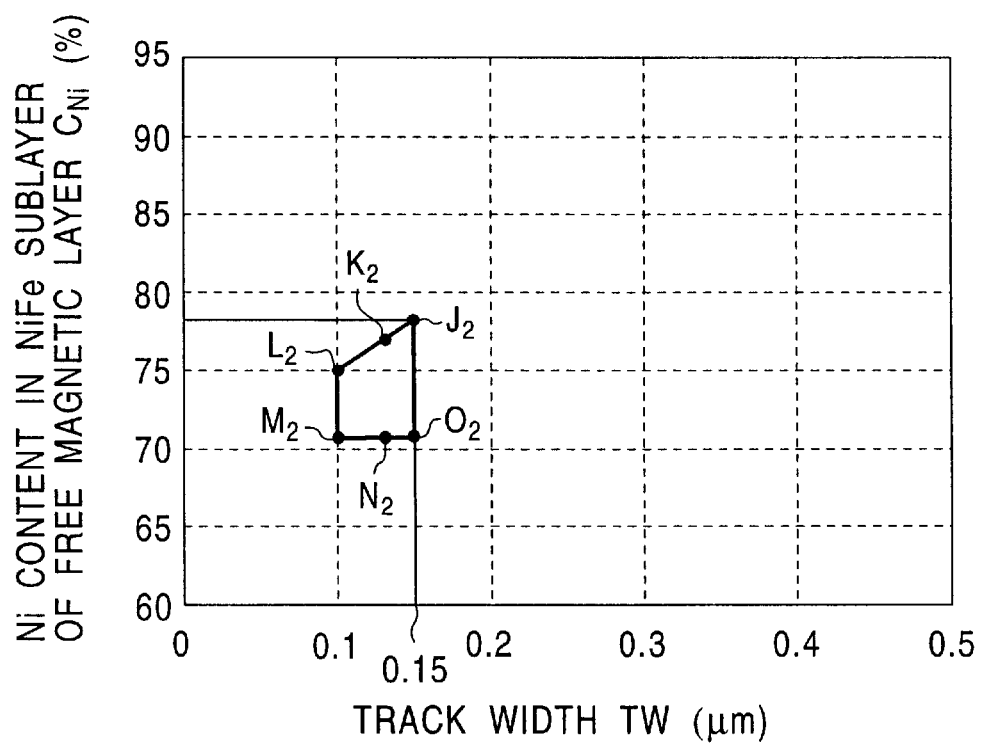
FIG. 18 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

Furthermore, in each of the embodiments described above, the magnetic read track width Tw (μm) and the Ni content $C_{Ni}$ (at. %), which are shown in FIG. 18 as point (Tw, $C_{Ni}$), may be set within the range obtained by linking point $J_2$ (0.15, 78.4), point $K_2$ (0.13, 76.5), point $L_2$ (0.1, 75), point $M_2$ (0.1, 70.6), point $N_2$ (0.13, 70.6), and point $O_2$ (0.15, 70.6). If the above range is satisfied, it is possible to set the magnetostriction λs of the free magnetic layer within the range defined by the corresponding track width range in FIG. 43. That is, the magnetic read track width Tw (μm) and the magnetostriction λs (×10$^{-6}$), which are shown in FIG. 43 as point (Tw, λs), can be set within the range obtained by linking point $SJ_2$ (0.15, 17.5), point $SW_2$ (0.13, 20), point $SK_2$ (0.1, 20), point $SL_2$ (0.1, 9), point $SX_2$ (0.13, 5), and point $SM_2$ (0.15, 3.5). The above range is more advantageous, in particular, to a magnetic head with a read track width of 0.15 μm or less in order to more effectively suppress distortion of regenerated waveforms and instability, and to ensure necessary read output while the hard bias layers are set so that the product of the remanence and the thickness of the hard bias layers is suitable for controlling the effective magnetic read track width.

Figure 19:
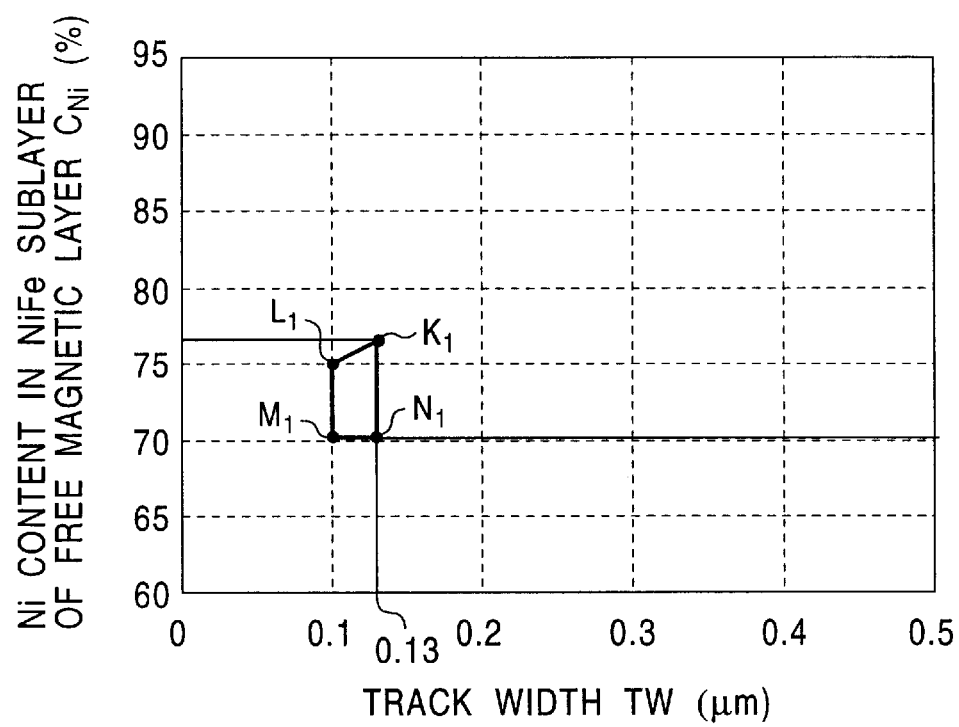
FIG. 19 is a graph showing a range for the magnetic read track width Tw ($\mu$m) and the Ni content $C_{Ni}$ (at. %) in an NiFe alloy constituting at least a part of a free magnetic layer in a spin-valve thin-film magnetic element of the present invention.

Furthermore, in each of the embodiments described above, the magnetic read track width Tw (μm) and the Ni content $C_{Ni}$ (at. %), which are shown in FIG. 19 as point (Tw, $C_{Ni}$), may be set within the range obtained by linking point $K_1$ (0.13, 76.8), point $L_1$ (0.1, 75), point $M_1$ (0.1, 70.2), and point $N_1$ (0.13, 70.2). If the above range is satisfied, it is possible to set the magnetostriction λs of the free magnetic layer within the range defined by the corresponding track width range in FIG. 42. The above range is more advantageous, in particular, to a magnetic head with a read track width of 0.13 μm or less in order to ensure necessary read output while distortion of regenerated waveforms and instability are suppressed.

Figure 20:
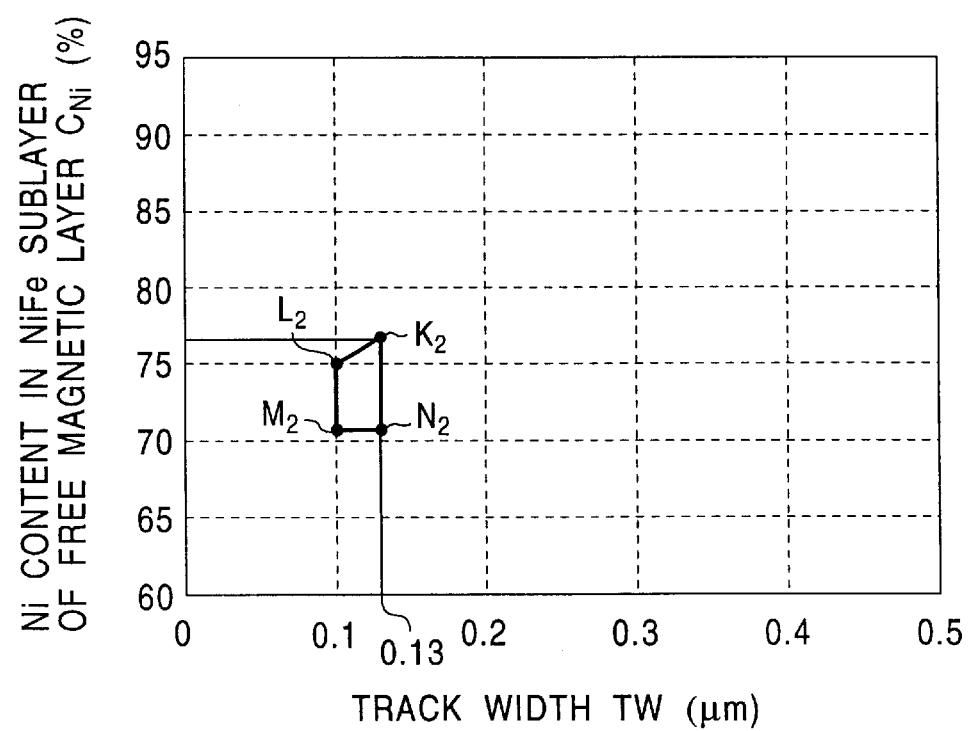
FIG. 20 is a graph showing a range for the magnetic read track width Tw (μm) and the Ni content $C_{Ni}$ (at. %) in an NiFe alloy constituting at least a part of a free magnetic layer in a spin-valve thin-film magnetic element of the present invention.

Furthermore, in each of the embodiments described above, the magnetic read track width Tw (μm) and the Ni content $C_{Ni}$ (at. %), which are shown in FIG. 20 as point (Tw, $C_{Ni}$), may be set within the range obtained by linking point $K_2$ (0.13, 76.5), point $L_2$ (0.1, 75), point $M_2$ (0.1, 70.6), and point $N_2$ (0.13, 70.6). If the above range is satisfied, it is possible to set the magnetostriction λs of the free magnetic layer in the height direction within the range defined by the corresponding track width range in FIG. 43. That is, with respect to the free magnetic layer 5, 14, or 36, the magnetic read track width Tw (μm) and the magnetostriction λs (×10$^{-6}$), which are shown in FIG. 43 as point (Tw, λs), can be set within the range obtained by linking point $SW_2$ (0.13, 20), point $SK_2$ (0.1, 20), point $SL_2$ (0.1, 9), and point $SX_2$ (0.13, 5). The above range is more advantageous, in particular, to a magnetic head with a read track width of 0.13 μm or less in order to more effectively suppress distortion of regenerated waveforms and instability, and to ensure necessary read output while the hard bias layers are set so that the product of the remanence and the thickness of the hard bias layers is suitable for controlling the effective magnetic read track width.

Next, a thin-film magnetic head of the present invention will be described.

Figure 32:
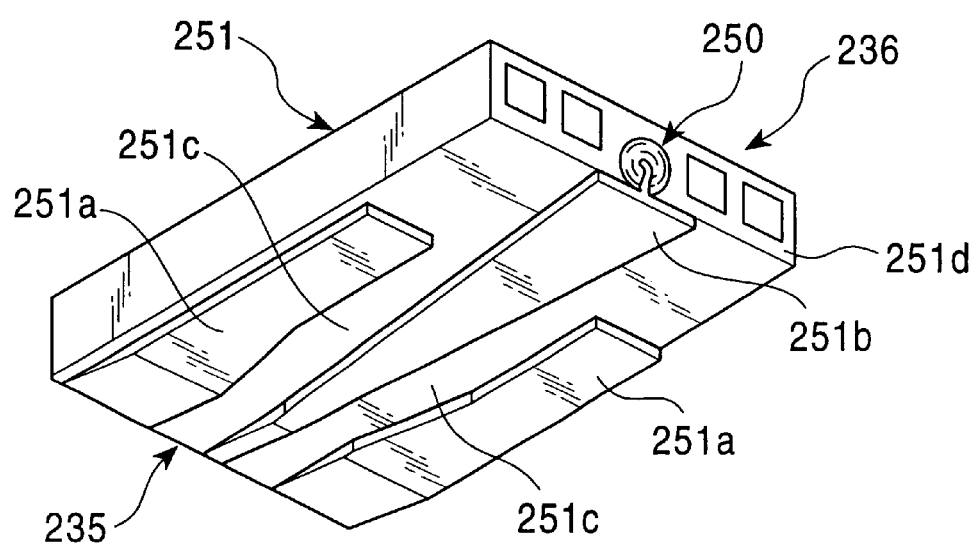
FIG. 32 is a perspective view of a thin-film magnetic head of the present invention.

FIG. 32 is a perspective view of a thin-film magnetic head. The thin-film magnetic head is of a floating type which is mounted on a magnetic recording medium, such as a hard disk unit. A thin-film magnetic head shown in FIG. 32 includes a slider 251. Reference numeral 235 represents the leading side of the slider 251 and reference numeral 236 represents the trailing side. In the slider 251, rail-shaped air bearing surfaces (floating surfaces in rail sections) 251a and 251b and air grooves 251c are formed on a surface facing a disk.

A magnetic core section 250 is provided on a trailing end 251d of the slider 251.

Figure 33:
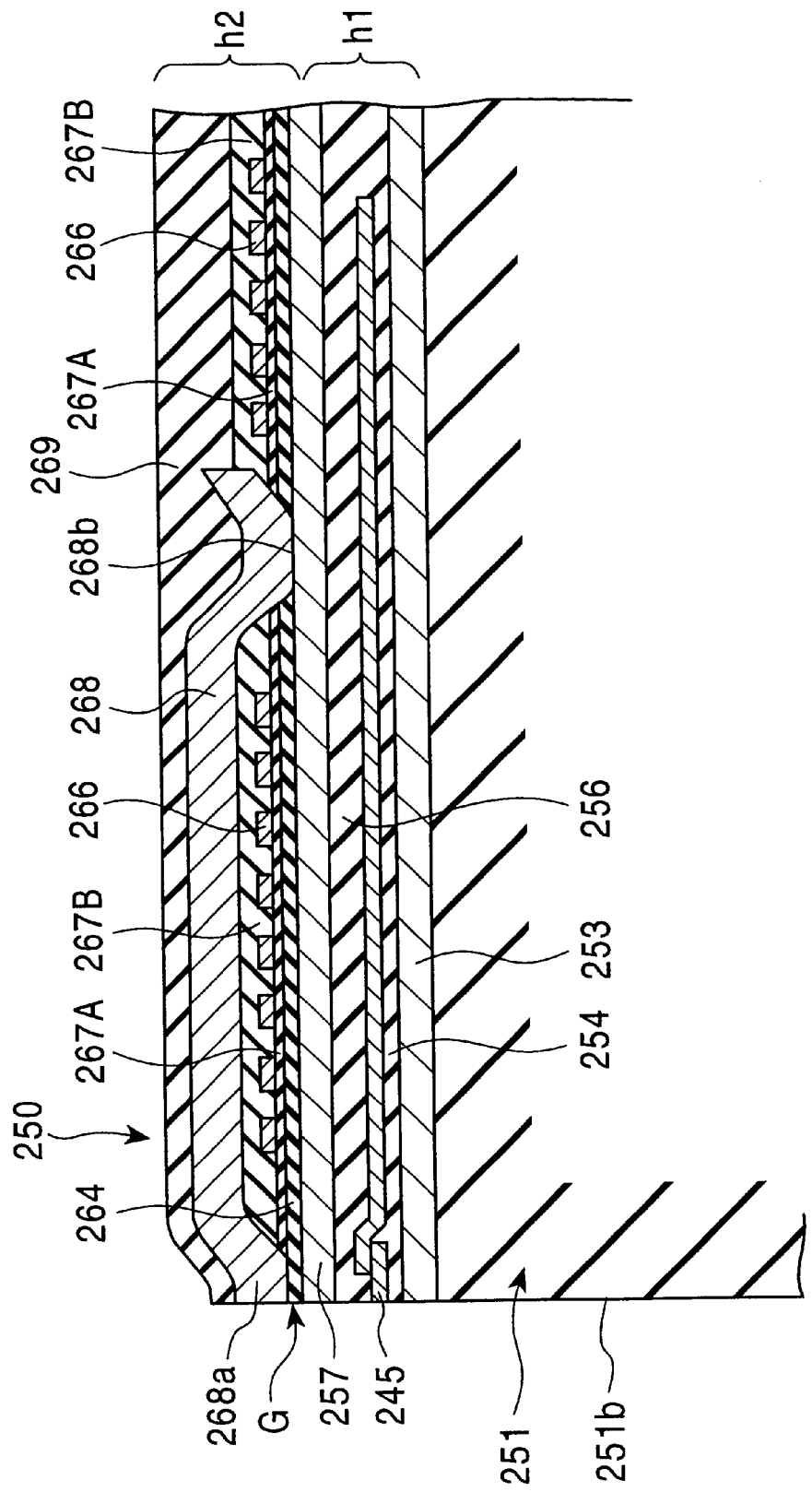
FIG. 33 is a sectional view showing a magnetic core section of the thin-film magnetic head shown in FIG. 32.
Figure 34:
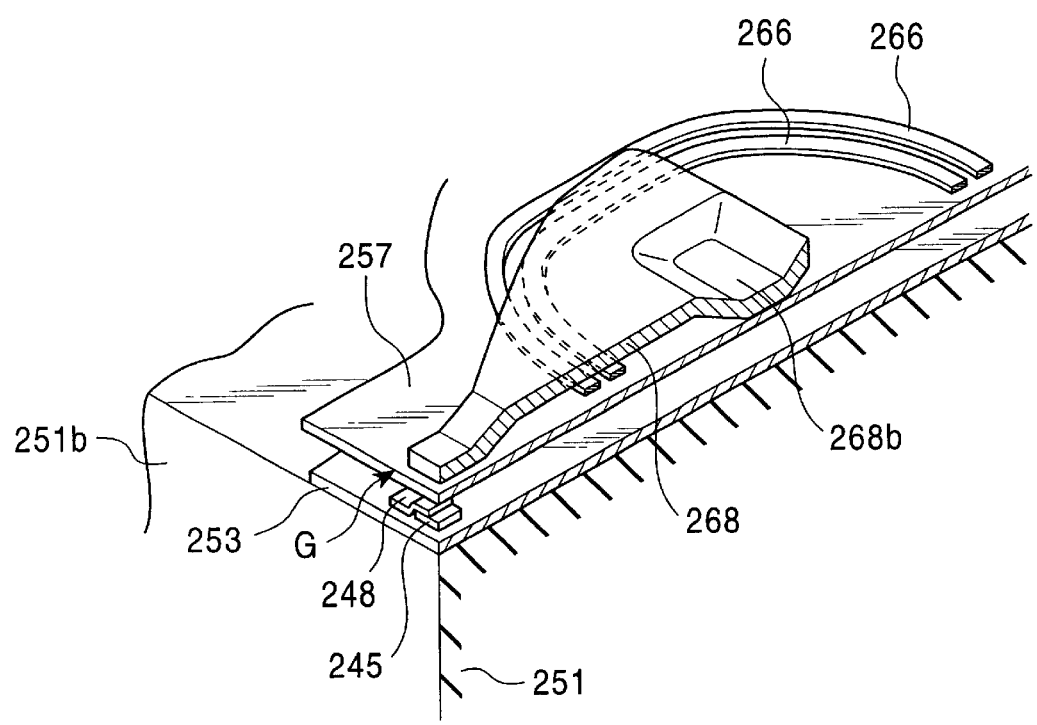
FIG. 34 is a perspective view which schematically shows the thin-film magnetic head shown in FIG. 32.
Figure 35:
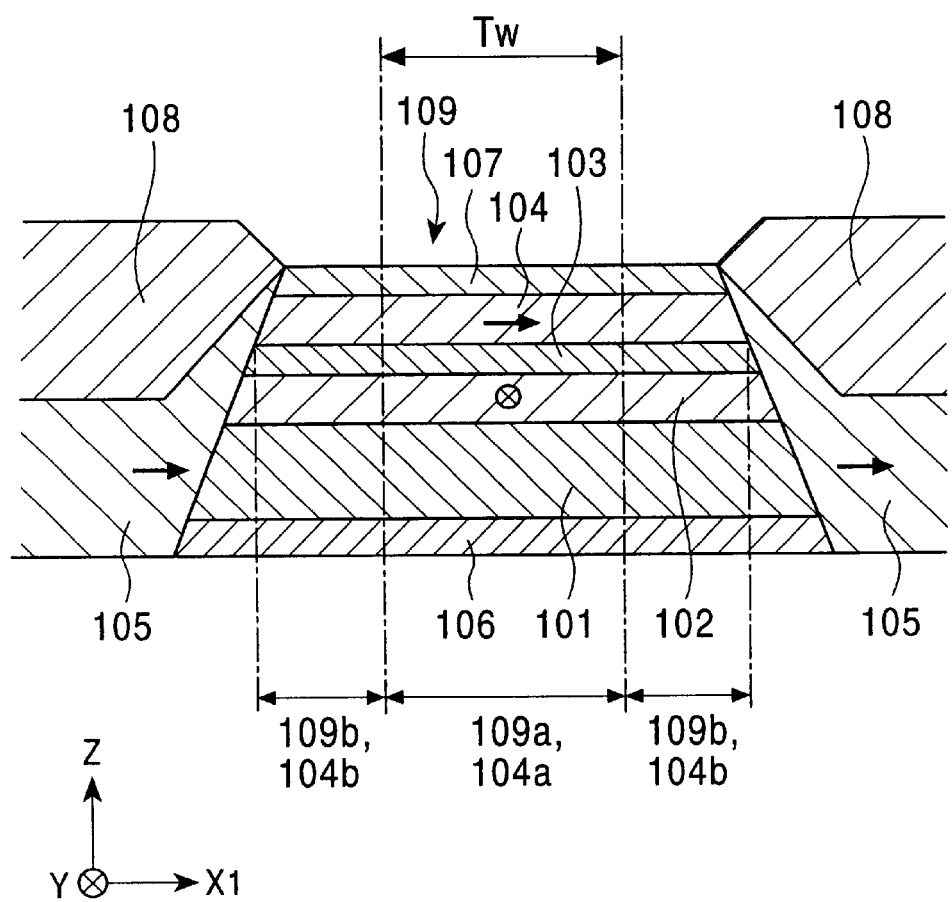
FIG. 35 is a sectional view of a conventional spin-valve thin-film magnetic element, viewed from a surface (ABS) facing a recording medium.
Figure 36:
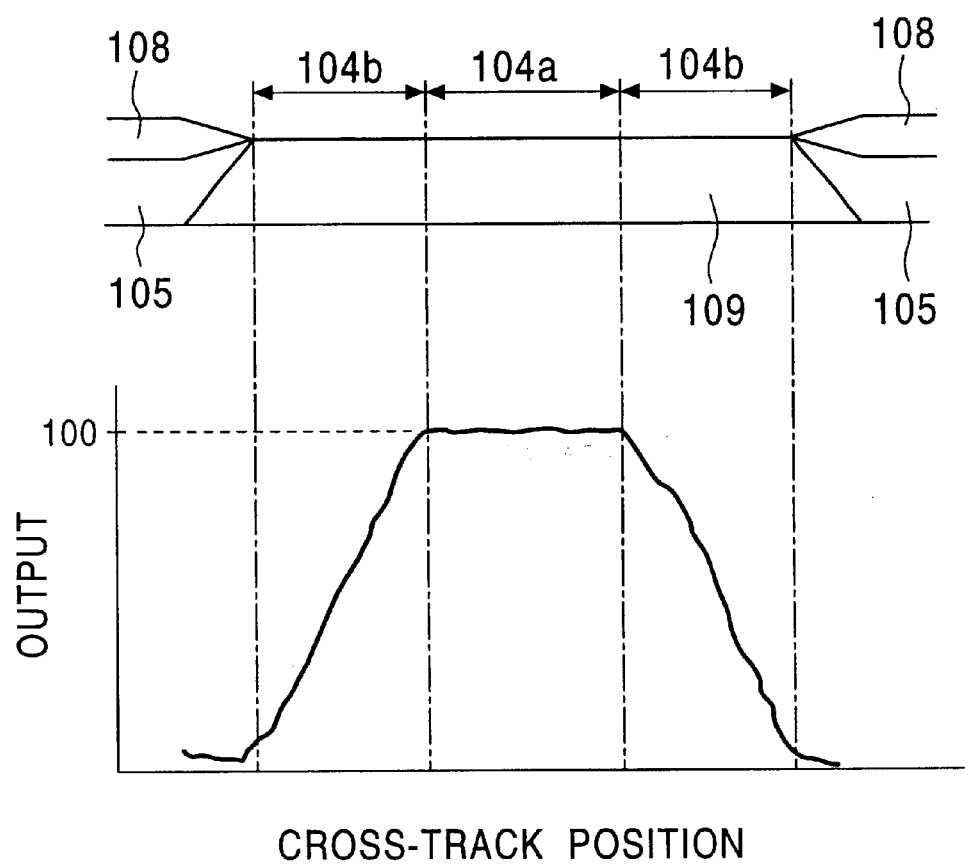
FIG. 36 is a graph which shows an output profile in the track width direction of the spin-valve thin-film magnetic element shown in FIG. 35.
Figure 37:
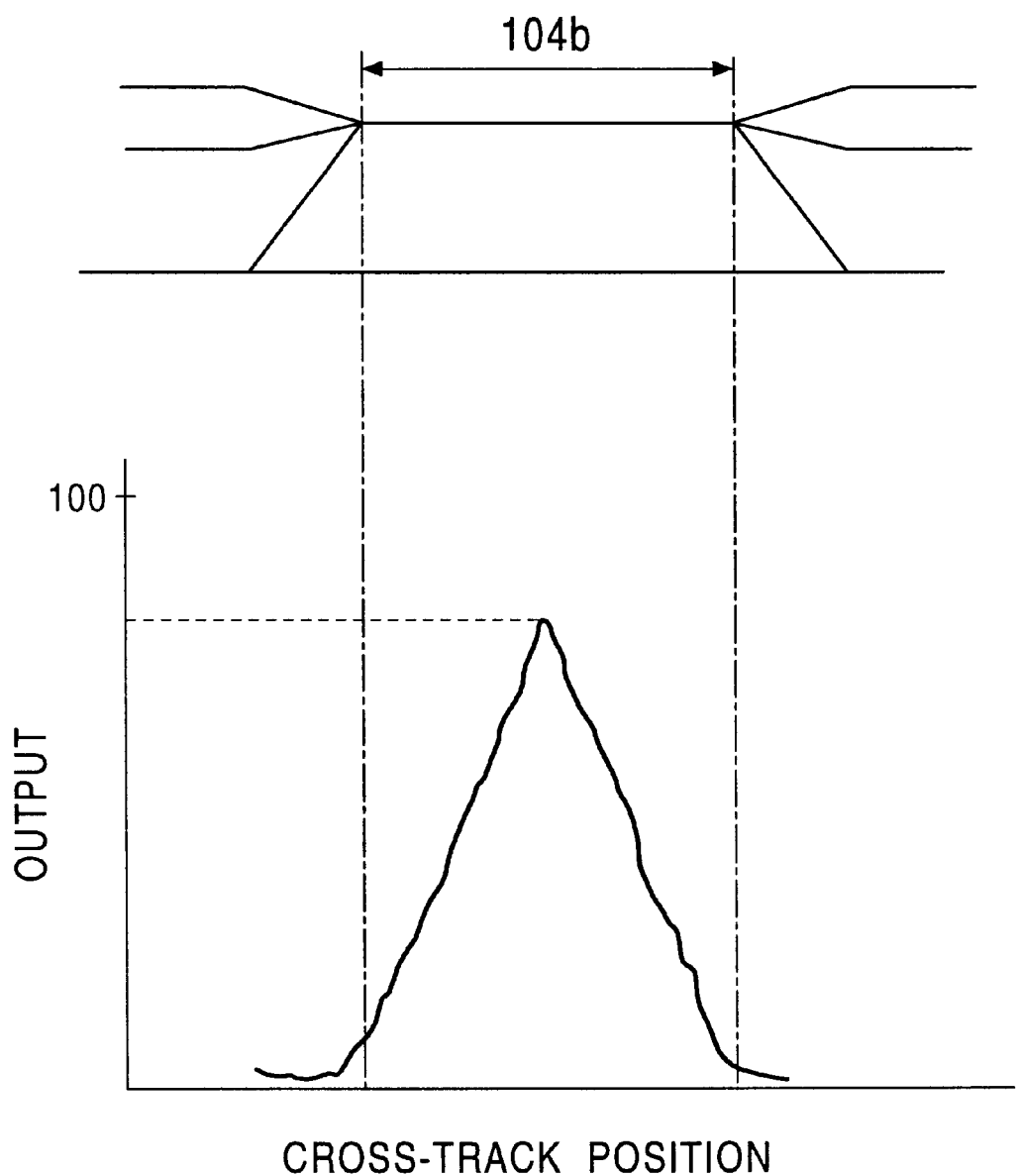
FIG. 37 is a graph which shows an output profile in the track width direction of the spin-valve thin-film magnetic element shown in FIG. 35.
Figure 38:
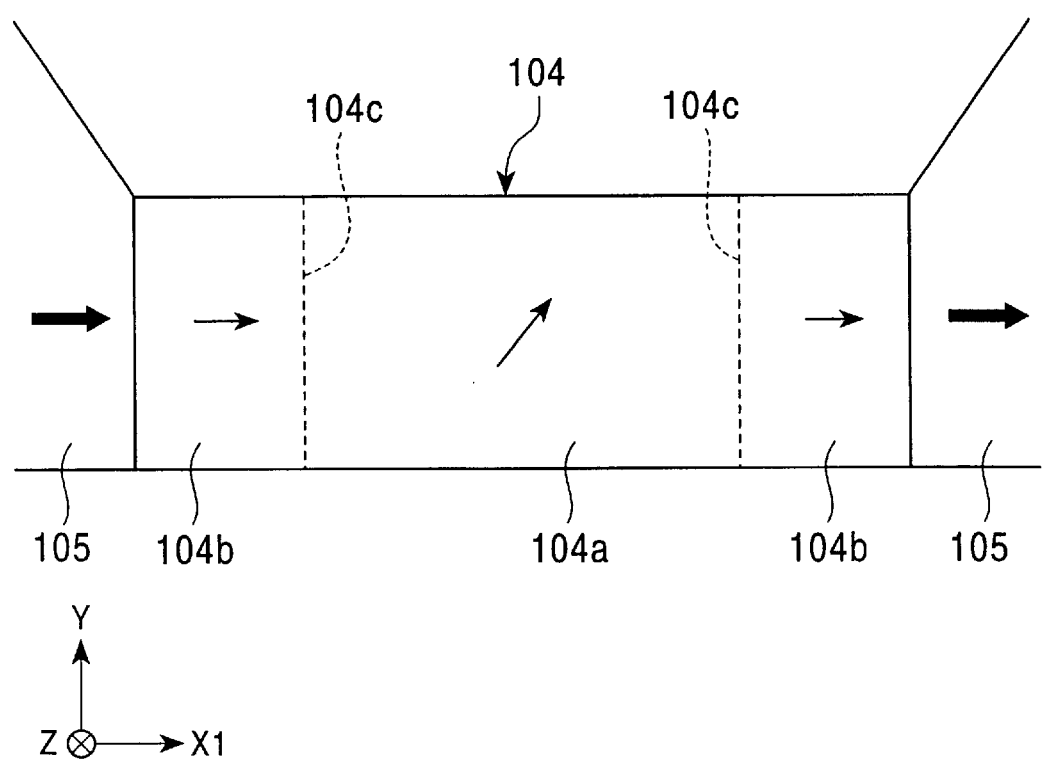
FIG. 38 is a schematic diagram showing a state in which domain walls occur in a free magnetic layer.
Figure 39:
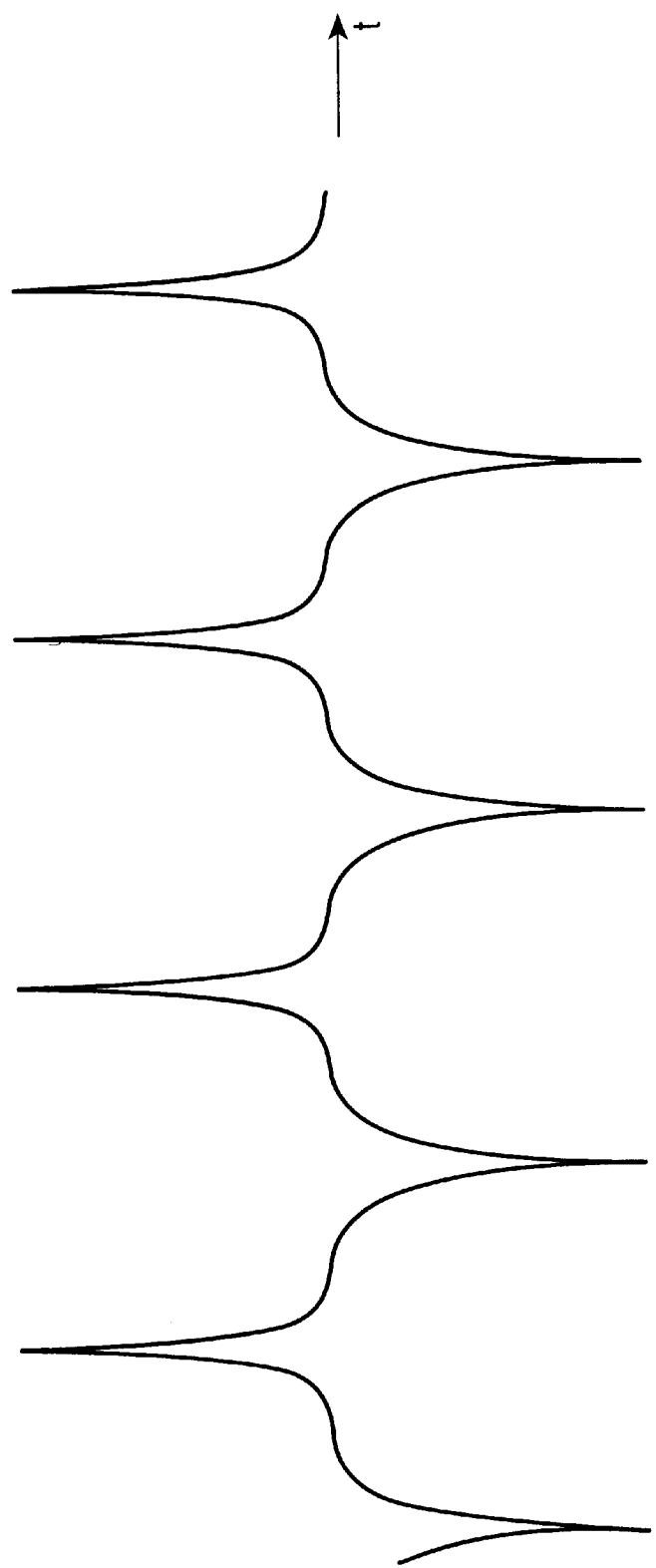
FIG. 39 is a graph showing an output waveform of a spin-valve thin-film magnetic element.
Figure 40:
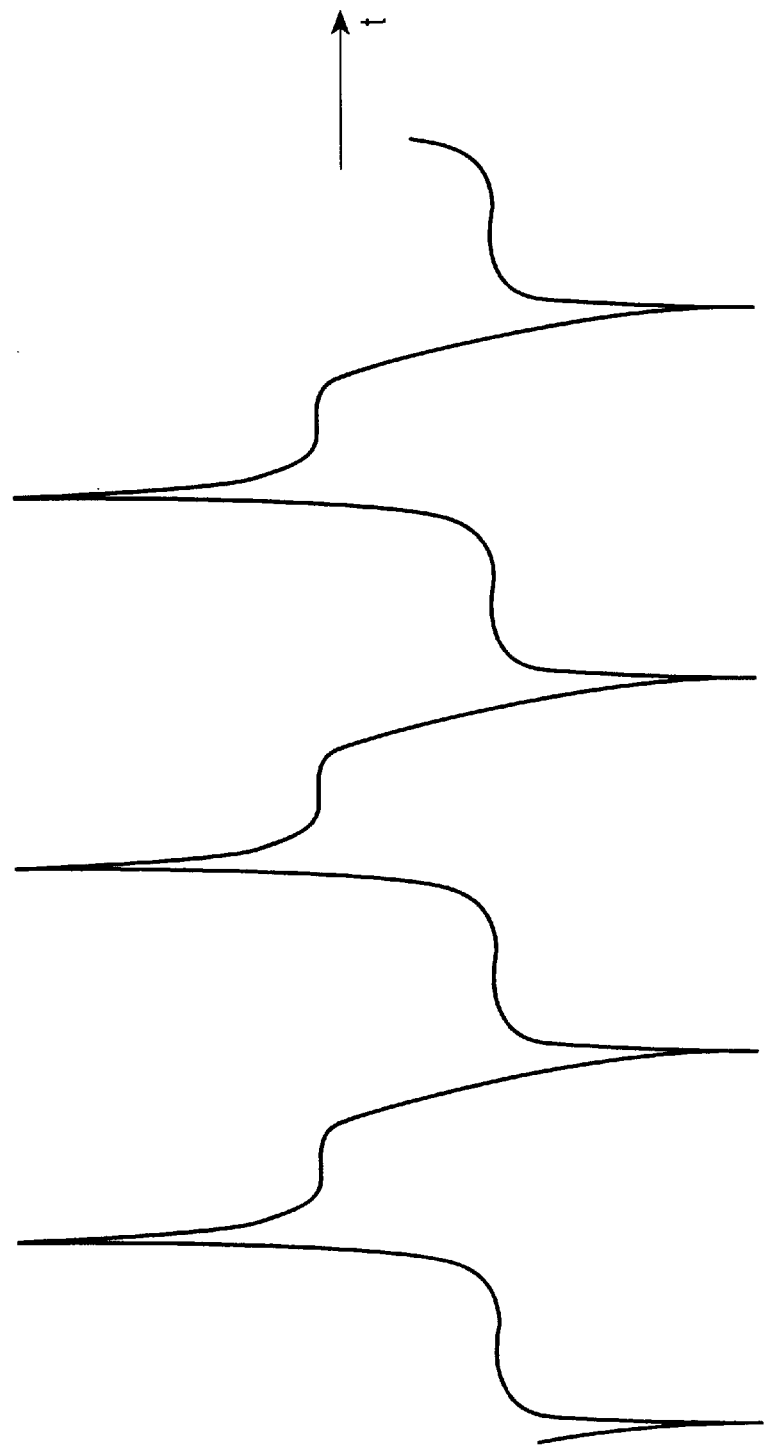
FIG. 40 a graph showing an output waveform of a spin-valve thin-film magnetic element.
Figure 41:
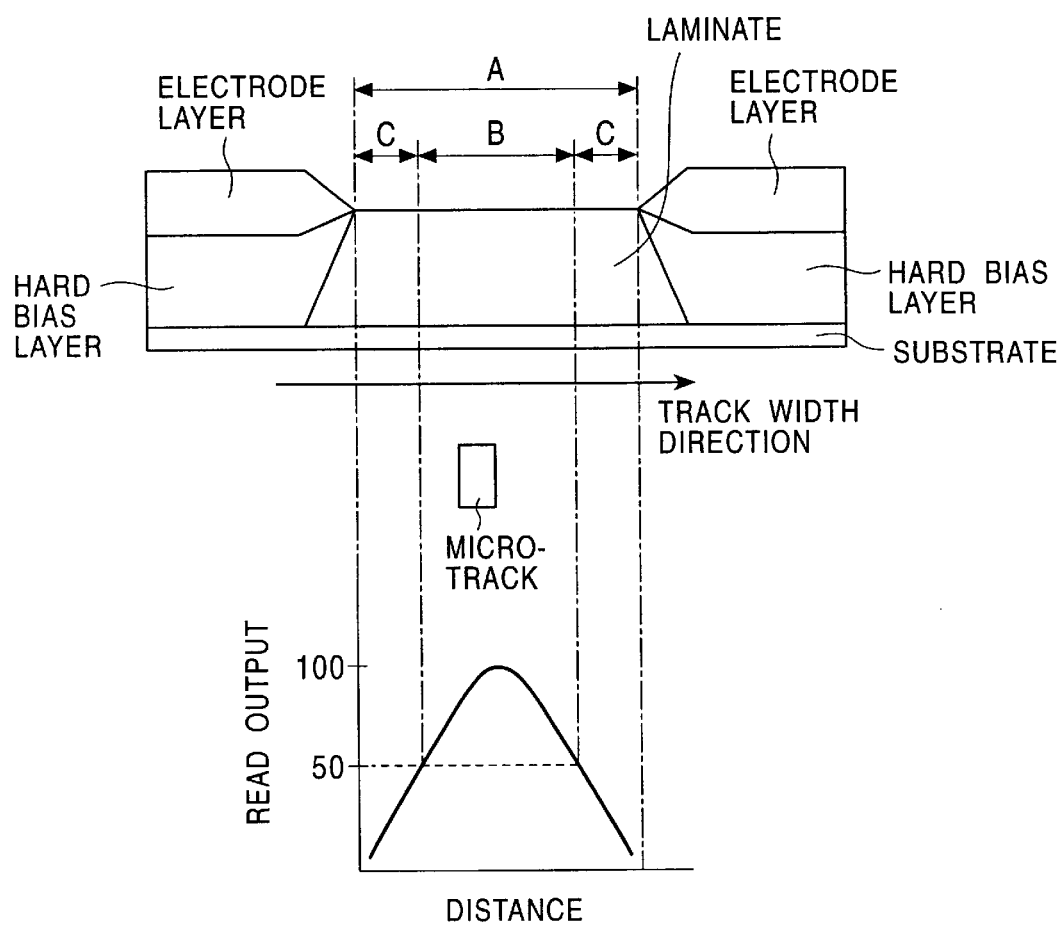
FIG. 41 is a schematic diagram which shows a method for determining a sensitive region and insensitive regions in a laminate of a spin-valve thin-film magnetic element.

The magnetic core section 250 is a combined magnetic head having a structure shown in FIGS. 33 and 34. An MR head (read head) h1 and an inductive head (write head) h2 are deposited in that order on the trailing end 251d of the slider 251.

The MR head h1 includes a lower shield layer 253 composed of a magnetic alloy formed on the trailing end of the slider 251 which also acts as a substrate; a lower gap layer 254; a magnetoresistive element layer 245 formed on the lower gap layer 254; an upper gap layer 256 formed on the magnetoresistive element 245; and an upper shield layer 267 formed thereon. The upper shield layer 257 also acts as a lower core layer of the inductive head h2.

The MR head h1 changes the resistance of the magnetoresistive element layer 245 depending on the presence or absence of a fringing magnetic field from a magnetic recording medium, such as hard disk, and information recorded in the recording medium is read by reading a change in the resistance.

The magnetoresistive element layer 245 provided on the MR head h1 includes the spin-valve thin-film magnetic element described above.

The spin-valve thin-film magnetic element is the most important component in the thin-film magnetic head (read head).

The inductive head h2 includes a gap layer 264 formed on the lower core layer 257 and a coil layer 266 formed thereon with a planar spiral pattern. The coil layer 266 is surrounded by a first insulating layer 267A and a second insulating layer 267B. An upper core layer 268 is formed on the second insulating layer 267B. A magnetic pole tip 268a of the upper core layer 268 faces the lower core layer 257 with a magnetic gap G therebetween at the ABS 251b, and a base 268b of the upper core layer 268 is magnetically coupled to the lower core layer 257 as shown in FIGS. 32 and 34.

A protective layer 269 composed of alumina or the like is provided on the upper core layer 268.

In the inductive head h2, a recording current is applied to the coil layer 266 and a recording magnetic flux is applied from the coil layer 266 to the core layers. The inductive head h2 records magnetic signals to a magnetic recording medium, such as a hard disk, by a leakage magnetic field between the tip of the upper core layer 268 and the lower core layer 257 at the magnetic gap G section.

In order to make the thin-film magnetic head of the present invention, first, the lower gap layer 254 is formed on the lower shield layer 253 composed of a magnetic material shown in FIG. 33, and the spin-valve thin-film magnetic element for constituting the magnetoresistive element 245 is deposited. The upper shield layer 257 is then formed on the spin-valve thin-film magnetic element with the upper gap layer 256 therebetween. The MR head (read head) h1 is thereby produced.

Next, the gap layer 264 is formed on the lower core layer 257 which also acts as the upper shield layer 257 of the MR head h1, and the spiral coil layer 266 is formed thereon so as to be surrounded by the first insulating layer 267A and the second insulating layer 267B. The upper core layer 268 is formed on the second insulating layer 267B, and the protective layer 269 is formed on the upper core layer 268. The thin-film magnetic head is thereby produced.

Such a thin-film magnetic head has superior heat resistance and reliability and has little asymmetry because it is provided with the spin-valve thin-film magnetic element described above.

Additionally, the structures of the slider section in the thin-film magnetic head and of the inductive head are not limited to those shown in FIGS. 32 to 34, and it is to be understood that sliders and inductive heads of various other types may be used.

EXAMPLE

With respect to a spin-valve thin-film magnetic element, the relationships between the Ni content $C_{Ni}$ (at. %) in an NiFe alloy constituting at least a part of a free magnetic layer and the magnetostriction $\lambda s$ of the free magnetic layer, between the track width Tw and the magnetostriction $\lambda s$ of the free magnetic layer, and between the magnetostriction $\lambda s$ and the read output were measured.

In the present invention, the track width direction means a direction parallel to the surface facing a medium (ABS) when the spin-valve thin-film magnetic element is formed as a thin-film magnetic head and parallel to the in-plane direction of the individual layers in the laminate. The element height direction means a direction orthogonal to the surface facing the medium.

The spin-valve thin-film magnetic element used in testing was the spin-valve thin-film magnetic element in the second embodiment shown in FIG. 23.

The laminate had a structure, with the layers deposited in the following order: PtMn (110 Å)/Co (15 Å)/Ru (8 Å)/Co (25 Å)/Cu (24 Å)/Co/NiFe/Cu (15 Å)/Ta (11 Å).

First, with respect to the spin-valve thin-film magnetic element, the relationship between the Ni content $C_{Ni}$ (at. %) in the NiFe alloy film constituting the free magnetic layer and the magnetostriction $\lambda s$ ($\times 10^{-6}$) of the free magnetic layer was measured.

Herein, the thicknesses of the Co film and the NiFe film constituting the free magnetic layer were changed as described below.

① Co (5 Å)/NiFe (30 Å)
② Co (5 Å)/NiFe (15 Å)
③ Co (10 Å)/NiFe (25 Å)
④ Co (10 Å)/NiFe (10 Å)

Figure 31:
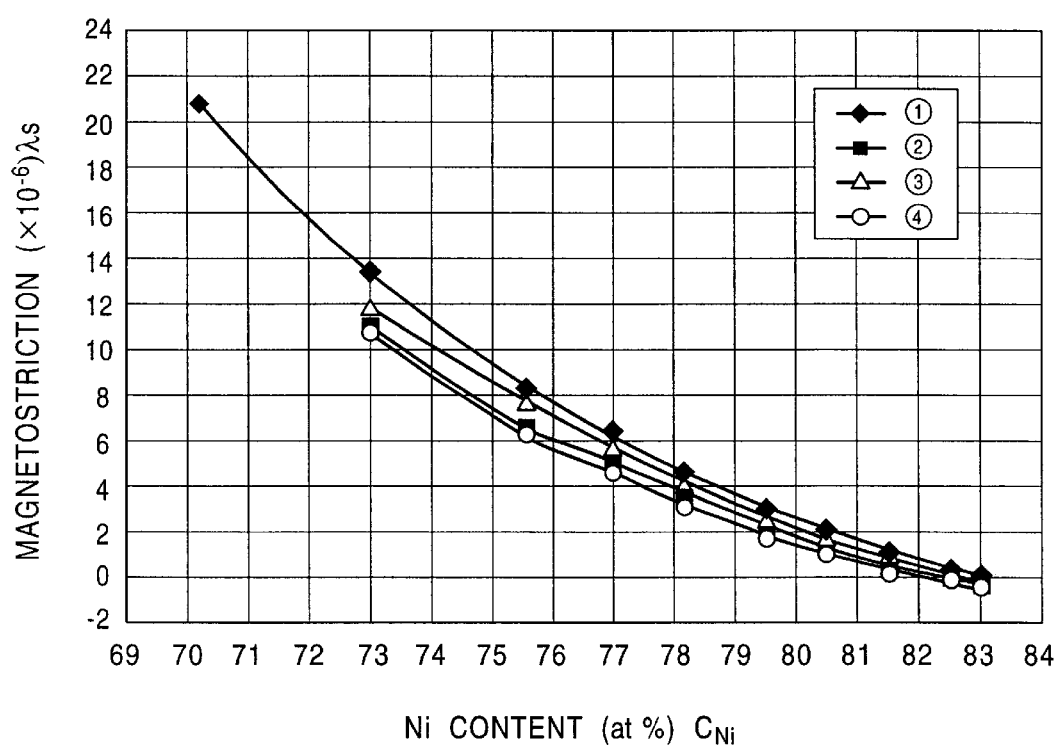
FIG. 31 is a graph showing the relationship between the Ni content $C_{Ni}$ (at. %) in an NiFe alloy constituting at least a part of a free magnetic layer and the magnetostriction λs in a spin-valve thin-film magnetic element of the present invention.

The measurement results are shown in FIG. 31.

As is obvious from the graph, as the Ni content is decreased, the magnetostriction is increased.

Next, spin-valve thin-film magnetic elements with various conditions described below were produced.

① Residual magnetic flux density of hard bias layers× Thickness BrT=22 T·nm
  Thickness of free magnetic layer 3.6 nm
② Residual magnetic flux density of hard bias layers× Thickness BrT=14 T·nm
  Thickness of free magnetic layer 3.6 nm
③ Residual magnetic flux density of hard bias layers× Thickness BrT=14 T·nm
  Thickness of free magnetic layer 2.5 nm With respect to ①, ②, and ③, test pieces with track widths of 0.15 μm, 0.22 μm, 0.3 μm, and 0.4 μm were fabricated, and the read output was measured while the magnetostriction $\lambda s$ was changed.

At this stage, in a magnetic recording medium which was a source of external magnetic signals, the product of the residual magnetization of a magnetic recording layer and thickness Mr·t was 0.4 memu/cm² (Residual magnetic flux density×Thickness Brt=5 T·nm) and the coercive force was 296 kA/m, and also a sensing current was set at 5 mA.

Among the read outputs in a low frequency band of approximately 10 to 20 MHz, ranges exceeding the practical lower limit (a) 1.2 mV and falling below the practical upper limit (b) 2.0 mV were picked up.

Figure 44:
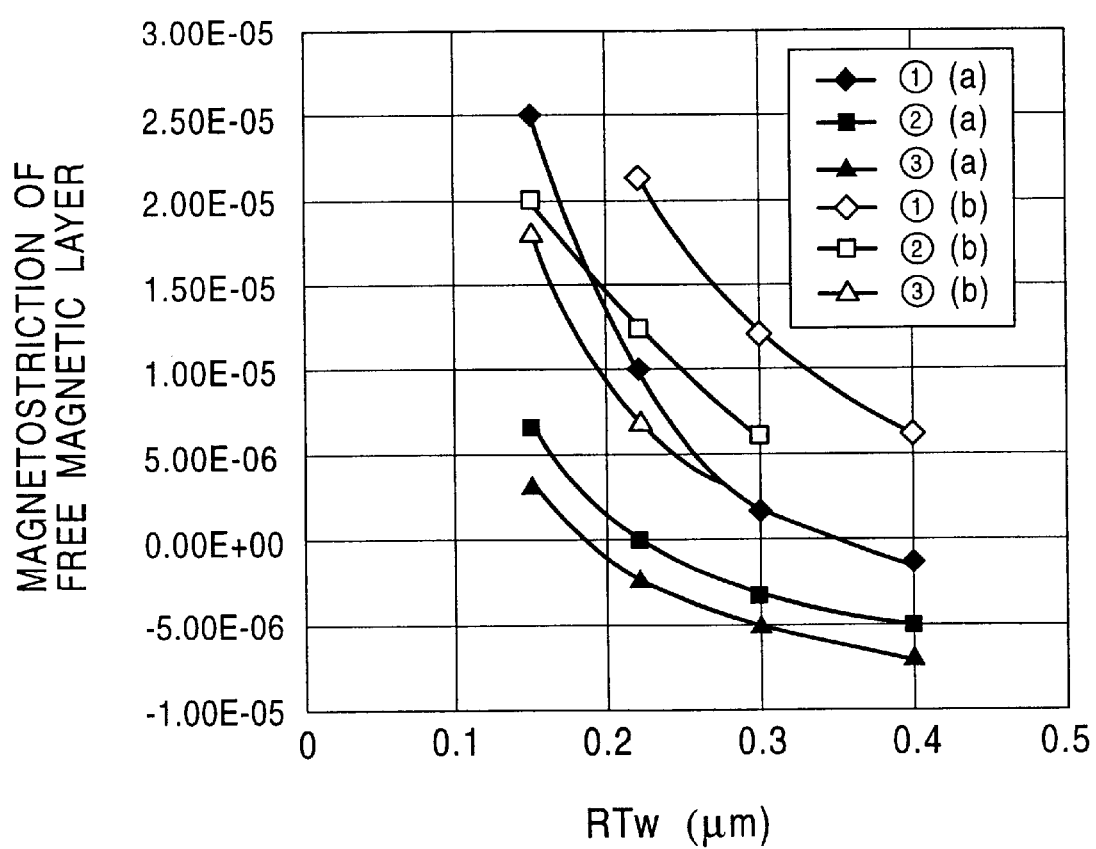
FIG. 44 is a graph showing the relationship between the magnetic read track width Tw (μm) and the magnetostriction λs ($\times 10^{-6}$) of a free magnetic layer with respect to the upper limit and lower limit of the read output in a spin-valve thin-film magnetic element of the present invention.

The results thereof are shown in FIG. 44.

As is obvious from the graph, by setting the magnetic read track width Tw and the Ni content $C_{Ni}$ (at. %) in the ranges specified in FIGS. 1 to 20, the magnetostriction $\lambda s$ in the element height direction of the free magnetic layer is appropriately set, and as a result, the read output is set in the appropriate range.

It has also been discovered that the appropriate range of the magnetostriction $\lambda s$ of the free magnetic layer is positively increased as the read track width is narrowed in any one of the cases ① to ③.

Furthermore, in the case ① in which the product of the residual magnetic flux density of hard bias layers and the thickness, and the thickness of the free magnetic layer were set to be relatively large, since the magnetostriction must be relatively large in order to secure the read output, the appropriate range of the magnetostriction $\lambda s$ of the free magnetic layer tends to be positively shifted.

On the other hand, in the case ③ in which the product of the residual magnetic flux density of hard bias layers and the thickness, and the thickness of the free magnetic layer were set to be relatively small, since the read output can be secured even with a relatively small magnetostriction and also since distortion of regenerated waveforms and instability are increased if the magnetostriction is too large, the appropriate range of the magnetostriction $\lambda s$ of the free magnetic layer tends to be negatively shifted.

In the case ②, the magnetostriction ranges between the cases ① and ③.

What is claimed is:

1. A spin-valve thin-film magnetic element comprising:
   a substrate:
   an antiferromagnetic layer:
   a pinned magnetic layer in contact with the antiferromagnetic layer, the magnetization direction of the pinned magnetic layer being pinned by an exchange coupling magnetic field with the antiferromagnetic layer;
   a free magnetic layer formed on the pinned magnetic layer with a nonmagnetic conductive layer therebetween, the magnetization direction of the free magnetic layer being aligned in a direction substantially orthogonal to the magnetization direction of the pinned magnetic layer;
   a pair of hard bias layers for aligning the magnetization direction of the free magnetic layer in the direction substantially orthogonal to the magnetization direction of the pinned magnetic layer, at least a part of the free magnetic layer comprising an NiFe alloy; and
   a pair of electrode layers for applying a sensing current to the pinned magnetic layer, the nonmagnetic conductive layer, and the free magnetic layer,
   wherein the magnetic read track width Tw ($\mu$m) and the Ni content $C_{Ni}$ (at. %), which are shown in accompanying FIG. 1 as point (Tw, $C_{Ni}$), are within the range obtained by linking point $A_1$ (0.4, 89.9), point $B_1$ (0.35, 89), point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), point $V_1$ (0.3, 73.6), point $W_1$ (0.35, 75.6), and point $X_1$ (0.4, 77.3).

2. A spin-valve thin-film magnetic element according to claim 1, wherein the magnetic read track width Tw ($\mu$m) and the Ni content $C_{Ni}$ (at. %), which are shown in accompanying FIG. 3 as point (Tw, $C_{Ni}$), are within the range obtained by linking point $B_1$ (0.35, 89), point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), point $V_1$ (0.3, 73.6), and point $W_1$ (0.35, 75.6).

3. A spin-valve thin-film magnetic element according to claim 2, wherein the magnetic read track width Tw ($\mu$m) and the Ni content $C_{Ni}$ (at. %), which are shown in accompanying FIG. 5 as point (Tw, $C_{Ni}$), are within the range obtained by linking point $C_1$ (0.3, 87.7), point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), point $U_1$ (0.25, 71.5), and point $V_1$ (0.3, 73.6).

4. A spin-valve thin-film magnetic element according to claim 3, wherein the magnetic read track width Tw ($\mu$m) and the Ni content $C_{Ni}$ (at. %), which are shown in accompanying FIG. 7 as point (Tw, $C_{Ni}$), are within the range obtained by linking point $D_1$ (0.25, 86.5), point $E_1$ (0.22, 84.9), point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), point $S_1$ (0.20, 70.2), point $T_1$ (0.22, 70.2), and point $U_1$ (0.25, 71.5).

5. A spin-valve thin-film magnetic element according to claim 4, wherein the magnetic read track width Tw ($\mu$m) and the Ni content $C_{Ni}$ (at. %), which are shown in accompanying FIG. 9 as point (Tw, $C_{Ni}$), are within the range obtained by linking point $F_1$ (0.20, 83), point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), point $R_1$ (0.19, 70.2), and point $S_1$ (0.20, 70.2).

6. A spin-valve thin-film magnetic element according to claim 5, wherein the magnetic read track width Tw ($\mu$m) and the Ni content $C_{Ni}$ (at. %), which are shown in accompanying FIG. 11 as point (Tw, $C_{Ni}$), are within the range obtained by linking point $G_1$ (0.19, 82.5), point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), point $Q_1$ (0.18, 70.2), and point $R_1$ (0.19, 70.2).

7. A spin-valve thin-film magnetic element according to claim 6, wherein the magnetic read track width Tw ($\mu$m) and the Ni content $C_{Ni}$ (at. %), which are shown in accompanying FIG. 13 as point (Tw, $C_{Ni}$), are within the range obtained by linking point $H_1$ (0.18, 81), point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), point $P_1$ (0.17, 70.2), and point $Q_1$ (0.18, 70.2).

8. A spin-valve thin-film magnetic element according to claim 7, wherein the magnetic read track width Tw ($\mu$m) and the Ni content $C_{Ni}$ (at. %), which are shown in accompanying FIG. 15 as point (Tw, $C_{Ni}$), are within the range obtained by linking point $I_1$ (0.17, 80.5), point $J_1$ (0.15, 77.3), point $K_1$ (0.13, 76.8), point $L_1$ (0.1, 75), point $M_1$ (0.1, 70.2), point $N_1$ (0.13, 70.2), point $O_1$ (0.15, 70.2), and point $P_1$ (0.17, 70.2).

9. A spin-valve thin-film magnetic element according to claim 8, wherein the magnetic read track width Tw ($\mu$m) and the Ni content $C_{Ni}$ (at. %), which are shown in accompanying FIG. 17 as point (Tw, $C_{Ni}$), are within the range obtained by linking point $J_1$ (0.15, 77.3), point $K_1$ (0.13, 76.8), point $L_1$ (0.1, 75), point $M_1$ (0.1, 70.2), point $N_1$ (0.13, 70.2), and point $O_1$ (0.15, 70.2).

10. A spin-valve thin-film magnetic element according to claim 9, wherein the magnetic read track width Tw ($\mu$m) and the Ni content $C_{Ni}$ (at. %), which are shown in accompanying FIG. 19 as point (Tw, $C_{Ni}$), are within the range obtained by linking point $K_1$ (0.13, 76.8), point $L_1$ (0.1, 75), point $M_1$ (0.1, 70.2), and point $N_1$ (0.13, 70.2).

11. A spin-valve thin-film magnetic element according to claim 1, wherein the antiferromagnetic layer, the pinned magnetic layer, the nonmagnetic conductive layer, and the free magnetic layer are deposited in that order on the substrate.

12. A spin-valve thin-film magnetic element according to claim 1, wherein the antiferromagnetic layer comprises one of an X—Mn alloy and a Pt—Mn—X' alloy, where X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

13. A spin-valve thin-film magnetic element according to claim 1, wherein at least one of the pinned magnetic layer and the free magnetic layer is divided into two sublayers by a nonmagnetic intermediate layer to produce a ferrimagnetic state in which the magnetization directions of the sublayers are antiparallel to each other.

14. A spin-valve thin-film magnetic element according to claim 1, wherein the ratio of the width in the read track width direction of the free magnetic layer to the height in the element height direction of the free magnetic layer is approximately 1:1 to 3:2.

15. A thin-film magnetic head comprising a spin-valve thin-film magnetic element according to claim 1.

16. A spin-valve thin-film magnetic element comprising:
a substrate;
an antiferromagnetic layer;
a pinned magnetic layer in contact with the antiferromagnetic layer, the magnetization direction of the pinned magnetic layer being pinned by an exchange coupling magnetic field with the antiferromagnetic layer;
a free magnetic layer formed on the pinned magnetic layer with a nonmagnetic conductive layer therebetween, the magnetization direction of the free magnetic layer being aligned in a direction substantially orthogonal to the magnetization direction of the pinned magnetic layer;
a pair of hard bias layers for aligning the magnetization direction of the free magnetic layer in the direction substantially orthogonal to the magnetization direction of the pinned magnetic layer, at least a part of the free magnetic layer comprising an NiFe alloy; and
a pair of electrode layers for applying a sensing current to the pinned magnetic layer, the nonmagnetic conductive layer, and the free magnetic layer,
wherein the magnetic read track width Tw ($\mu$m) and the Ni content $C_{Ni}$ (at. %), which are shown in accompanying FIG. 2 as point (Tw, $C_{Ni}$), are within the range obtained by linking point $A_2$ (0.4, 83.7), point $B_2$ (0.35, 83.9), point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), point $V_2$ (0.3, 75.6), point $W_2$ (0.35, 76.5), and point $X_2$ (0.4, 77.3).

17. A spin-valve thin-film magnetic element according to claim 16, wherein the magnetic read track width Tw ($\mu$m) and the Ni content $C_{Ni}$ (at. %), which are shown in accompanying FIG. 4 as point (Tw, $C_{Ni}$), are within the range obtained by linking point $B_2$ (0.35, 83.9), point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), point $V_2$ (0.3, 75.6), and point $W_2$ (0.35, 76.5).

18. A spin-valve thin-film magnetic element according to claim 17, wherein the magnetic read track width Tw ($\mu$m) and the Ni content $C_{Ni}$ (at. %), which are shown in accompanying FIG. 6 as point (Tw, $C_{Ni}$), are within the range obtained by linking point $C_2$ (0.3, 83.5), point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), point $U_2$ (0.25, 74), and point $V_2$ (0.3, 75.6).

19. A spin-valve thin-film magnetic element according to claim 18, wherein the magnetic read track width Tw ($\mu$m) and the Ni content $C_{Ni}$ (at. %), which are shown in accompanying FIG. 8 as point (Tw, $C_{Ni}$), are within the range obtained by linking point $D_2$ (0.25, 83), point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), point $T_2$ (0.22, 73.6), and point $U_2$ (0.25, 74).

20. A spin-valve thin-film magnetic element according to claim 19, wherein the magnetic read track width Tw ($\mu$m) and the Ni content $C_{Ni}$ (at. %), which are shown in accompanying FIG. 10 as point (Tw, $C_{Ni}$), are within the range obtained by linking point $E_2$ (0.22, 82.9), point $F_2$ (0.20, 81.5), point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), point $S_2$ (0.20, 72.5), and point $T_2$ (0.22, 73.6).

21. A spin-valve thin-film magnetic element according to claim 20, wherein the magnetic read track width Tw ($\mu$m) and the Ni content $C_{Ni}$ (at. %), which are shown in accompanying FIG. 12 as point (Tw, $C_{Ni}$), are within the range obtained by linking point $F_2$ (0.20, 81.5), point $G_2$ (0.19, 8.1), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), point $R_2$ (0.19, 72), and point $S_2$ (0.20, 72.5).

22. A spin-valve thin-film magnetic element according to claim 21, wherein the magnetic read track width Tw ($\mu$m) and the Ni content $C_{Ni}$ (at. %), which are shown in accompanying FIG. 14 as point (Tw, $C_{Ni}$), are within the range obtained by linking point $G_2$ (0.19, 81), point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), point $Q_2$ (0.18, 71.7), and point $R_2$ (0.19, 72).

23. A spin-valve thin-film magnetic element according to claim 22, wherein the magnetic read track width Tw ($\mu$m) and the Ni content $C_{Ni}$ (at. %), which are shown in accompanying FIG. 16 as point (Tw, $C_{Ni}$), are within the range obtained by linking point $H_2$ (0.18, 80), point $J_2$ (0.15, 78.4), point $K_2$ (0.13, 76.5), point $L_2$ (0.1, 75), point $M_2$ (0.1, 70.6), point $N_2$ (0.13, 70.6), point $O_2$ (0.15, 70.6), and point $Q_2$ (0.18, 71.7).

24. A spin-valve thin-film magnetic element according to claim 23, wherein the magnetic read track width Tw ($\mu$m) and the Ni content $C_{Ni}$ (at. %), which are shown in accompanying FIG. 18 as point (Tw, $C_{Ni}$), are within the range obtained by linking point $J_2$ (0.15, 78.4), point $K_2$ (0.13, 76.5), point $L_2$ (0.1, 75), point $M_2$ (0.1, 70.6), point $N_2$ (0.13, 70.6), and point $O_2$ (0.15, 70.6).

25. A spin-valve thin-film magnetic element according to claim 24, wherein the magnetic read track width Tw ($\mu$m) and the Ni content $C_{Ni}$ (at. %), which are shown in accompanying FIG. 20 as point (Tw, $C_{Ni}$), are within the range obtained by linking point $K_2$ (0.13, 76.5), point $L_2$ (0.1, 75), point $M_2$ (0.1, 70.6), and point $N_2$ (0.13, 70.6).

26. A spin-valve thin-film magnetic element comprising:
a substrate;
an antiferromagnetic layer;
a pinned magnetic layer in contact with the antiferromagnetic layer, the magnetization direction of the pinned magnetic layer being pinned by an exchange coupling magnetic field with the antiferromagnetic layer;

a free magnetic layer formed on the pinned magnetic layer with a nonmagnetic conductive layer therebetween, the magnetization direction of the free magnetic layer being aligned in a direction substantially orthogonal to the magnetization direction of the pinned magnetic layer;

a pair of hard bias layers for aligning the magnetization direction of the free magnetic layer in the direction substantially orthogonal to the magnetization direction of the pinned magnetic layer; and a pair of electrode layers for applying a sensing current to the pinned magnetic layer, the nonmagnetic conductive layer, and the free magnetic layer, wherein the magnetic read track width Tw ($\mu$m) and the magnetostriction $\lambda$s ($\times 10^{-6}$), which are shown in accompanying FIG. 42 as point (Tw, $\lambda$s), are within the range obtained by linking point $SA_1$ (0.4, 6), point $SB_1$ (0.35, 8), point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), point $SS_1$ (0.25, −3), point $ST_1$ (0.3, −5), point $SU_1$ (0.35, −6.3), and point $SV_1$ (0.4, −7).

27. A spin-valve thin-film magnetic element according to claim 26, wherein the magnetic read track width Tw ($\mu$m) and the magnetostriction $\lambda$s ($\times 10^{-6}$), which are shown in accompanying FIG. 42 as point (Tw, $\lambda$s), are within the range obtained by linking point $SB_1$ (0.35, 8), point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), point $SS_1$ (0.25, −3), point $ST_1$ (0.3, −5), and point $SU_1$ (0.35, −6.3).

28. A spin-valve thin-film magnetic element according to claim 27, wherein the magnetic read track width Tw ($\mu$m) and the magnetostriction $\lambda$s ($\times 10^{-6}$), which are shown in accompanying FIG. 42 as point (Tw, $\lambda$s), are within the range obtained by linking point $SC_1$ (0.3, 12.5), point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), point $SS_1$ (0.25, −3), and point $ST_1$ (0.3, −5).

29. A spin-valve thin-film magnetic element according to claim 28, wherein the magnetic read track width Tw ($\mu$m) and the magnetostriction $\lambda$s ($\times 10^{-6}$), which are shown in accompanying FIG. 42 as point (Tw, $\lambda$s), are within the range obtained by linking point $SD_1$ (0.25, 18), point $SE_1$ (0.23, 20), point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), point $SQ_1$ (0.2, −0.7), point $SR_1$ (0.22, −2), and point $SS_1$ (0.25, −3).

30. A spin-valve thin-film magnetic element according to claim 29, wherein the magnetic read track width Tw ($\mu$m) and the magnetostriction $\lambda$s ($\times 10^{-6}$), which are shown in accompanying FIG. 42 as point (Tw, $\lambda$s), are within the range obtained by linking point $SF_1$ (0.2, 20), point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), point $SP_1$ (0.19, 0), and point $SQ_1$ (0.2, −0.7).

31. A spin-valve thin-film magnetic element according to claim 30, wherein the magnetic read track width Tw ($\mu$m) and the magnetostriction $\lambda$s ($\times 10^{-6}$), which are shown in accompanying FIG. 42 as point (Tw, $\lambda$s), are within the range obtained by linking point $SG_1$ (0.19, 20), point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), point $SO_1$ (0.18, 1), and point $SP_1$ (0.19, 0).

32. A spin-valve thin-film magnetic element according to claim 31, wherein the magnetic read track width Tw ($\mu$m) and the magnetostriction $\lambda$s ($\times 10^{-6}$), which are shown in accompanying FIG. 42 as point (Tw, $\lambda$s), are within the range obtained by linking point $SH_1$ (0.18, 20), point $SI_1$ (0.17, 20), point $SJ_1$ (0.15, 20), point $SK_1$ (0.1, 20), point $SL_1$ (0.1, 9), point $SM_1$ (0.15, 3.5), point $SN_1$ (0.17, 2), and point $SO_1$ (0.18, 1).

33. A spin-valve thin-film magnetic element according to claim 32, wherein the magnetic read track width Tw ($\mu$m) and the magnetostriction $\lambda$s ($\times 10^{-6}$), which are shown in accompanying FIG. 42 as point (Tw, $\lambda$s), are within the range obtained by linking point $SI_1$ (0.17, 20), point $SJ_1$ (0.15, 20), point $SK_1$ (0.1, 20), point $SL_1$ (0.1, 9), point $SM_1$ (0.15, 3.5), and point $SN_1$ (0.17, 2).

34. A spin-valve thin-film magnetic element according to claim 33, wherein the magnetic read track width Tw ($\mu$m) and the magnetostriction $\lambda$s ($\times 10^{-6}$), which are shown in accompanying FIG. 42 as point (Tw, $\lambda$s), are within the range obtained by linking point $SJ_1$ (0.15, 20), point $SK_1$ (0.1, 20), point $SL_1$ (0.1, 9), and point $SM_1$ (0.15, 3.5).

35. A spin-valve thin-film magnetic element according to claim 34, wherein the magnetic read track width Tw ($\mu$m) and the magnetostriction $\lambda$s ($\times 10^{-6}$), which are shown in accompanying FIG. 43 as point (Tw, $\lambda$s), are within the range obtained by linking point $SW_2$ (0.13, 20), point $SK_2$ (0.1, 20), point $SL_2$ (0.1, 9), and point $SX_2$ (0.13, 5).

36. A spin-valve thin-film magnetic element according to claim 26, wherein the antiferromagnetic layer, the pinned magnetic layer, the nonmagnetic conductive layer, and the free magnetic layer are deposited in that order on the substrate.

37. A spin-valve thin-film magnetic element according to claim 26, wherein the antiferromagnetic layer comprises one of an X—Mn alloy and a Pt—Mn—X' alloy, where X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

38. A spin-valve thin-film magnetic element according to claim 26, wherein at least one of the pinned magnetic layer and the free magnetic layer is divided into two sublayers by a nonmagnetic intermediate layer to produce a ferrimagnetic state in which the magnetization directions of the sublayers are antiparallel to each other.

39. A thin-film magnetic head comprising a spin-valve thin-film magnetic element according to claim 26.

40. A spin-valve thin-film magnetic element comprising:

a substrate;

an antiferromagnetic layer;

a pinned magnetic layer in contact with the antiferromagnetic layer, the magnetization direction of the pinned magnetic layer being pinned by an exchange coupling magnetic field with the antiferromagnetic layer;

a free magnetic layer formed on the pinned magnetic layer with a nonmagnetic conductive layer therebetween, the magnetization direction of the free magnetic layer being aligned in a direction substantially orthogonal to the magnetization direction of the pinned magnetic layer;

a pair of hard bias layers for aligning the magnetization direction of the free magnetic layer in the direction substantially orthogonal to the magnetization direction of the pinned magnetic layer; and a pair of electrode layers for applying a sensing current to the pinned magnetic layer, the nonmagnetic conductive layer, and the free magnetic layer, wherein the magnetic read track width Tw ($\mu$m) and the magnetostriction $\lambda$s ($\times 10^{-6}$), which are shown in accompanying FIG. 43 as point (Tw, $\lambda$s), are within the range obtained by linking point $SA_2$ (0.4, 6), point $SB_2$ (0.35, 6), point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), point $SS_2$ (0.25, −1), point $ST_2$ (0.3, −1.5), point $SU_2$ (0.35, −1.6), and point $SV_2$ (0.4, −1.5).

41. A spin-valve thin-film magnetic element according to claim 40, wherein the magnetic read track width Tw ($\mu$m) and the magnetostriction $\lambda$s ($\times 10^{-6}$), which are shown in accompanying FIG. 43 as point (Tw, $\lambda$s), are within the range obtained by linking point $SB_2$ (0.35, 6), point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), point $SS_2$ (0.25, −1), point $ST_2$ (0.3, −1.5), and point $SU_2$ (0.35, −1.6).

42. A spin-valve thin-film magnetic element according to claim 41, wherein the magnetic read track width Tw ($\mu$m) and the magnetostriction $\lambda$s ($\times 10^{-6}$), which are shown in accompanying FIG. 43 as point (Tw, $\lambda$s), are within the range obtained by linking point $SC_2$ (0.3, 7.5), point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), point $SS_2$ (0.25, −1), and point $ST_2$ (0.3, −1.5).

43. A spin-valve thin-film magnetic element according to claim 42, wherein the magnetic read track width Tw ($\mu$m) and the magnetostriction $\lambda$s ($\times 10^{-6}$), which are shown in accompanying FIG. 43 as point (Tw, $\lambda$s), are within the range obtained by linking point $SD_2$ (0.25, 10.5), point $SE_2$ (0.23, 11), point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), point $SQ_2$ (0.22, 0), point $SR_2$ (0.23, −0.5), and point $SS_2$ (0.25, −1).

44. A spin-valve thin-film magnetic element according to claim 43, wherein the magnetic read track width Tw ($\mu$m) and the magnetostriction $\lambda$s ($\times 10^{-6}$), which are shown in accompanying FIG. 43 as point (Tw, $\lambda$s), are within the range obtained by linking point $SF_2$ (0.22, 12), point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), point $SP_2$ (0.2, 1), and point $SQ_2$ (0.22, 0).

45. A spin-valve thin-film magnetic element according to claim 44, wherein the magnetic read track width Tw ($\mu$m) and the magnetostriction $\lambda$s ($\times 10^{-6}$), which are shown in accompanying FIG. 43 as point (Tw, $\lambda$s), are within the range obtained by linking point $SG_2$ (0.2, 13.5), point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), point $SO_2$ (0.19, 1.2), and point $SP_2$ (0.2, 1).

46. A spin-valve thin-film magnetic element according to claim 45, wherein the magnetic read track width Tw ($\mu$m) and the magnetostriction $\lambda$s ($\times 10^{-6}$), which are shown in accompanying FIG. 43 as point (Tw, $\lambda$s), are within the range obtained by linking point $SH_2$ (0.19, 14.2), point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), point $SN_2$ (0.18, 1.5), and point $SO_2$ (0.19, 1.2).

47. A spin-valve thin-film magnetic element according to claim 46, wherein the magnetic read track width Tw ($\mu$m) and the magnetostriction $\lambda$s ($\times 10^{-6}$), which are shown in accompanying FIG. 43 as point (Tw, $\lambda$s), are within the range obtained by linking point $SI_2$ (0.18, 15.1), point $SJ_2$ (0.15, 17.5), point $SW_2$ (0.13, 20), point $SK_2$ (0.1, 20), point $SL_2$ (0.1, 9), point $SX_2$ (0.13, 5), point $SM_2$ (0.15, 3.5), and point $SN_2$ (0.18, 1.5).

48. A spin-valve thin-film magnetic element according to claim 47, wherein the magnetic read track width Tw ($\mu$m) and the magnetostriction $\lambda$s ($\times 10^{-6}$), which are shown in accompanying FIG. 43 as point (Tw, $\lambda$s), are within the range obtained by linking point $SJ_2$ (0.15, 17.5), point $SW_2$ (0.13, 20), point $SK_2$ (0.1, 20), point $SL_2$ (0.1, 9), point $SX_2$ (0.13, 5), and point $SM_2$ (0.15, 3.5).

* * * * *